(12) United States Patent
Leung et al.

(10) Patent No.: US 12,342,304 B2
(45) Date of Patent: Jun. 24, 2025

(54) SUPPORTING INTER-MEDIA SYNCHRONIZATION IN WIRELESS COMMUNICATIONS

(71) Applicant: QUALCOMM Incorporated, San Diego, CA (US)

(72) Inventors: Nikolai Konrad Leung, San Francisco, CA (US); Olufunmilola Omolade Awoniyi-Oteri, San Diego, CA (US); Prashanth Haridas Hande, San Diego, CA (US); Tao Luo, San Diego, CA (US); Sebastian Speicher, Zurich (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/525,363

(22) Filed: Nov. 30, 2023

(65) Prior Publication Data

US 2024/0107476 A1 Mar. 28, 2024

Related U.S. Application Data

(62) Division of application No. 17/479,389, filed on Sep. 20, 2021, now Pat. No. 11,889,447.

(60) Provisional application No. 63/228,898, filed on Aug. 3, 2021.

(51) Int. Cl.
 *H04W 56/00* (2009.01)
(52) U.S. Cl.
 CPC .............. *H04W 56/0045* (2013.01)
(58) Field of Classification Search
 None
 See application file for complete search history.

(56) References Cited

U.S. PATENT DOCUMENTS

| | | |
|---|---|---|
| 2002/0097750 A1 | 7/2002 | Gunaseelan et al. |
| 2008/0080568 A1 | 4/2008 | Hughes et al. |
| 2008/0216025 A1 | 9/2008 | Furnish et al. |
| 2009/0021639 A1 | 1/2009 | Geen et al. |
| 2009/0041042 A1 | 2/2009 | Diab |
| 2009/0201805 A1* | 8/2009 | Begen ............... H04L 1/0018 370/225 |
| 2009/0254874 A1 | 10/2009 | Bose |
| 2010/0260468 A1* | 10/2010 | Khatib ............ H04N 21/2662 386/282 |
| 2012/0324520 A1 | 12/2012 | Van Deventer et al. |

(Continued)

FOREIGN PATENT DOCUMENTS

| | | |
|---|---|---|
| WO | 2019032734 A1 | 2/2019 |
| WO | 2019095278 A1 | 5/2019 |

(Continued)

OTHER PUBLICATIONS

International Search Report and Written Opinion—PCT/US2022/031742—ISA/EPO—Nov. 21, 2022. 21 pages.

(Continued)

*Primary Examiner* — Wutchung Chu
*Assistant Examiner* — Berhanu D Belete
(74) *Attorney, Agent, or Firm* — Polsinelli LLP

(57) ABSTRACT

Various embodiments provide systems and methods for supporting synchronized delivery of packets of different type media streams of a service. Various embodiments enable wireless device and/or network assistance of packet synchronization in downlink (DL) and/or uplink (UL) transmissions.

8 Claims, 38 Drawing Sheets

(56) References Cited

U.S. PATENT DOCUMENTS

| | | | | |
|---|---|---|---|---|
| 2013/0163532 | A1* | 6/2013 | Anderson | H04L 5/0053 |
| | | | | 370/329 |
| 2013/0163533 | A1* | 6/2013 | Anderson | H04L 1/1812 |
| | | | | 370/329 |
| 2014/0105083 | A1 | 4/2014 | Krishnaswamy et al. | |
| 2016/0248822 | A1 | 8/2016 | Hughes et al. | |
| 2017/0311317 | A1* | 10/2017 | Dinan | H04L 5/0098 |
| 2017/0331651 | A1 | 11/2017 | Suzuki et al. | |
| 2018/0317123 | A1* | 11/2018 | Chen | H04W 72/21 |
| 2018/0367255 | A1* | 12/2018 | Jeon | H04W 72/23 |
| 2018/0368157 | A1* | 12/2018 | Jeon | H04W 72/044 |
| 2018/0368172 | A1* | 12/2018 | Li | H04W 72/23 |
| 2018/0368174 | A1* | 12/2018 | Jeon | H04W 72/044 |
| 2018/0368175 | A1* | 12/2018 | Jeon | H04W 72/04 |
| 2019/0215729 | A1 | 7/2019 | Oyman et al. | |
| 2019/0342225 | A1 | 11/2019 | Sanghi et al. | |
| 2020/0037345 | A1* | 1/2020 | Ryoo | H04W 76/27 |
| 2020/0107285 | A1 | 4/2020 | Prakash et al. | |
| 2020/0205107 | A1 | 6/2020 | Prakash et al. | |
| 2020/0205177 | A1 | 6/2020 | Prakash et al. | |
| 2020/0329088 | A1* | 10/2020 | Oyman | H04L 65/65 |
| 2020/0396739 | A1 | 12/2020 | Sundararajan et al. | |
| 2021/0105762 | A1 | 4/2021 | Pezeshki et al. | |
| 2021/0144743 | A1* | 5/2021 | Rastegardoost | H04W 72/23 |
| 2021/0218538 | A1* | 7/2021 | Myung | H04L 27/0006 |
| 2021/0298049 | A1* | 9/2021 | Myung | H04W 72/1268 |
| 2021/0307036 | A1* | 9/2021 | Myung | H04W 72/1268 |
| 2021/0329690 | A1* | 10/2021 | Tokgoz | H04W 72/23 |
| 2021/0360673 | A1* | 11/2021 | Myung | H04L 1/1864 |
| 2021/0377793 | A1 | 12/2021 | Moilanen et al. | |
| 2021/0392685 | A1* | 12/2021 | Myung | H04W 72/0446 |
| 2022/0174695 | A1* | 6/2022 | Lee | H04L 1/1896 |
| 2022/0209906 | A1* | 6/2022 | Han | H04L 1/1896 |
| 2023/0040689 | A1 | 2/2023 | Leung | |
| 2023/0276472 | A1* | 8/2023 | Hu | H04W 72/02 |
| | | | | 370/230 |

FOREIGN PATENT DOCUMENTS

| | | |
|---|---|---|
| WO | 2020089851 A1 | 5/2020 |
| WO | 2020200066 A1 | 10/2020 |
| WO | 2021037332 A1 | 3/2021 |

OTHER PUBLICATIONS

Moderator (Ericsson): "FL Summary for Additional Scenarios for Evaluation of NR Positioning", 3GPP TSG-RAN WG1 Meeting 1#102-e, R1-2007367, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 28, 2020, XP051922860, 74 Pages, Paragraph [2.4.1].

Partial International Search Report—PCT/US2022/031742—ISA/EPO—Sep. 22, 2022. 14 pages.

* cited by examiner

1800

┌─────────────────────────────────┐
│ Send Assistance Data For Different Type │──— 1802
│         Media Streams            │
└─────────────────────────────────┘

FIG. 18A

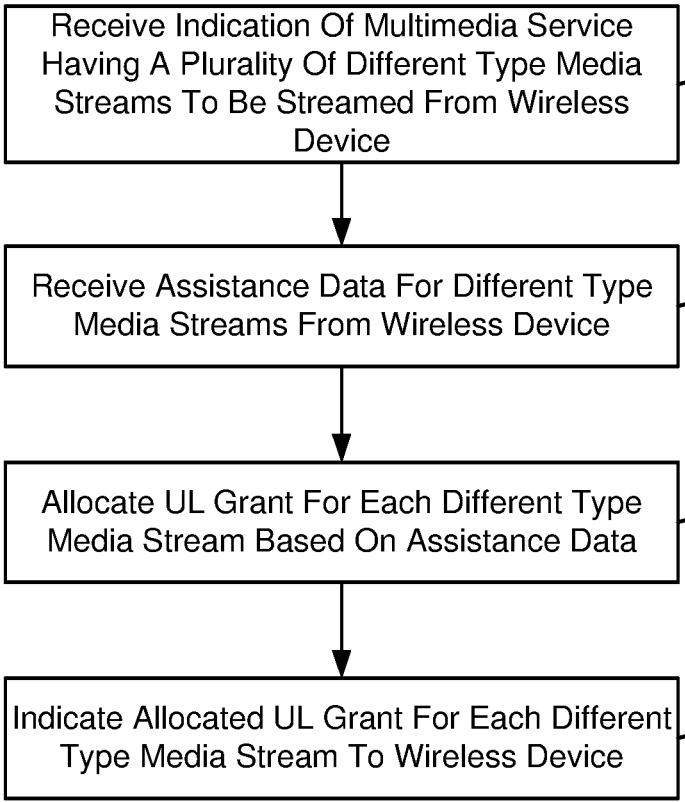

1820

┌─────────────────────────────────┐
│ Receive Indication Of Multimedia Service │
│ Having A Plurality Of Different Type Media │──— 1702
│ Streams To Be Streamed From Wireless │
│              Device              │
└─────────────────────────────────┘
                ↓
┌─────────────────────────────────┐
│ Receive Assistance Data For Different Type │──— 1822
│  Media Streams From Wireless Device │
└─────────────────────────────────┘
                ↓
┌─────────────────────────────────┐
│ Allocate UL Grant For Each Different Type │──— 1824
│ Media Stream Based On Assistance Data │
└─────────────────────────────────┘
                ↓
┌─────────────────────────────────┐
│ Indicate Allocated UL Grant For Each Different │──— 1706
│  Type Media Stream To Wireless Device │
└─────────────────────────────────┘

FIG. 18B

SUPPORTING INTER-MEDIA SYNCHRONIZATION IN WIRELESS COMMUNICATIONS

RELATED APPLICATIONS

This application is a division of U.S. Non-Provisional patent application Ser. No. 17/479,389 filed Sep. 20, 2021 entitled "Supporting Inter-Media Synchronization In Wireless Communications", which claims the benefit of priority to U.S. Provisional Application No. 63/228,898 entitled "Supporting Inter-Media Synchronization In Wireless Communications" filed Aug. 3, 2021, the entire contents of both of which are hereby incorporated herein by reference for all purposes.

BACKGROUND

Long Term Evolution (LTE), 5G new radio (NR) (5GNR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include systems and methods for supporting synchronized delivery of packets of different type media streams of a service. Various embodiments enable wireless device and/or network assistance of packet synchronization in downlink (DL) and/or uplink (UL) transmissions. Various aspects include methods for synchronizing delivery of a multimedia service among different media streams. In some aspects, the methods may be performed by a processor of a base station.

Various aspects may include determining that a data packet of a media stream of a plurality of different type media streams qualifies for early delivery, determining an early delivery time period to a latency budget for the media stream of the data packet qualifying for early delivery, sending the data packet qualifying for early delivery to a wireless device earlier than the latency budget; and sending an early delivery indication including an indication of the early delivery time period to the wireless device. In some aspects, the latency budget may be a packet delay budget. In some aspects, the latency budget may be an end-to-end (e2e) latency budget.

Various aspects may further include sending synchronization margins for each of the plurality of different type media streams to the wireless device and sending an indication of remaining latency budgets for the plurality of different type media streams to the wireless device.

Various aspects may further include receiving feedback requesting skew adjustment from the wireless device and adjusting delivery of packets to the wireless device according to the feedback to meet the synchronization margins.

Various aspects may include receiving a buffer status report for each of different type media streams of the multimedia service from a wireless device, the buffer status reports indicating different logical channel groups and different priorities for each different type media stream, allocating uplink (UL) grants for each different type media stream of the multimedia service based on the buffer status reports, and indicating the allocated UL grant for each different type media stream of the multimedia service to the wireless device over a Physical Downlink Control Channel (PDCCH). In some aspects, the allocated UL grants are periodic configured UL grants offset to account for skew between the different type media streams of the multimedia service.

Various aspects may further include receiving a scheduling request (SR) from the wireless device indicating a remaining latency budget for one of the different type media streams of the multimedia service over a Physical Uplink Control Channel (PUCCH), allocating UL grants for the one of the different type media streams of the multimedia service based on the remaining latency budget in response to receiving the SR, indicating the allocated UL grant for the one of the different type media streams of the multimedia service to the wireless device over the PDCCH, and receiving UL data from for the one of the different type media streams of the multimedia service from the wireless device over a Physical Uplink Shared Channel (PUSCH). In some aspects, the remaining latency budget may be a remaining packet delay budget. In some aspects, the remaining latency budget may be a remaining e2e latency budget.

Further aspects may include a base station having a processor configured to perform one or more operations of any of the methods summarized above. Further aspects may include processing devices for use in a base station configured with processor-executable instructions to perform operations of any of the methods summarized above. Further aspects may include a non-transitory processor-readable storage medium having stored thereon processor-executable instructions configured to cause a processor of a base station to perform operations of any of the methods summarized above. Further aspects include a base station having means for performing functions of any of the methods summarized above. Further aspects include a system on chip for use in a base station and that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 18A is a process flow diagram illustrating a method for synchronizing delivery of a multimedia service, in accordance with various embodiments.

FIG. 18B is a process flow diagram illustrating a method for synchronizing delivery of a multimedia service, in accordance with various embodiments.

DETAILED DESCRIPTION

Figure 1:
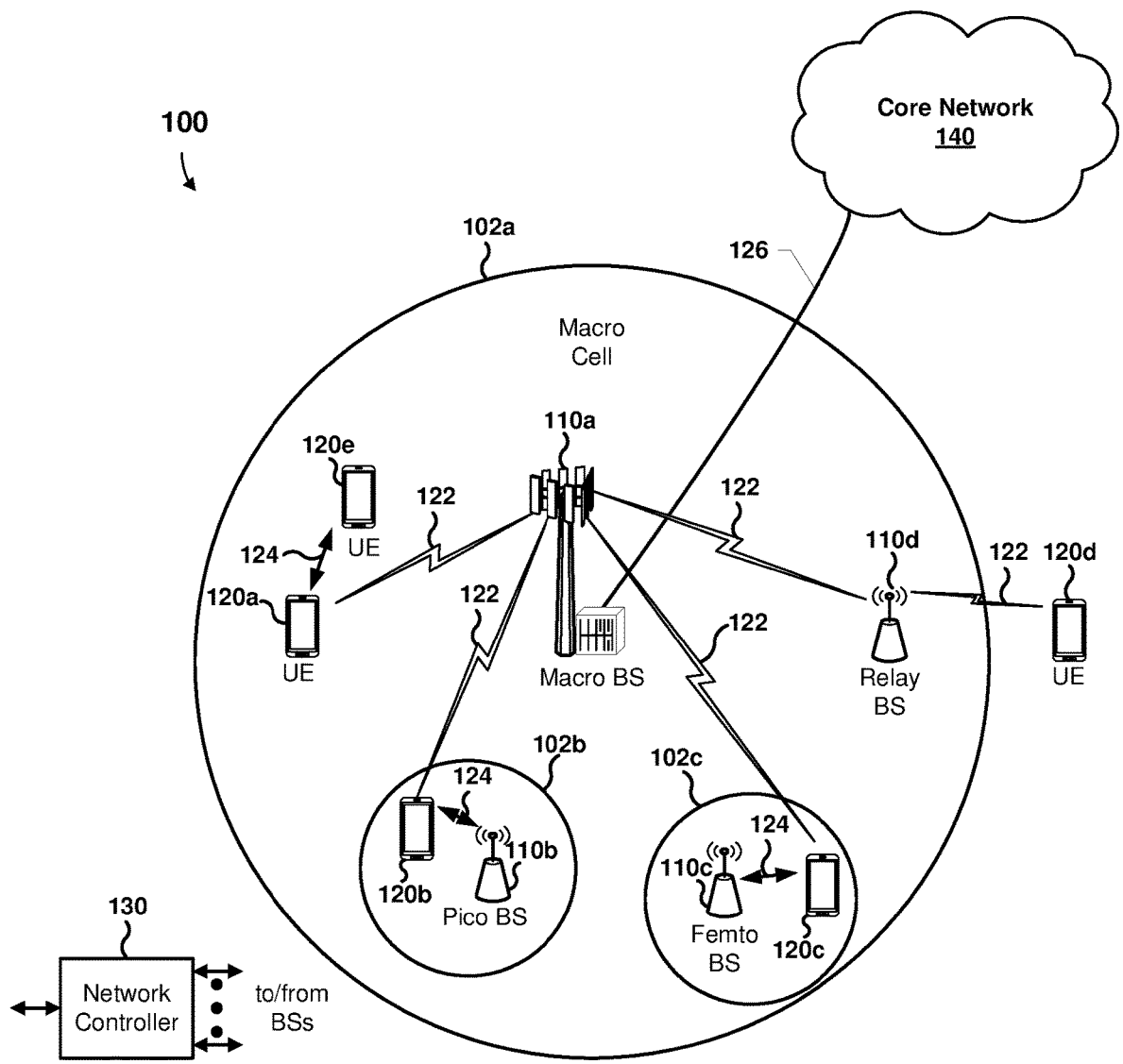
FIG. 1 is a system block diagram illustrating an example communications system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for supporting synchronized delivery of packets of different type media streams of a service. Various embodiments enable wireless device and/or network assistance of packet synchronization in downlink (DL) and/or uplink (UL) transmissions. Wireless device and/or network assistance of packet synchronization for packets of different type media streams of a multimedia service may support providing a quality user experience while not exceeding end-to-end (e2e) latency requirements. Additionally, various embodiments enable relative latency requirements between different types of media to be exploited such that not as time-sensitive media types can be delivered and/or rendered after more time-sensitive media. Supporting delivery and/or rendering of different time-sensitivity media types at different times may enable efficient capacity use in transport of packets of different type media streams of a multimedia service to a wireless device.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, virtual reality (VR) glasses, augmented reality (AR) glasses, mixed reality (MR) glasses, extended reality (XR) headsets (e.g., headsets providing VR, AR, MR, and/or other type immersive or semi-immersive visual experiences), electronic goggles, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in various examples.

As used herein, the term "RF chain" refers to the components in a communication device that send, receive, and decode radio frequency signals. An RF chain typically includes a number of components coupled together that transmit RF signals that are referred to as a "transmit chain," and a number of components coupled together that receive and process RF signals that are referred to as a "receive chain."

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

LTE is a mobile network standard for 4G wireless communication of high-speed data developed by the 3GPP (3rd Generation Partnership Project) and specified in its Release 8 document series. The 5G system (5GS) is an advanced technology from 4G LTE, and provides a new radio access technology (RAT) through the evolution of the existing mobile communication network structure. Implementations for 5GS networks are currently being adopted that provide new radio (NR) (also referred to as 5G) support via NR base stations, such as Next Generation NodeB (gNodeBs or gNBs)). The 5G systems and NR base stations are providing flexibility in bandwidth scheduling and utilization. Future generation systems (e.g., sixth generation (6G) or higher systems) may provide the same or similar flexibility in bandwidth scheduling and utilization.

In LTE and/or 5G (or later generation) systems network devices, such as base stations, may broadcast packets to wireless devices in a cell. For ease of reference, the term "network device" or "network computing device" is used to refer to any of a variety of network elements that may perform operations of various embodiments, non-limiting examples of which include a base station, an eNodeB, a gNodeB, an Applicant Function (AF) server, User Plane Function (UPF) server, Operations, Policy Charging Function (PCF) server, content server, application server, etc.

3GPP networks, such as 5G (or later generation) networks, may support providing multimedia applications or services using multiple media types (e.g., audio, immersive video, haptics, etc.) simultaneously. Such multimedia applications or services rendering multiple different media types to a user at the same time may be referred to generally as tactile and multi-modality communication (TACMM) services, and TACMM services may include immersive multimodal VR services or applications, robotics remote control services or applications, cooperative automated driving applications, immersive video conferencing services or applications, or any other type service in which different media types may be rendered together to a user.

TACMM services may leverage parallel transmission of multiple modality representations in respective type media streams (e.g., a video media stream, an audio media stream, a haptic media stream, an ambient information media stream, etc.) to deliver the TACMM service to a wireless device. The different media streams may be different flows of different type packets, such as video packets, audio packets, haptic media packets, ambient information packets, etc. Respective packets in the different media streams may have different attributes reflecting the packets different types, such as different payload types (e.g., different Real-time Transport Protocol (RTP) payload types, etc.), different destination ports, etc. For example, video packets and the video media streams may have a first payload type and/or a first destination port, audio packets may have a second payload type and/or a second destination port, haptic media packets may have a third payload type and/or a third destination port, and ambient information packets may have a fourth payload type and/or a fourth destination port. The respective media streams of the TACMM service may share common timestamps, such as application timestamps, RTP timestamps, etc., aligning the intended rendering timeline of the respective media streams with one another.

The wireless device may synchronize the different type media streams, for example by using the timestamps in the media streams, and render the different type media streams to a user together (or within some acceptable time of one another), thereby outputting a TACMM service to the user. As a specific example, a media source, such as a content server, may stream a first media stream of haptic data, a second media stream of audio data, and a third media stream of video data for a TACMM service (e.g., a VR game, an immersive video conference, etc.) to a wireless device and a renderer running on a processor of the wireless device may synchronize the first media stream, second media stream, and third media stream with one another according to the timestamps (e.g., application timestamps, RTP timestamps, etc.) in the media streams to output aligned haptic data, audio, and video media to a user of the wireless device. The synchronization of the rendering of the different type media streams may reduce skew between different types of media streams below a maximum tolerable skew or may eliminate skew in the media rendering. "Skew" as used herein refers to delay between two or more packets of two or more different type media streams being rendered. Skew can occur when two or more packets of two or more different type media streams that should have been rendered at the same time are rendered at different times. For example, an audio packet and a video packet may be timestamped so as to render at the same time, but the audio packet may render first because the video packet has arrived later in time. The time difference between the rendering of the audio packet and the video packet may be the skew between the audio packet and the video packet in such an example. An amount of skew between packets of different type media streams may be acceptable (or tolerable) in a service, such as a TACMM service. For example, a maximum tolerable skew between audio packets and video packets may ensure synchronization between audio and video rendering (or playout). As a specific example, such maximum tolerable skew may ensure lip movement to voice output synchronization (also referred to as lip-synchronization or lip-synch).

While timestamps (e.g., application timestamps, RTP timestamps, etc.) in the different media streams of a TACMM service may enable synchronization of the media streams prior to rendering, transport layers in current 3GPP systems may not ensure synchronization of the delivery of the different media streams to a wireless device. As delivery of different type media streams may not be synchronized, a renderer running on a processor of a wireless device may be required to wait for a slowest media stream before rendering all media streams. This need to wait for the slowest media type before rendering all media streams may result in unacceptable edge-to-edge (e2e) delays for more latency-sensitive media types. For example, haptic data may have lower latency requirements than audio data and both haptic data and audio data may have lower latency requirements than video data. In such an example, in a scenario in which the video data is the slowest media type to arrive, waiting for rendering until haptic data, audio data, and video data are all received may cause the haptic data and/or audio data to exceed the haptic and/or audio latency requirements.

Various embodiments provide systems and methods supporting synchronized delivery of packets of different type media streams of a service, such as a TACMM service. Various embodiments enable wireless device and/or network assistance of packet synchronization in downlink (DL) and/or uplink (UL) transmissions.

Various embodiments may include bundling different type media streams of a multimedia service, such as a TACMM service, and delivering the different type media streams to a wireless device at the same time. In various embodiments, different type media streams of a multimedia service, such as a TACMM service, may be assigned a same priority for transmission (e.g., a same Quality of Service (QoS) flow). As examples, the same priority of transmission may be set at the application, RTP, and/or transport layers. In various embodiments, a lowest e2e latency media stream of the different type media streams of a multimedia service, such as a TACMM service, may be determined as the different type media stream of the multimedia service having the lowest e2e latency requirement. For example, in a multimedia service having a haptic data media stream, audio data media stream, and a video data media stream, the haptic data media stream may have the lowest e2e latency requirement and may be the lowest e2e latency media stream. In various embodiments, a transport priority, such as a QoS flow, for each of different type media streams of the multimedia service may be set to the transport priority of the lowest e2e latency stream. In this manner, all transport priorities for all media streams of the multimedia service may be set to the same transport priority, e.g., the transport priority of the media stream with the lowest e2e latency requirement. For example, in a multimedia service having a haptic data media stream, audio data media stream, and a video data media stream, the transport priorities (e.g., the QoS flows) of the haptic data media stream, audio data media stream, and video data media stream all be set to the priority of the haptic data media stream that may be the lowest e2e latency media stream. The setting of the transport priorities of all media streams of the multimedia service to the priority of the lowest e2e latency requirement media stream may result in all packets of the multimedia service being transported with the same low latency. The setting of the transport priorities of all media streams of the multimedia service to the priority of the lowest e2e latency requirement media stream may result in the different type media streams of the multimedia service arriving at a wireless device at the same, or near same time, as transport resources may be assigned to all the media streams to ensure the same lowest e2e latency requirement is met for all media stream delivery.

Various embodiments may include setting specific e2e latency targets for different type media streams of a multimedia service, such as a TACMM service. In various embodiments, different type media streams of a multimedia service, such as a TACMM service, may be associated with different e2e latency requirements. For example, in a multimedia service having a haptic data media stream, audio data media stream, and a video data media stream, the haptic data media stream may have the lowest e2e latency requirement. E2e latency targets may also be referred to as e2e latency budgets. In various embodiments, e2e latency targets (or e2e latency budgets) may define a time period by which a packet of a media stream must be delivered. In various embodiments, e2e latency targets (or e2e latency budgets) may represent a goal delivery time at which a base station, such as a gNB, may deliver a packet for a media stream to a wireless device.

In various embodiments, a e2e latency target may be determined for each different type media stream of a multimedia service based at least in part on the e2e latency requirement for each respective different type media stream. In various embodiments, an e2e latency target for a selected media stream may be determined based on an e2e latency target for another media stream and a synchronization margin between the selected media stream and the other media stream. A synchronization margin may define the maximum time limit between rendering a packet of one media stream and rendering a media packet of another media stream. Synchronization margins may define a maximum tolerable skew between the respective packets of different type media streams that may be acceptable (or tolerable) in a service, such as a TACMM service. As a specific example, AV "lip" sync requirements between audio data and video data may be predefined, such as −45 to 15 milliseconds for Advanced Television System Committee (ATSC) compliant television programs, −125 to 45 milliseconds for International Telecommunication Union (ITU) compliant television programs, −22 to 22 milliseconds for films, −100 to 100 milliseconds for videotelephony, etc.

In various embodiments, the e2e latency target may be a time before which a base station should not delivery, or schedule for delivery, a packet of the media stream to a wireless device. An e2e latency target may enable synchronization requirements to be met an require lower latency media types to be delivered at the e2e latency target time.

Various embodiments may reduce the risk of loss of synchronization, specifically reducing the risk of loss of synchronization when packet delays are relatively fast. Various embodiments may enable delivery of packets prior to a target associated with a packet delay budget (PDB). Delivery of packets prior to a target associated with a PDB may improve capacity for delivery of a multimedia service, such as a TACMM service. A packet delay budget (PDB) may be a requirement to deliver a packet within a timeframe. The PDB may set a maximum time by which a packet must be delivered to a wireless device. While PDB sets a maximum time, packets may be delivered earlier than the PDB. In various embodiments, e2e latency targets (also referred to as e2e latency budgets) may correspond to the PDB for a media stream.

In various embodiments, a wireless device and the network computing device sending the packets of the multimedia service may synchronize clocks with one another. In various embodiments, synchronized timestamps, such as synchronized application timestamps, RTP timestamps, etc. may be used between a network computing device sending packets of a multimedia service and a wireless device receiving packets of the service to determine the experienced e2e delay for each packet. In various embodiments, a PDB, such as a transport PDB, for each media stream of the multimedia service may be set to meet the e2e latency requirement for that media stream. In various embodiments, the PDB, such as the transport PDB, may be indicated to the wireless device. In various embodiments, the wireless device may only render a media packet when the time between the timestamp and the current clock time of the synchronized clock at the wireless device indicates the time since sending of the packet has reached the PDB, such as the transport PDB. Waiting to render a packet until the PDB is reached may guarantee that lower latency packets are not rendered too early with regard to corresponding longer latency media packets. Such waiting to render may ensure the rendered packets stay within the inter-media synchronization limits.

Various embodiments provide downlink synchronization support in which a network computing device, such as a User Plane Function (UPF) server, etc., may align RTP timestamps for different type media streams of a multimedia service, such as a TACMM service. In various embodiments, a UPF server may receive RTP timestamped media streams of a multimedia service. The different media streams of the multimedia service may have different sampling rates and may have different initial timestamps. The sampling frequency (fs) may be indicated to the UPF for each media stream, such as by a Policy and Charging Function (PCF) server, gathering the sampling frequency from the Session Description Protocol (SDP) information for the multimedia service. In various embodiments, the UPF server may use RTP Control Protocol (RTCP) report information associated with the different type media streams of the multimedia service and the sampling frequency to align the RTP timestamps of the different type media streams. For example, the timestamp offset between the different type media streams of the multimedia service may be determined and the RTP timestamps may be aligned based on the timestamp offsets. With the RTP timestamps aligned, as the packets of the multimedia service are sent to a base station, such as a gNB, using General Packet Radio Service (GPRS) Tunneling Protocol (GTP) aligned timestamps. For example, GTP aligned timestamps may be inserted into the GTP packets to enable the gNB to maintain the alignment of the packets of the multimedia service.

In various embodiments, a base station, such as a gNB, may schedule delivery of packets of a multimedia service having different type media streams, such as a TACMM service, such that tolerable inter-media synchronization limits are met in delivering the packets of the multimedia service to a wireless device. In various embodiments, synchronization margins for each different type media stream of the multimedia service may be provided to the base station, such as a gNB. In embodiments in which the packets of the multimedia service are delivered using GTP aligned timestamps, a scheduler running on a processor of the base station, such as a gNB scheduler, may deliver packets of the multimedia server to the wireless device such that the synchronization margins between any of the media streams are not exceeded.

In various embodiments, a wireless device may send feedback to a base station, such as a gNB, indicating a loss of synchronization between packets of different type media streams of a multimedia service, such as a TACMM service. In various embodiments, the feedback indication may be an indication to advance and/or delay delivery of packets of one or more media streams. In various embodiments, feedback may be sent on a per-packet basis. In various embodiments, feedback may be sent less-frequently than a per-packet basis. In various embodiments, the base station may adjust delivery of the packets of the different type media streams based on the wireless device feedback.

In various embodiments, a base station, such as a gNB, may deliver packets of a multimedia service having different type media streams, such as a TACMM service, earlier than a latency budget for a media stream, such as earlier than an e2e latency budget for a media stream, earlier than a PDB for a media stream, earlier than an e2e latency target for a media stream, etc. In various embodiments, a base station, such as a gNB, delivering a packet earlier than a latency budget may signal the early delivery to a wireless device. In various embodiments, a base station, such as a gNB, delivering a packet earlier than a latency budget may send an indication of early delivery to a wireless device including a time value reflecting a time period ahead of the latency budget (e.g., the e2e latency budget, the e2e latency target, the PDB, etc.) the packet was delivered. In various embodiments, when the wireless device receives the packet early and the indication of early delivery, the wireless device may wait for the expiration of the time value before rendering the packet. In this manner, by the base station, such as the gNB, indicating to the wireless device by how much time packets are delivered ahead of an e2e latency target, the wireless device may use this information to delay rendering early packets to avoid exceeding inter-media synchronization limits In various embodiments, for RTP media, the early indication may not need to be sent often. Once the early indication is used to set rendering (or playout) of a packet at the PDB, the wireless device may use RTP timestamps to manage the rendering (or playout) of subsequent packets. Occasional remaining budget updates may compensate for clock drift. In various embodiments, the base station, such as the gNB, may determine how much time is left until exceeding the latency budget (e.g., the PDB, the e2e latency target, the e2e latency budget, etc.) by measuring how long the packet has been queued before delivery to the wireless device. In various embodiments, the base station, such as the gNB, may determine how much time is left until exceeding the latency budget (e.g., the PDB, the e2e latency target, the e2e latency budget, etc.) by examining RTP timestamps to estimate remaining latency budget.

In various embodiments, a network computing device, such as a UPF server, may pre-adjust GTP timestamps to match tolerable inter-media synchronization requirements. In addition to adding aligned GTP timestamps, in various embodiments, the network computing device, such as the UPF server, may adjust the GTP timestamps to account for synchronization margins between the different type media streams of the multimedia service. In this manner, packets sent to a base station, such as a gNB, may already account for inter-media synchronization requirements. Pre-adjusting GTP timestamps to account for synchronization margins between the medias streams of the multimedia service may avoid needing to provide skew requirements to a base station, such as gNB, thereby reducing the complexity of the base station scheduler. In some embodiments, in addition to the adjusted GTP timestamps, an indication that some media flows may be delivered early may be sent from the UPF server to the base station. This early delivery authorization information may enable the base station, such as the gNB, to exploit scheduling opportunities.

In various embodiments, a wireless device may adjust delivery of packets to a renderer to account for synchronization margins between the different type media streams of the multimedia service, such as a TACMM service. In various embodiments, a base station, such as a gNB, may send indications of synchronization margins between the different type media streams of the multimedia service to a wireless device. The gNB may deliver packets to the wireless device by the latency budget (e.g., the PDB, the e2e latency target, the e2e latency budget, etc.) for the media streams. The wireless device may adjust the packets to account for synchronization margins between the different type media streams of the multimedia service before delivering the packets to a renderer. The wireless device may be aware of a time remaining before the latency budget (e.g., the PDB, the e2e latency target, the e2e latency budget, etc.) is reached. The wireless device may adjust the packets to account for synchronization margins between the different type media streams of the multimedia service such that the latency budget (e.g., the PDB, the e2e latency target, the e2e latency budget, etc.) is not exceeded. Wireless devices implementing synchronization margins may enable wireless devices to compensate for media delivery delays that the base station cannot fully compensate for. In various embodiments, the wireless device may send feedback to a base station, such as a gNB, indicating a percentage adjustment to the synchronization margins allocation between the wireless device and base station. In various embodiments, the feedback indication may indicate a percentage adjustment the base stations is to apply to account for synchronization margins between the different type media streams of the multimedia service. The remaining percentage adjustment may be applied by the wireless device. In this manner, the workload for ensuring inter-media synchronization (e.g., ensuring synchronization margins are not exceeded) may be shared between the wireless device and base station.

Various embodiments enable network assistance of packet synchronization in uplink (UL) transmissions by leveraging information available to a wireless device when the wireless device is generating different type media streams for a multimedia service, such as a TACMM service. As the wireless device is generating the media streams of the multimedia service (e.g., via cameras, microphones, haptic sensors, etc.), information regarding the media streams of the media service may be available to the wireless device, such as inter-media synchronization requirements, timestamps of different media types aligned to the same clock, UL grant information, etc. As such, the wireless device may autonomously prioritize which media type to send in the UL transmissions and the wireless device may manage inter-media synchronization on the UL. In various embodiments, the wireless device may also manage UL scheduling opportunities to improve key performance indicators (KPIs), such as power consumption, capacity, etc. In some embodiments, a UL scheduler of a base station, such as a gNB, may send requests to a wireless device to advance and/or delay UL packet delivery for various media streams.

In various embodiments, proactive grant allocation by a base station, such as a gNB, may support synchronization in UL transmissions. In various embodiments, a base station, such as a gNB, may proactively allocate UL grants for each different type media stream of a multimedia service, such as TACMM. The proactive grant allocation may be a low latency approach useful for low latency applications. In some embodiments, a wireless device may provide assistance information, such as information including indications of the remaining e2e latency budget or to the PDB, indications of the PDB, and skews between the media streams of the multimedia service. In some embodiments, the base station, such as the gNB, may allocate the UL grants based on the assistance information. For example, the base station, such as the gNB may allocate the timing of the grants according to the e2e latency budget and/or PDB and/or skew. Additionally, the base station may introduce further adjustment to ensure the PDB, e2e latency budget, and/or skew are not violated. In some embodiments in which assistance information is not provided by the wireless device, the wireless device may adjust the skew of the media streams before UL transmission.

In various embodiments, UL grants by a base station to a wireless device for UL transmission of the different type media streams of a multimedia service, such as a TACMM service, may be based on buffer status reports (BSRs). The BSR may be sent by the wireless device for a logical channel group to the base stations, such as the gNB, using a Medium Access Control (MAC) Control Element (CE) on the Physical Uplink Shared Channel (PUSCH) (MAC CE PUSCH). The logical channel group for the media streams may be configured to belong to different groups with different priorities such that the BSR can be sent appropriately. The base station, such as the gNB, may respond with PUSCH resources based on the logical channel priority and the number of bits in the BSR for the associated logical channel group. In some embodiments, assistance information, such as information including indications of the remaining latency budget (e.g., the remaining PDB, the remaining e2e latency budget, etc.), indications of the PDB, and skews between the media streams of the multimedia service, may be indicated in the BSRs.

In various embodiments, configured grants (CGs) may also be used to transmit data from the wireless device to the base station. Configured grants may be periodically configured resources and once configured, the wireless device may send data to the base station periodically. Each stream may be configured as one configured grant (CG) configuration with appropriate parameters, such as periodicity, payload (e.g., modulation and coding scheme (MCS)), etc. The offset between the configurations may be aligned the same as the skew between the media streams.

In various embodiments, scheduling requests (SRs) may be configured to include assistance information, such as information including indications of the remaining latency budget (e.g., the remaining PDB, the remaining e2e latency budget, etc.), indications of the PDB, and skews between the media streams of the multimedia service. For example, SR payloads may be expanded to carry the remaining latency budget, PDB, and/or skew of the media. Upon data for a high priority logical channel enters the wireless device buffer, the wireless device may send an SR over the Physical Uplink Control Channel (PUCCH) and receive allocated UL resources. The UL data may then be sent on the PUSCH and the wireless device may also send a BSR when additional data is still in the buffer.

FIG. 1 illustrates an example of a communications system 100 that is suitable for implementing various embodiments. The communications system 100 may be a 5G New Radio (NR) (5GNR) network, or any other suitable network such as a Long Term Evolution (LTE) network. While FIG. 1 illustrates a 5GNR network, later generation networks may include the same or similar elements. Therefore, the reference to a 5GNR network and 5GNR network elements in the following descriptions is for illustrative purposes and is not intended to be limiting.

The communications system 100 may include a heterogeneous network architecture that includes a core network 140 and a variety of mobile devices (also referred to as user equipment (UE) computing devices) (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices or UE computing devices), and also may be referred to as an NodeB, a Node B, an LTE evolved nodeB (eNB), an Access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted Access by mobile devices with service subscription. A pico cell may cover a relatively small geographic area and may allow unrestricted Access by mobile devices with service subscription. A femto cell may cover a relatively small geographic area (for example, a home) and may allow restricted Access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices (UE computing devices) 120a, 120b, 120c may be dispersed throughout communications system 100, and each wireless device may be stationary or mobile. A wireless device also may be referred to as an Access terminal, a UE, a terminal, a mobile station, a subscriber unit, a station, etc.

A macro base station 110a may communicate with the core network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio Access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication systems 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL Control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio Access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the wireless device 120a and the wireless device 120e) may communicate directly using one or more sidelink channels 124 (for example, without using a base station 110a-110d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a-110d.

Figure 2:
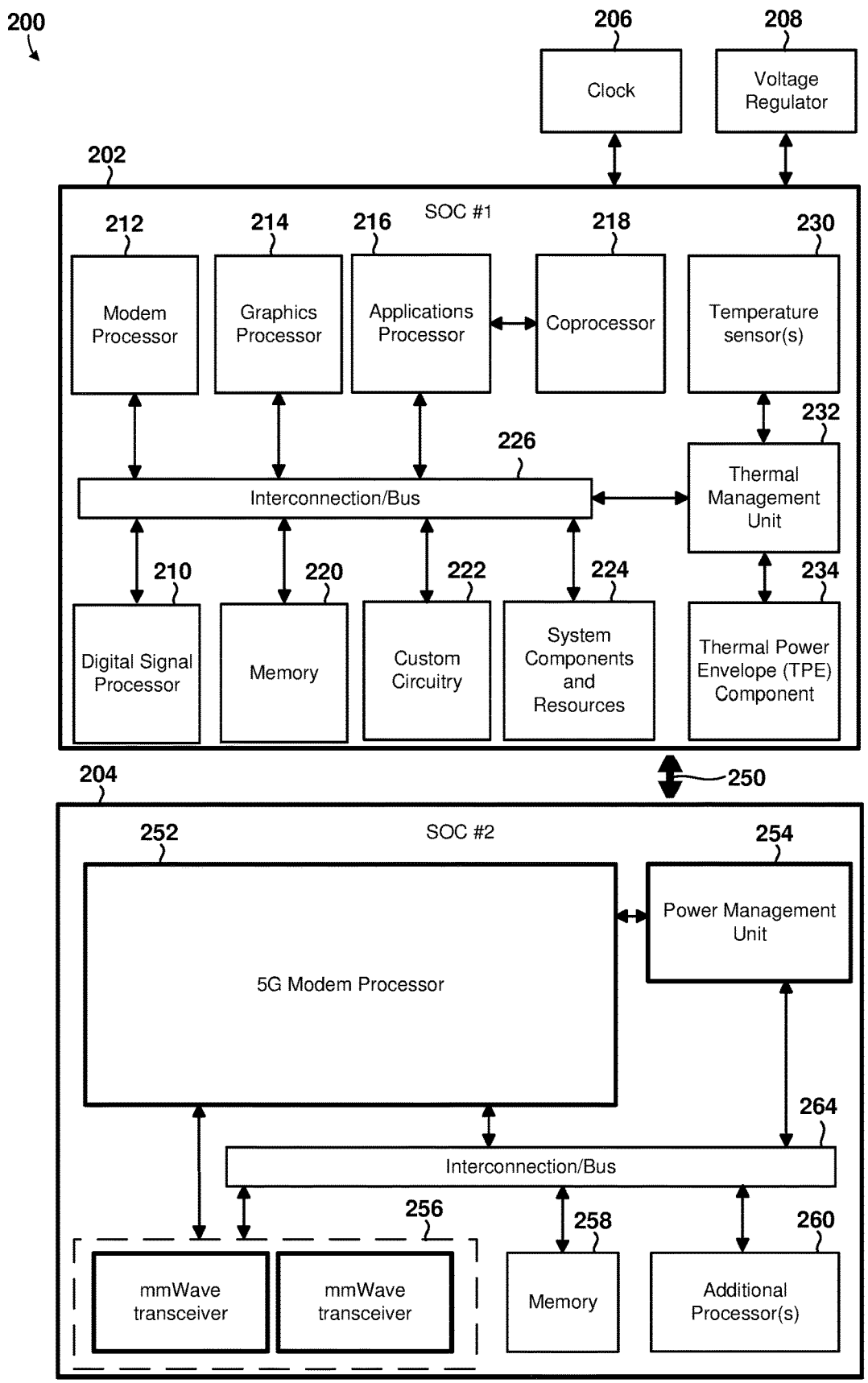
FIG. 2 is a component block diagram illustrating an example computing system and wireless modem suitable for implementing various embodiments.

Various embodiments may be implemented on a number of single processor and multiprocessor computer systems, including a system-on-chip (SOC) or system in a package (SIP). FIG. 2 illustrates an example computing system or SIP 200 architecture that may be used in wireless devices (UE computing devices) implementing the various embodiments.

With reference to FIGS. 1 and 2, the illustrated example SIP 200 includes two SOCs 202, 204, a clock 206, and a voltage regulator 208. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal Management unit 232, and a thermal power envelope (TPE) component 234. The second SOC 204 may include a 5G modem processor 252, a power Management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal Management unit 232 via an interconnection/bus module 226. Similarly, the processor 252 may be interconnected to the power Management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
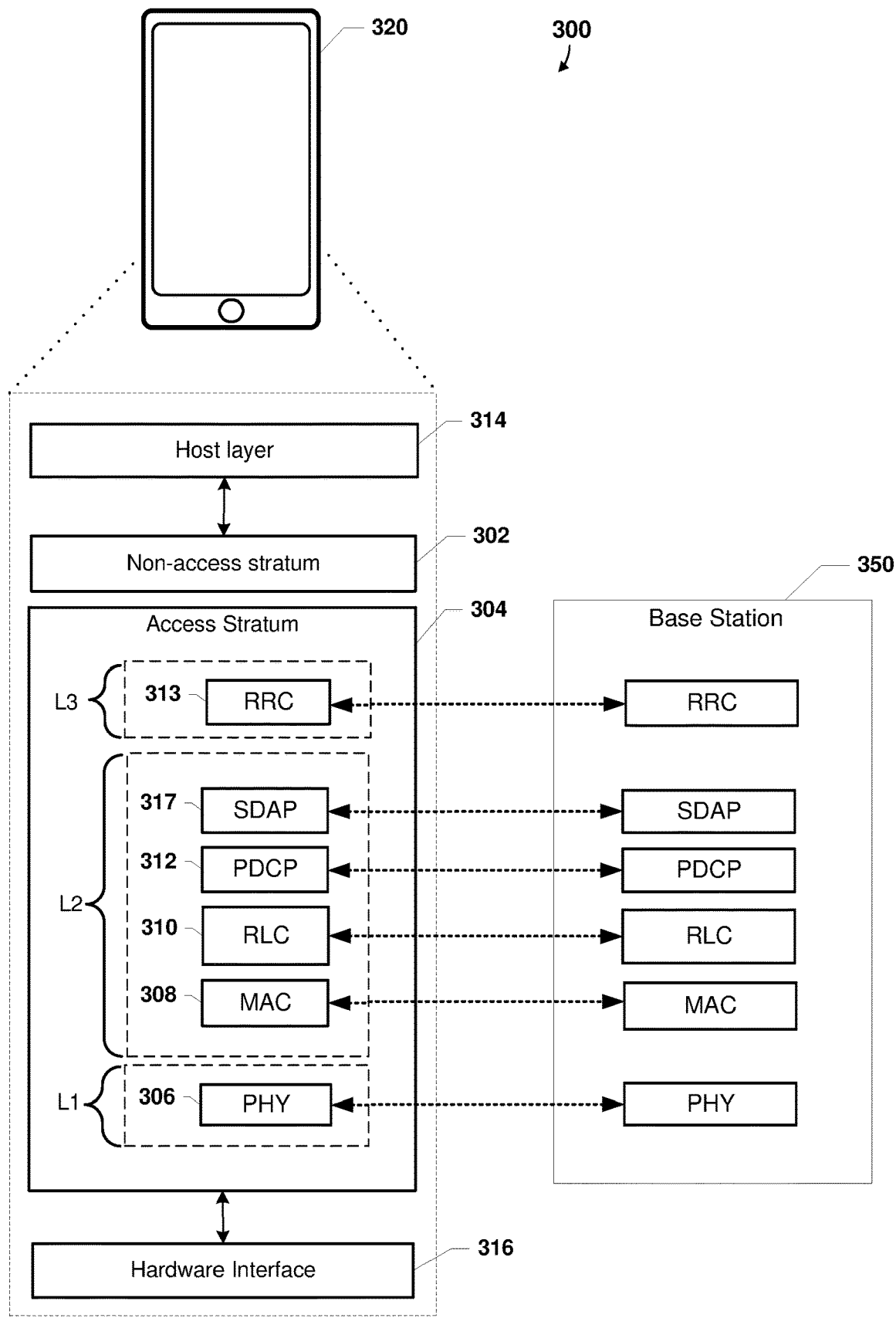
FIG. 3 is a component block diagram illustrating a software architecture including a radio protocol stack for the user and control planes in wireless communications suitable for implementing various embodiments.

FIG. 3 is a component block diagram illustrating a software architecture 300 including a radio protocol stack, also referred to as a wireless protocol stack, for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a-d) of a communication system (e.g., 100). In some embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack (or one wireless protocol stack), in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The PHY layer 306 may include various logical channels, including the Physical Downlink Control Channel (PDCCH) and the Physical Downlink Shared Channel (PDSCH). As an example, the PHY layer 306 may support Channel State Information (CSI) measurements and reporting (e.g., Channel Quality Indicator (CQI) measurements and reporting).

In the user and control planes, Layer 2 (L2) of the AS 304 may be responsible for the link between the wireless device 320 and the base station 350 over the physical layer 306. In the various embodiments, Layer 2 may include a Media Access Control (MAC) sublayer 308, a Radio Link Control (RLC) sublayer 310, a Packet Data Convergence Protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the SDAP sublayer 317 may provide mapping between Quality of Service (QoS) flows and data radio bearers (DRBs). In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor.

In other embodiments, the software architecture 300 may include one or more higher logical layer (e.g., transport, session, presentation, application, etc.) that provide host layer functions. In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
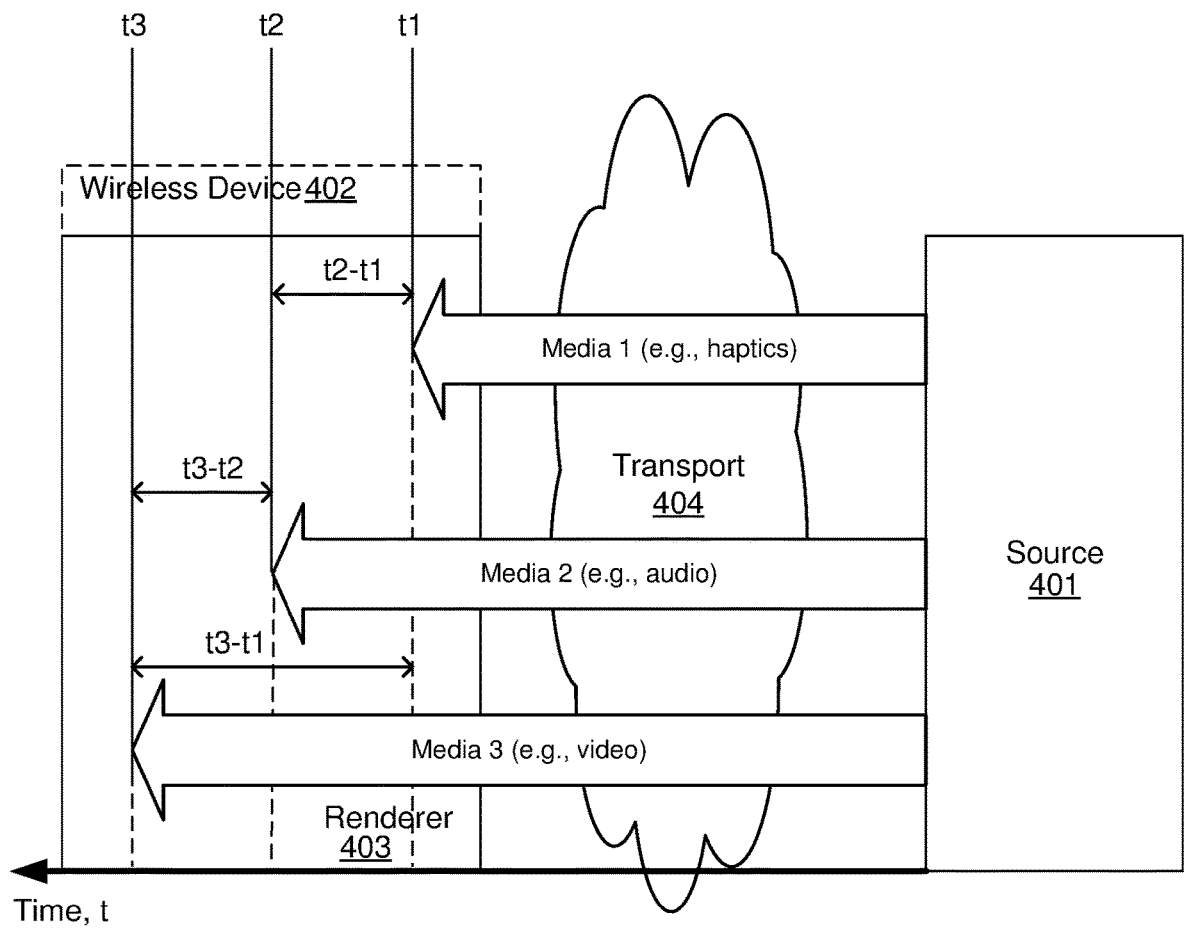
FIG. 4 is a block diagram illustrating inter-media synchronization requirements when rendering media of a multimedia service.

FIG. 4 is a block diagram illustrating inter-media synchronization requirements when rendering media of a multimedia service, such as a TACMM service. With reference to FIGS. 1-4, in the example multimedia service illustrated in FIG. 4, the multimedia service may include three different type media streams, such as a first type media stream "Media 1", a second type media stream "Media 2", and a third type media stream "Media 3". The three different type media streams, (e.g., Media 1, Media 2, Media 3), may carry different type data (e.g., Media 1 may be haptic data, Media 2 may be audio data, and Media 3 may be video data) and/or may have different attributes, such as different payload types (e.g., different RTP payload types, etc.), different port numbers, etc. As a specific example, the example multimedia service illustrated in FIG. 4 may be a TACMM service having a haptic media stream, Media 1, an audio media stream, Media 2, and a video media stream, Media 3.

The multimedia service, such as the TACMM service, may be delivered from a source 401, such as a content server, application server, etc. to a wireless device 402 (e.g., wireless device 120a-120e, 200, 320) via a transport layer 404. The transport layer 404 may be one or more wired and/or wireless networks, such as communications system 100, enabling packets to be sent from the source 401 to the wireless device 402 in the downlink (DL) direction and/or packets to be sent from the wireless device 402 to the source 401 in the uplink (UL) direction. The transport layer 404 may include various types of networks, such as one or more core networks (CNs), one or more radio access networks (RANs), etc., and the transport layer 404 may include various types of network computing devices, such as base stations (e.g., an eNB, a gNB, etc.), Applicant Function (AF) servers, User Plane Function (UPF) servers, Operations, Policy Charging Function (PCF) servers, routers, etc.

The wireless device 402 may include a renderer 403, such as a multimedia application player, such as the TACMM service player, etc., that may receive packets of the various different type media streams of the multimedia service, such as the TACMM service, via the transport layer 404 from the source 401 and may render the different type media streams for output by the various output devices of the wireless device 402, such as speakers, displays, haptic drivers, etc.

The three different type media streams (e.g., Media 1, Media 2, Media 3), may have different e2e latency requirements. For example, haptic data of Media 1 may have a shorter e2e latency requirement than audio data of Media 2 and video data of Media 3. As a specific example, haptic data may have a e2e latency requirement of 25 milliseconds or less, audio data may have a e2e latency requirement of 200 milliseconds or less, and video data may have a e2e latency requirement of 300 milliseconds or less.

In addition to respective e2e latency requirements among the three different type media streams (e.g., Media 1, Media 2, Media 3), there may be inter-media synchronization requirements between the three different type media streams (e.g., Media 1, Media 2, Media 3). For example, to maintain synchronization of the multimedia output, packets relative to the same event (e.g., packets corresponding to the same point in time, such as audio generated from speech corresponding to lip movements of a filmed character in a video (sometimes referred to as audio/video (AV) "lip" sync), such as haptic feedback from an event also generating audio and visible in a camera view in a video game, etc.) should be rendered within a given time of one another, thereby avoiding unacceptable user experience because the skew between the media outputs because user perceptible.

FIG. 4 illustrates example synchronization limits between the three different type media streams (e.g., Media 1, Media 2, Media 3). For example, packets of the three different type media streams (e.g., Media 1, Media 2, Media 3) may be packets corresponding to the same event in time (e.g., intended to playout at the same time in an ideal playout of the multimedia service, such as the TACMM service). The packets of the first media stream, Media 1, may arrive at a first time, t1, packets of the second media stream, Media 2, may arrive at a second time, t2, that may be later in time than t1, and packets of the third media stream, Media 3, may arrive at a third time, t3, that may be later than both t1 and t2. The time between the arrival (at a first time t1) of the Media 1 packet corresponding to the event, and the arrival (at a second time t2) of the Media 2 packet corresponding to the same event may be t2-t1. A synchronization margin (e.g., sync_m2m1) may define the maximum time limit between rendering the Media 1 packet and the Media 2 packet. The time between the arrival (at a second time t2) of the Media 2 packet corresponding to the event, and the arrival (at a third time t3) of the Media 3 packet corresponding to the same event may be t3-t2. A synchronization margin (e.g., sync_m3m2) may define the maximum time limit between rendering the Media 2 packet and the Media 3 packet. The time between the arrival (at a first time t1) of the Media 1 packet corresponding to the event, and the arrival (at a second time t3) of the Media 3 packet corresponding to the same event may be t3-t1. A synchronization margin (e.g., sync_m3m1) may define the maximum time limit between rendering the Media 1 packet and the Media 3 packet.

The synchronization margins (e.g., sync_m2m1, sync_m3m2, sync_m3m1) may define a maximum tolerable skew between the respective packets of different type media streams (e.g., Media 1, Media 2, Media 3) that may be acceptable (or tolerable) in a service, such as a TACMM service. As a specific example, AV "lip" sync requirements between packets of Media 2 and Media 3 when Media 2 is audio data and Media 3 is video data predefined, such as −45 to 15 milliseconds for Advanced Television System Committee (ATSC) compliant television programs, −125 to 45 milliseconds for International Telecommunication Union (ITU) compliant television programs, −22 to 22 milliseconds for films, −100 to 100 milliseconds for videotelephony, etc.

To assist in synchronization of the three different type media streams (e.g., Media 1, Media 2, Media 3) by the renderer 403, the three different type media streams (e.g., Media 1, Media 2, Media 3) may share common timestamps, such as application timestamps, RTP timestamps, etc., aligning the intended rendering timeline of the respective media streams with one another such that packets relative to the same event may be rendered together (or at least rendered within their respective synchronization margins (e.g., sync_m2m1, sync_m3m2, sync_m3m1)). The renderer 403 of the wireless device 402 may synchronize the three different type media streams (e.g., Media 1, Media 2, Media 3), for example by using the timestamps in the media streams, and render the three different type media streams (e.g., Media 1, Media 2, Media 3) to a user of the wireless device 402 together (or at least rendered within their respective synchronization margins (e.g., sync_m2m1, sync_m3m2, sync_m3m1)), thereby outputting the multimedia service, such as the TACMM service.

While timestamps (e.g., application timestamps, RTP timestamps, etc.) in the three different type media streams (e.g., Media 1, Media 2, Media 3) may enable synchronization of the three different type media streams (e.g., Media 1, Media 2, Media 3) prior to rendering, without the transport layer 404 guaranteeing some degree of synchronization in the delivery of packets of the three different type media streams (e.g., Media 1, Media 2, Media 3), the renderer 403 must wait for a slowest media stream before rendering all media streams (e.g., wait for the packet of Media 3 to arrive before rendering the associated packets of Media 2 and Media 1 which arrived earlier). This need to wait for the slowest media type before rendering all of the three different type media streams (e.g., Media 1, Media 2, Media 3) may result in unacceptable e2e delays for more latency-sensitive media types. For example, haptic data of Media 1 may have an e2e latency delay maximum of 25 milliseconds and the transport layer 404 may attempt to ensure delivery to the wireless device 402 of packets of Media 1 in under 25 milliseconds. Video data of Media 3 may have a 300 millisecond e2e latency delay maximum and the transport layer 404 may attempt to ensure delivery to the wireless device 402 of packets of Media 3 in under 300 milliseconds. As such, the renderer 403 may need to wait 300 milliseconds from receiving a haptic data packet of Media 1 before a video data packet of Media 3 is received. While this delay may ensure that the haptic data packet of Media 1 and the corresponding video packet of Media 3 are both received and rendered within their respective synchronization margins (e.g., sync_m2m1, sync_m3m2, sync_m3m1)), the delay caused in holding the rendering of the haptic data packet of Media 1 may be greater than the e2e latency requirement of the haptic data. For example, the up to 300 millisecond delay to allow the video data packet to arrive may delay the rendering of a received haptic data packet by more than 25 milliseconds which may be greater than the haptic data packet's e2e latency requirement of 25 milliseconds. Such delay may reduce skew in the rendering of the multimedia service, such as the TACMM service but cause unacceptable e2e delay in the rendering of one or more media streams of the multimedia service.

Various embodiments provide systems and methods supporting synchronized delivery of packets of different type media streams of a service, such as a TACMM service. Various embodiments enable network assistance of packet synchronization in downlink (DL) and/or uplink (UL) transmissions.

Figure 5A:
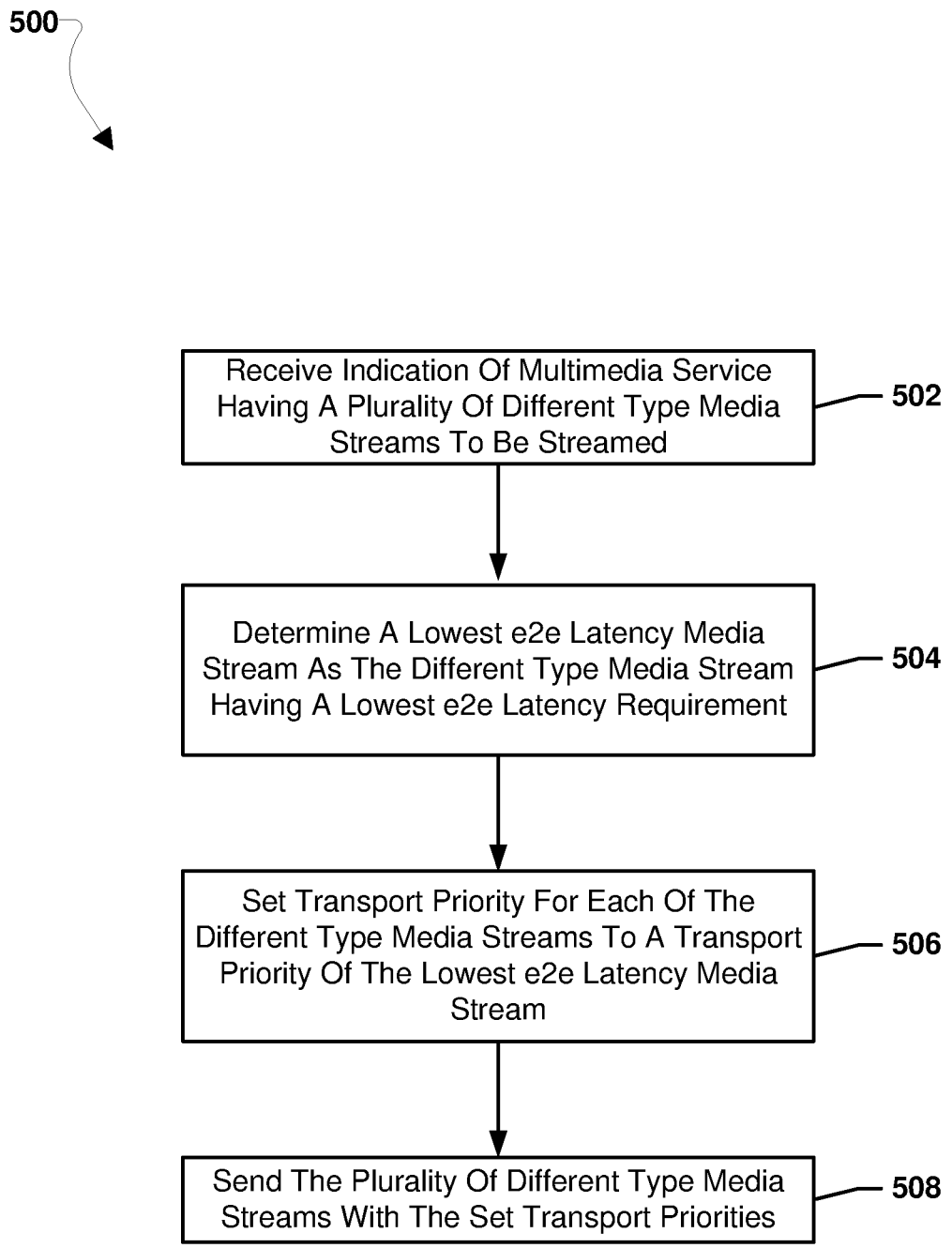
FIG. 5A is a process flow diagram illustrating a method for synchronizing delivery of a multimedia service, in accordance with various embodiments.

FIG. 5A is a process flow diagram illustrating a method 500 for synchronizing delivery of a multimedia service, in accordance with various embodiments. With reference to FIGS. 1-5A, the operations of method 500 may be implemented by a processor (e.g., 210, 212, 214, 216, 218, 252, 260) of a network computing device, such as a content server (e.g., source 401). With reference to FIGS. 1-5A, means for performing each of the operations of method 500 may be one or more processors of a network computing device (e.g., the source 401), such as one or more of the processors 210, 212, 214, 216, 218, 252, 260.

In block 502, the processor may perform operations including receiving an indication of a multimedia service having a plurality of different type media streams to be streamed. For example, the multimedia service may be a TACMM service. The multimedia service may include two or more different type media streams. Each media stream may have different attributes, such as different payload types, different destination ports, different e2e latency requirements, different assigned transport priorities, etc. As a specific example, the multimedia service may include a haptic data media stream, an audio data media stream, and a video data media stream. The indication of the multimedia service may indicate various information associated with the multimedia service and the plurality of different type multimedia services, such as e2e latency requirements for each of the media streams, payload types for the media streams, transport priorities of the media streams, destination ports of the media streams, synchronization margins between different type media streams of the multimedia service, etc. The indication of a multimedia service having a plurality of different type media streams to be streamed may be received in response to a wireless device registering to receive a service.

In block 504, the processor may perform operations including determining a lowest e2e latency media streams as the different type media stream having a lowest e2e latency requirement. For example, the e2e latencies of each of different type media streams may be compared to one another and the media stream having the lowest e2e latency requirement may be determined to be the lowest e2e latency media stream.

In block 506, the processor may perform operations including setting a transport priority for each of different type media streams to a transport priority of the lowest e2e latency media stream. In various embodiments, a transport priority, such as a QoS flow, for each of different type media streams of the multimedia service may be set to the transport priority of the lowest e2e latency stream. In this manner, all transport priorities for all media streams of the multimedia service may be set to the same transport priority, e.g., the transport priority of the media stream with the lowest e2e latency requirement.

In block 508, the processor may perform operations to send the plurality of different type media streams with the set transport priorities. Sending the plurality of different type media streams with the set transport priorities may include sending the packets of the media streams to a transport layer (e.g., transport layer 404) for delivery to a wireless device (e.g., wireless device 120a-120e, 200, 320). The setting of the transport priorities of all media streams of the multimedia service to the priority of the lowest e2e latency requirement media stream may result in all packets of the multimedia service being transported with the same low latency. The setting of the transport priorities of all media streams of the multimedia service to the priority of the lowest e2e latency requirement media stream may result in the different type media streams of the multimedia service arriving at a wireless device at the same, or near same time, as transport resources may be assigned to all the media streams to ensure the same lowest e2e latency requirement is met for all media stream delivery.

Figure 5B:
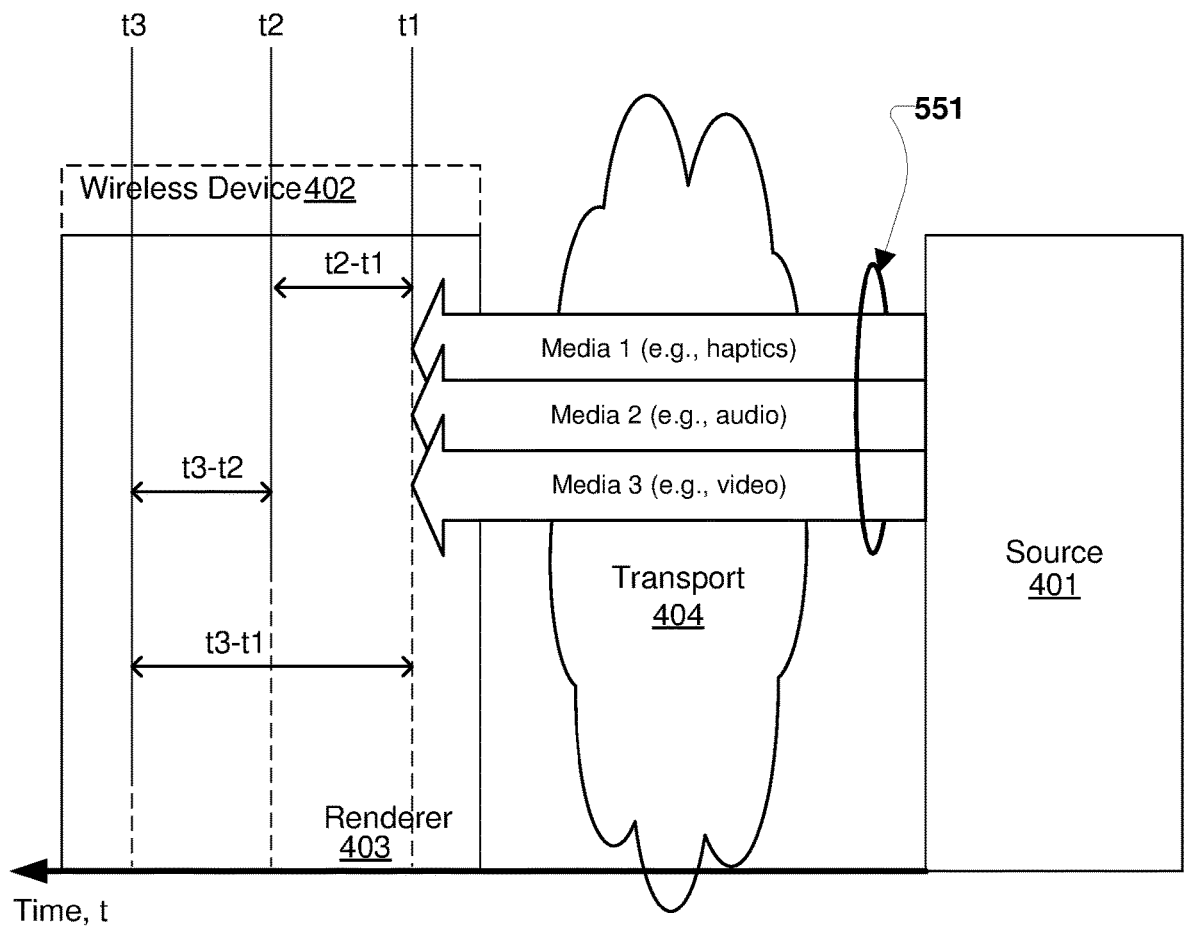
FIG. 5B is a block diagram illustrating an example bundling of different type media streams of a multimedia service in accordance with various embodiments.

FIG. 5B is a block diagram illustrating an example bundling of different type media streams of a multimedia service in accordance with various embodiments. With reference to FIGS. 1-5B, the bundling illustrated in FIG. 5B may be an example of multimedia service delivery according to the operations of method 500 (FIG. 5A). The multimedia service may include three media streams, Media 1, Media 2, and Media 3 as discussed with reference to FIG. 4. As a specific example, the source 401 may determine that the haptic media stream Media 1 has the lowest e2e latency requirement, and may set the transport priority (e.g., same QoS flow) of the other two media streams, Media 2 and Media 3, to the same transport priority (e.g., QoS flow) of Media 1. In this manner, the three different type media streams, Media 1, Media 2, and Media 3, may be grouped into a bundle 551 having the same transport priority. The setting of the same transport priority to all three different type media streams, Media 1, Media 2, and Media 3, may ensure all three different type media streams, Media 1, Media 2, and Media 3, are delivered with the same lowest latency budget handling. The setting of the same transport priority to all three different type media streams, Media 1, Media 2, and Media 3, may cause Media 2 and Media 3 to arrive earlier than would have been required by their respective e2e latency requirements, but may ensure the e2e latency requirement of Media 1 is always met without risking skew occurring between the three different type media streams, Media 1, Media 2, and Media 3.

Figure 6A:
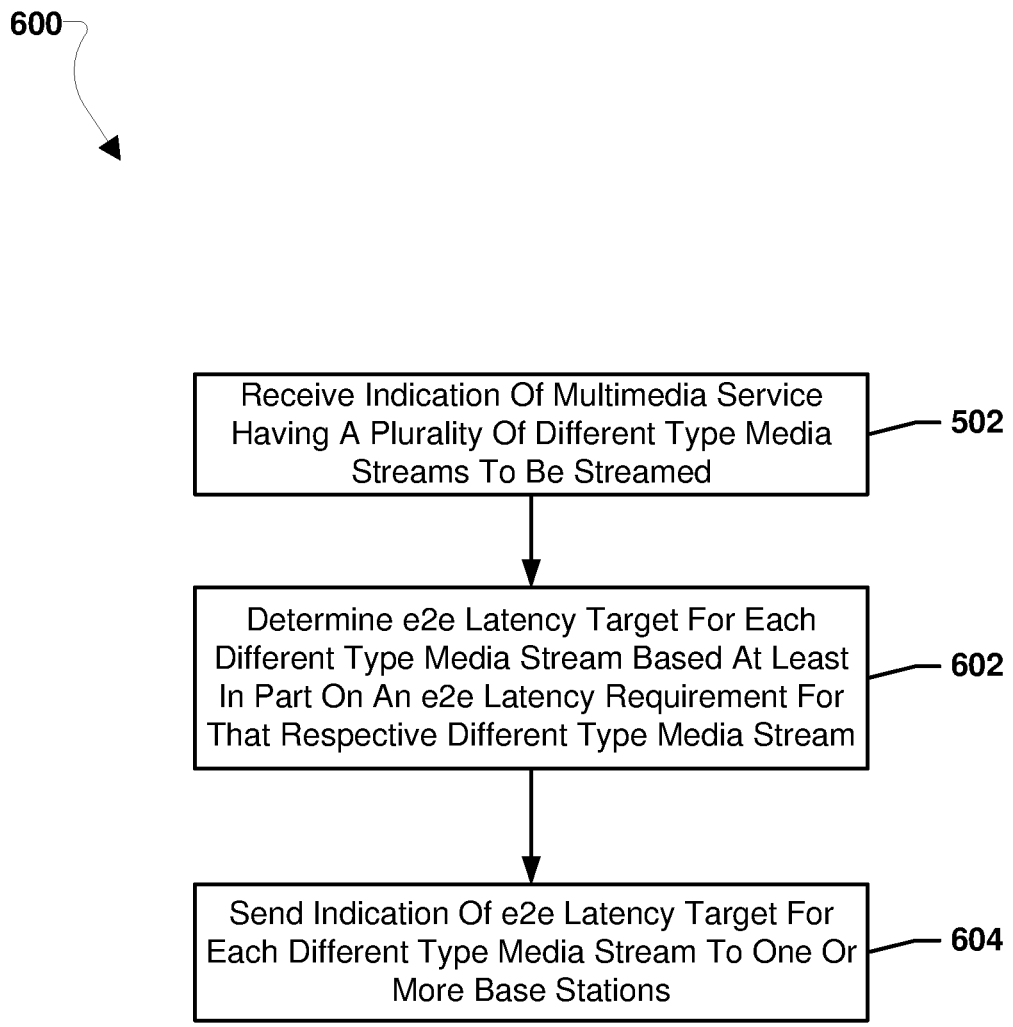
FIG. 6A is a process flow diagram illustrating a method for synchronizing delivery of a multimedia service, in accordance with various embodiments.

FIG. 6A is a process flow diagram illustrating a method 600 for synchronizing delivery of a multimedia service, in accordance with various embodiments. With reference to FIGS. 1-6A, the operations of method 600 may be implemented by a processor (e.g., 210, 212, 214, 216, 218, 252, 260) of a network computing device, such as a content server (e.g., source 401). With reference to FIGS. 1-6A, means for performing each of the operations of method 600 may be one or more processors of a network computing device (e.g., the source 401), such as one or more of the processors 210, 212, 214, 216, 218, 252, 260.

In block 502, the processor may perform operations including receiving an indication of a multimedia service having a plurality of different type media streams as discussed with reference to like numbered block of method 500 (FIG. 5A).

In block 602, the processor may perform operations including determining an e2e latency target for each different type media stream based at least in part on an e2e latency requirement for that respective different type media stream. In various embodiments, an e2e latency target may be a time before which a base station should not delivery, or schedule for delivery, a packet of the media stream to a wireless device. In various embodiments, the e2e latency target may be determined on a per media stream basis. In various embodiments, an e2e latency requirement for a media stream may be determined to account for a reception-to-rendering delay at the wireless device. The e2e latency target for a media stream may be determined such that the e2e latency target may be the same or a shorter time period than the e2e latency requirement of the media stream. In various embodiments, an e2e latency target for a selected media stream may be determined based on a latency target for another media stream and a synchronization margin between the selected media stream and the other media stream. A synchronization margin may define the maximum time limit between rendering a packet of one media stream and rendering a media packet of another media stream. Synchronization margins may define a maximum tolerable skew between the respective packets of different type media streams that may be acceptable (or tolerable) in the multimedia service.

In block 604, the processor may perform operations including sending an indication of the e2e latency target for each different type media stream to one or more base stations. In various embodiments, sending the indications of the e2e latency targets may be part of service establishment between a network computing device (e.g., source 401) and a base station (e.g., base stations 110a-d, 350) communicating with a wireless device (e.g., wireless device 120a-120e, 200, 320, 402) to provision the multimedia service to the wireless device.

Figure 6B:
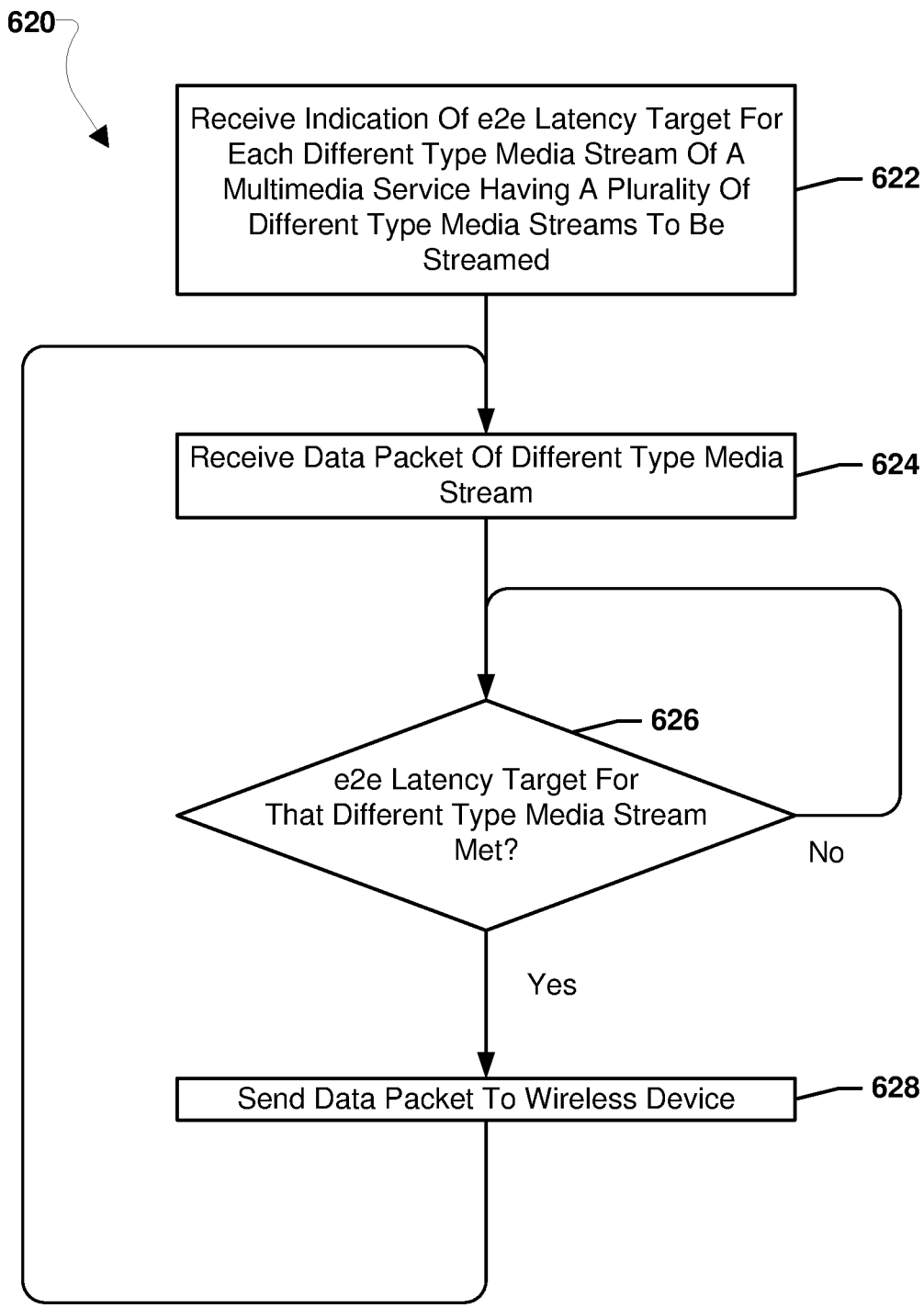
FIG. 6B is a process flow diagram illustrating a method for synchronizing delivery of a multimedia service, in accordance with various embodiments.

FIG. 6B is a process flow diagram illustrating a method 620 for synchronizing delivery of a multimedia service, in accordance with various embodiments. With reference to FIGS. 1-6B, the operations of method 620 may be implemented by a processor (e.g., 210, 212, 214, 216, 218, 252, 260) of a network computing device, such as a base station (e.g., base stations 110a-d, 350). With reference to FIGS. 1-6B, means for performing each of the operations of method 620 may be one or more processors of a network computing device (e.g., the base stations 110a-d, 350), such as one or more of the processors 210, 212, 214, 216, 218, 252, 260. In various embodiments, the operations of method 620 may be performed in conjunction with the operations of method 600 (FIG. 6A).

In block 622, the processor may perform operations including receiving an indication of e2e latency target for each different type media stream of a multimedia service having a plurality of different type media streams to be streamed.

In block 624, the processor may perform operations including receiving a data packet of one of the plurality of different type media streams.

In determination block 626, the processor may perform operations including determining whether the e2e latency target for that different type media stream is met. In various embodiments, an e2e latency target may be a time before which a base station should not delivery, or schedule for delivery, a packet of the media stream to a wireless device. In various embodiments, the base station may hold data packets for a media stream until the e2e latency target is reach and upon the e2e latency target for that media stream being reached, may deliver (or schedule for delivery) the packet to the wireless device.

In response to determining that the e2e latency target is not met (i.e., determination block 626="No"), the processor may continue to hold (or buffer) the data packet until the e2e latency target is met and continue to determine whether the e2e latency target for that different type media stream is met in determination block 626. In this manner, data packets may not be delivered (or scheduled for delivery) earlier than the e2e latency target for their respective media stream.

In response to determining that the e2e latency target is met (i.e., determination block 626="Yes"), the processor may send the data packet to the wireless device (or schedule the packet for delivery to the wireless device) in block 628. In this manner, data packets may not be delivered (or scheduled for delivery) earlier than the e2e latency target for their respective media stream.

In various embodiments, the operations of blocks 624, 626, and 628 may be performed on a per packet basis as packets are received for the multimedia service.

Figure 6C:
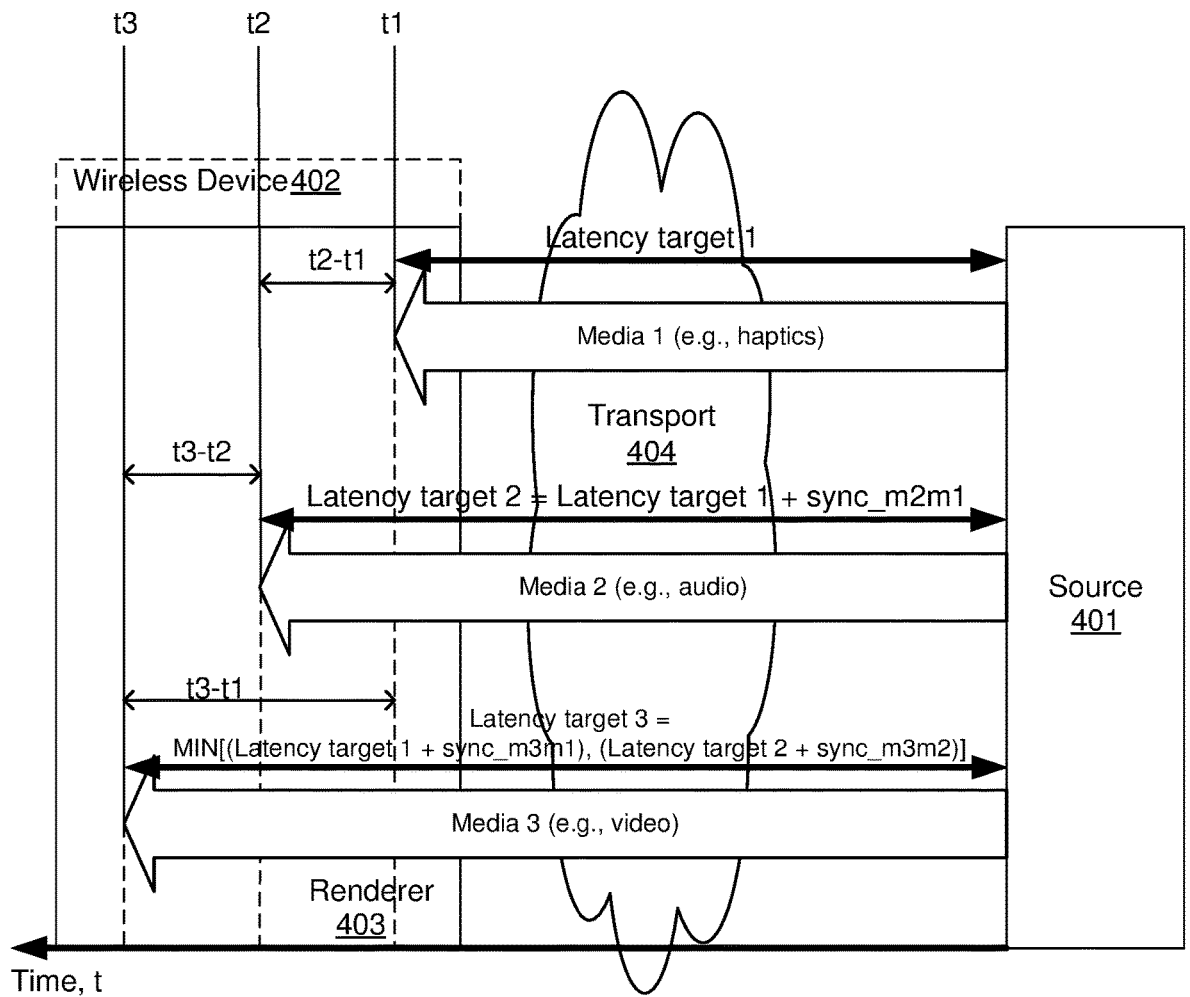
FIG. 6C is a block diagram illustrating an example e2e latency target implementation for a multimedia service in accordance with various embodiments.

FIG. 6C is a block diagram illustrating an example e2e latency target implementation for a multimedia service in accordance with various embodiments. With reference to FIGS. 1-6C, the e2e latency target based delivery illustrated in FIG. 6C may be an example of multimedia service delivery according to the operations of methods 600 (FIG. 6A) and/or 620 (FIG. 6B). The multimedia service may include three media streams, Media 1, Media 2, and Media 3 as discussed with reference to FIG. 4.

As a specific example, FIG. 6C illustrates respective e2e latency targets, Latency target 1, Latency target 2, and Latency target 3, for each respective media stream, Media 1, Media 2, and Media 3. The Latency target 1 for Media 1 may be an e2e latency target configured by the source 401 such that a scheduler, such as a base station (e.g., a gNB), does not delivery haptic data packets of Media 1 earlier than the Latency target 1. The Latency target 1 for Media 1 may be determined to account for a reception-to-rendering delay of haptic data packets at the wireless device 402. The Latency target 2 for Media 2 may be an e2e latency target configured by the source 401 such that a scheduler, such as a base station (e.g., a gNB), does not delivery audio data packets of Media 2 earlier than the Latency target 2. The Latency target 2 for Media 2 may be determined to account for a reception-to-rendering delay of audio data packets at the wireless device 402. The Latency target 2 may be based at least in part on the Latency target 1 and the synchronization margin (e.g., sync_m2m1) between Media 1 and Media 2. Specifically, the Latency target 2 may be the sum of the Latency target 1 and the sync_m2m1. The Latency target 3 for Media 3 may be an e2e latency target configured by the source 401 such that a scheduler, such as a base station (e.g., a gNB), does not delivery video data packets of Media 3 earlier than the Latency target 3. The Latency target 3 for Media 3 may be determined to account for a reception-to-rendering delay of video data packets at the wireless device 402. The Latency target 3 may be based at least in part on the Latency target 1 and the synchronization margin (e.g., sync_m3m1)

between Media 3 and Media 1 and/or the based at least in part on the Latency target 2 and the synchronization margin (e.g., sync_m3m2) between Media 3 and Media 2. Specifically, the Latency target 3 may be the smaller of either the sum of the Latency target 1 and the sync_m3m1 or the sum of the Latency target 2 and the sync_m3m2. This may result in some range in which delivery earlier than the e2e latency requirement for Media 3 may be acceptable.

Figure 7:
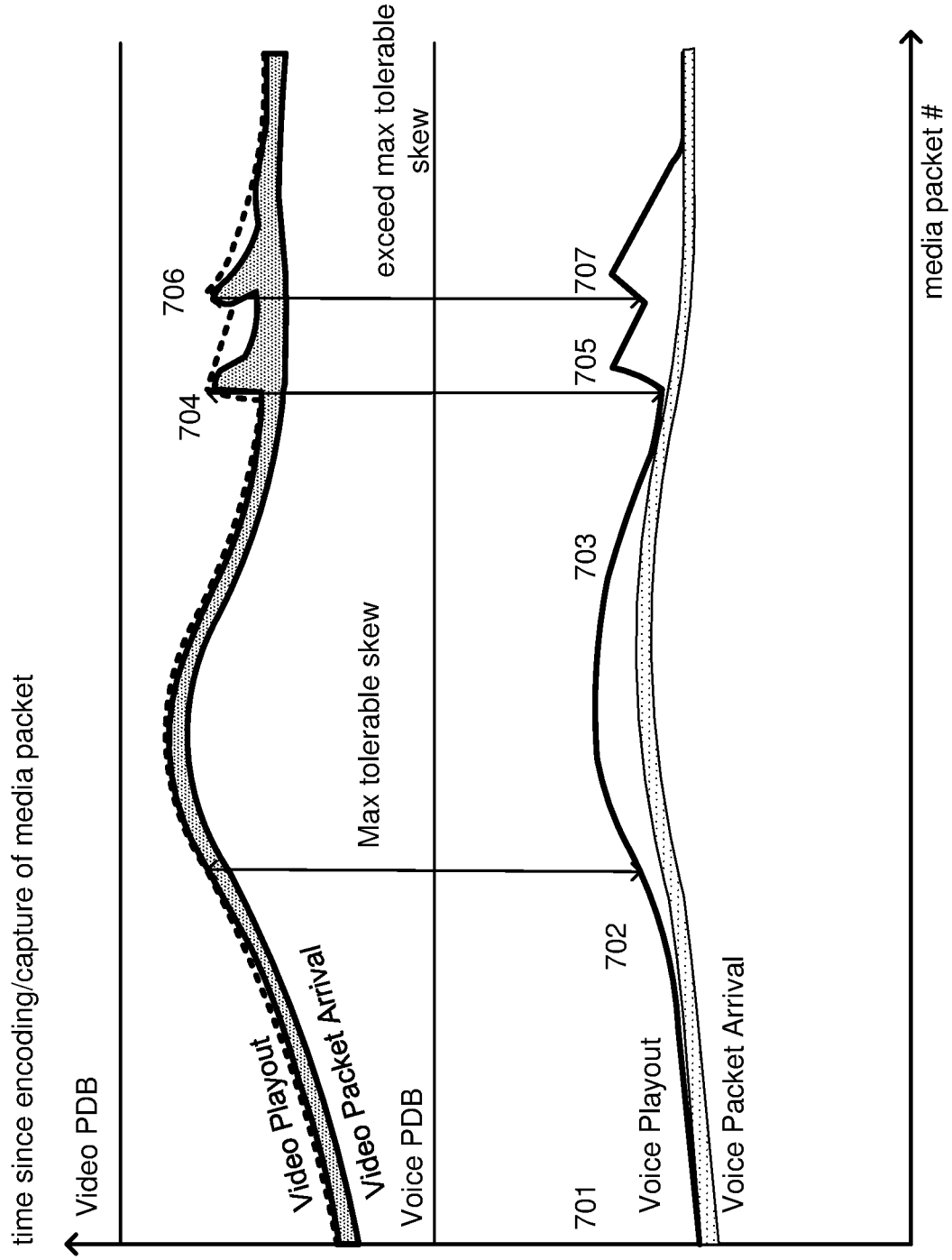
FIG. 7 is a graph of example video packet arrival and playout and audio packet arrival and playout for a multimedia service on a wireless device.

FIG. 7 is a graph of example video packet arrival and playout and audio packet arrival and playout for a multimedia service on a wireless device. With reference to FIGS. 1-7, the graph in FIG. 7 shows time since encoding/capture of the media packets (e.g., the video and audio (specifically voice packets as discussed with reference to FIG. 7)) by a wireless device (e.g., wireless device 120a-120e, 200, 320, 402) along the y-axis and media packet number along the x-axis. Video packet arrival is graphed along with video playout. Similarly, voice packet arrival is graphed along with voice packet playout. The video PDB and the audio (or voice) PDB are also shown.

As illustrated at region 701 of the graph, on the wireless device, the voice playout is controlled by an adaptive de-jitter buffer (DJB) to determine voice playout time, balancing between minimizing playout delay and avoiding having to time-warp playout if packets arrive later than its chosen playout target. The video playout uses a similar DJB which can operate independently of the voice DJB as long as the video playout is within the max tolerable skew (lip-synch) relative to the voice.

As illustrated at region 702 of the graph, if the video delivery gradually starts to become delayed enough to cause the video playout to exceed the max tolerable skew, such information can be given to the voice renderer/DJB to slowly increase its playout delay (time-warp) to maintain acceptable synchronization with the video. This can work when the variations in transport latency are gradual.

As illustrated at region 703 of the graph, as the video delivery latency reduces, the voice playout can be tightened, improving the user experience.

However, if the variation in packet delays are fast then there could be the following events that occur which may result in unsynchronized delivery and/or rendering. As illustrated at region 704 of the graph, if the transport latency for video suddenly spikes, then the skew can exceed the max tolerable value as the corresponding voice packet has already been played out earlier. As illustrated at region 705 of the graph, the voice renderer can try to delay the playout to wait for subsequent delayed video packets. But this adjustment should be done gradually to minimize artefacts in the voice playout. If so, the loss of synch could persist for a few frames/packets. Regions 706 and 707 illustrate a similar scenario in which the spike in video packet delivery causes loss of synchronization.

Figure 8A:
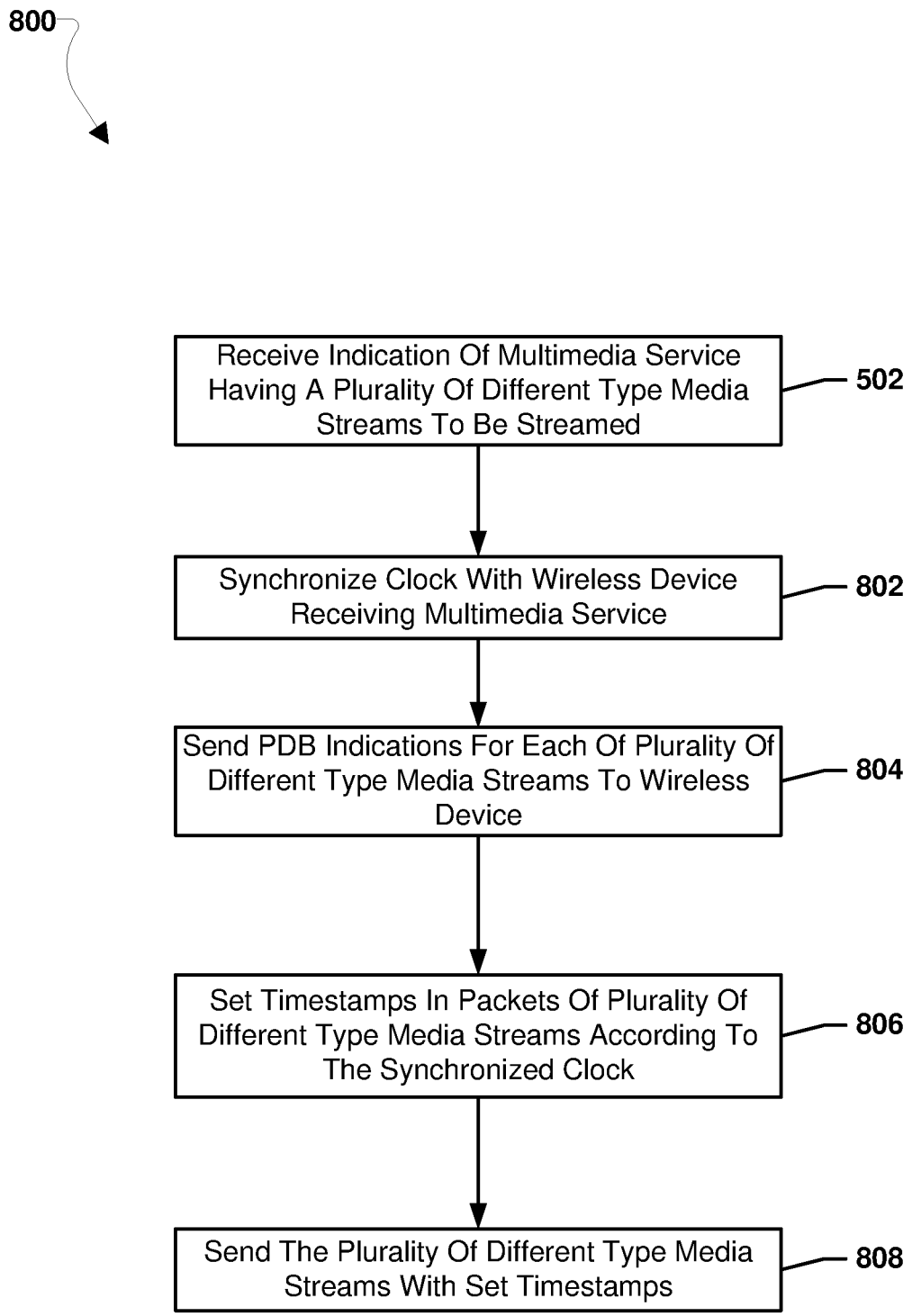
FIG. 8A is a process flow diagram illustrating a method for synchronizing delivery of a multimedia service, in accordance with various embodiments.

Various embodiments may reduce the risk of loss of synchronization, specifically reducing the risk of loss of synchronization when packet delays are relatively fast. Various embodiments may enable delivery of packets prior to a target associated with a packet delay budget (PDB). Delivery of packets prior to a target associated with a PDB may improve capacity for delivery of a multimedia service, such as a TACMM service. A packet delay budget (PDB) is a requirement to deliver a packet within a timeframe. The PDB may set a maximum time by which a packet must be delivered to a wireless device. While PDB sets a maximum time, packets may be delivered earlier than the PDB FIG. 8A is a process flow diagram illustrating a method 800 for synchronizing delivery of a multimedia service, in accordance with various embodiments. With reference to FIGS. 1-8A, the operations of method 800 may be implemented by a processor (e.g., 210, 212, 214, 216, 218, 252, 260) of a network computing device, such as a content server (e.g., source 401). With reference to FIGS. 1-8A, means for performing each of the operations of method 800 may be one or more processors of a network computing device (e.g., the source 401), such as one or more of the processors 210, 212, 214, 216, 218, 252, 260.

In block 502, the processor may perform operations including receiving an indication of a multimedia service having a plurality of different type media streams as discussed with reference to like numbered block of method 500 (FIG. 5A).

In block 802, the processor may perform operations including synchronizing a clock with a wireless device receiving the multimedia service. In various embodiments, a wireless device and the network computing device sending the packets of the multimedia service may synchronize clocks with one another. For example, the wireless device and network computing device may exchange timing information according to various synchronization protocols to establish a synchronized common clock at both the wireless device and network computing device.

In block 804, the processor may perform operations including sending PDB indication for each of the plurality of different type media streams to the wireless device. In various embodiments, a PDB, such as a transport PDB, for each media stream of the multimedia service may be set to meet the e2e latency requirement for that media stream.

In block 806, the processor may perform operations including setting timestamps in packets of the plurality of different type media streams according to the synchronized clock. In various embodiments, synchronized timestamps, such as synchronized application timestamps, RTP timestamps, etc. may be used to indicate when the packets were sent from the network computing device to the wireless device.

In block 808, the processor may perform operations including sending the plurality of different type media streams with the timestamps to the wireless device. In various embodiments, synchronized timestamps, such as synchronized application timestamps, RTP timestamps, etc. may be used between a network computing device sending packets of a multimedia service and a wireless device receiving packets of the service to determine the experienced e2e delay for each packet.

Figure 8B:
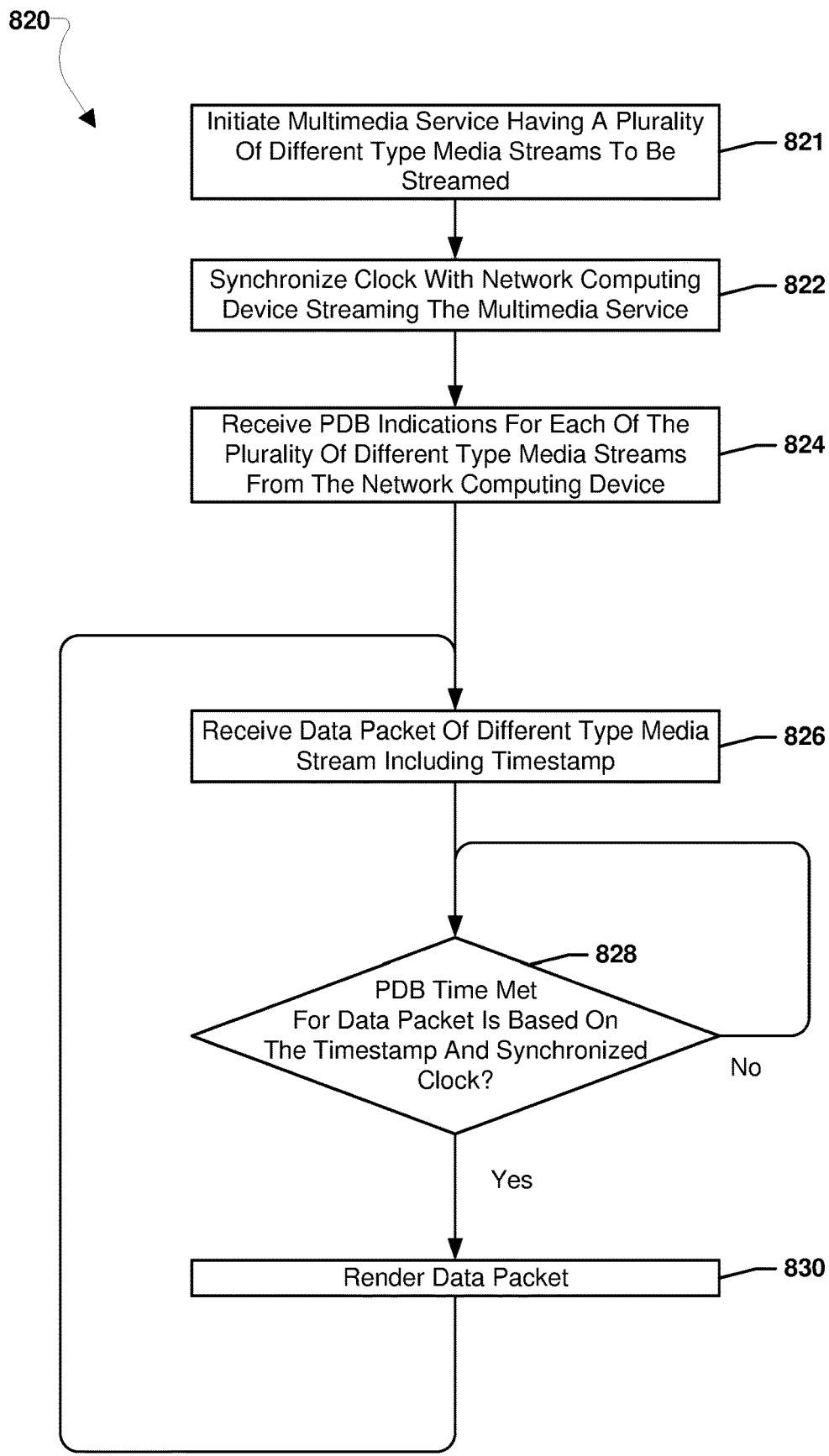
FIG. 8B is a process flow diagram illustrating a method for synchronizing delivery of a multimedia service, in accordance with various embodiments.

FIG. 8B is a process flow diagram illustrating a method 820 for synchronizing delivery of a multimedia service, in accordance with various embodiments. With reference to FIGS. 1-8B, the operations of method 820 may be implemented by a processor (e.g., 210, 212, 214, 216, 218, 252, 260) of a wireless device (e.g., wireless device 120a-120e, 200, 320, 402). With reference to FIGS. 1-8B, means for performing each of the operations of method 820 may be one or more processors of a wireless device (e.g., the wireless device 120a-120e, 200, 320, 402), such as one or more of the processors 210, 212, 214, 216, 218, 252, 260. In various embodiments, the operations of method 820 may be performed in conjunction with the operations of method 800 (FIG. 8A).

In block 821, the processor may perform operations including initiating a multimedia service having a plurality of different type media streams to be streamed. For example, the processor may send a request to register for the multimedia service to a network computing device (e.g., a content server, such as source 401).

In block 822, the processor may perform operations including synchronizing a clock with a network computing device streaming the multimedia service. In various embodiments, a wireless device and the network computing device sending the packets of the multimedia service may synchronize clocks with one another. For example, the wireless device and network computing device may exchange timing information according to various synchronization protocols to establish a synchronized common clock at both the wireless device and network computing device.

In block 824, the processor may perform operations including receiving PDB indications for each of the plurality of different type media streams from the network computing device. In various embodiments, a PDB, such as a transport PDB, for each media stream of the multimedia service may be set to meet the e2e latency requirement for that media stream. In various embodiments, the PDB, such as the transport PDB, may be indicated to the wireless device.

In block 826, the processor may perform operations including receiving a data packet of one of the plurality of different type media streams including a timestamp. The timestamp may be a timestamp applied by a network computing device according to a synchronized clock at the network computing device synchronized with the clock at the wireless device.

In determination block 828, the processor may perform operations including determining whether the PDB time is met for the data packet based on the timestamp and the synchronized clock at the wireless device. In various embodiments, a PDB, such as a transport PDB, for each media stream of the multimedia service may be set to meet the e2e latency requirement for that media stream. In various embodiments, the wireless device may only render a media packet when the time between the timestamp and the current clock time of the synchronized clock at the wireless device indicates the time since sending of the packet has reached the PDB, such as the transport PDB. In various embodiments, the wireless device may hold data packets for a media stream until the PDB is reached and upon the PDB for that media stream being reached, may render the packet. The delayed rendering of the packet may support early delivery of the packet by a base station (e.g., a gNB) to a wireless device as early delivered packets may be held until their PDB is reached.

In response to determining that the PDB is not met (i.e., determination block 828="No"), the processor may continue to hold (or buffer) the data packet until the PDB is met and continue to whether the PDB time is met for the data packet based on the timestamp and the synchronized clock at the wireless device in determination block 828. In this manner, data packets may not be rendered earlier than the PDB for their respective media stream.

In response to determining that the PDB is met (i.e., determination block 828="Yes"), the processor may render the data packet in block 830. In this manner, data packets may not be rendered earlier than the PDB for their respective media stream.

In various embodiments, the operations of blocks 826, 828, and 830 may be performed on a per packet basis as packets are received for the multimedia service.

Figure 8C:
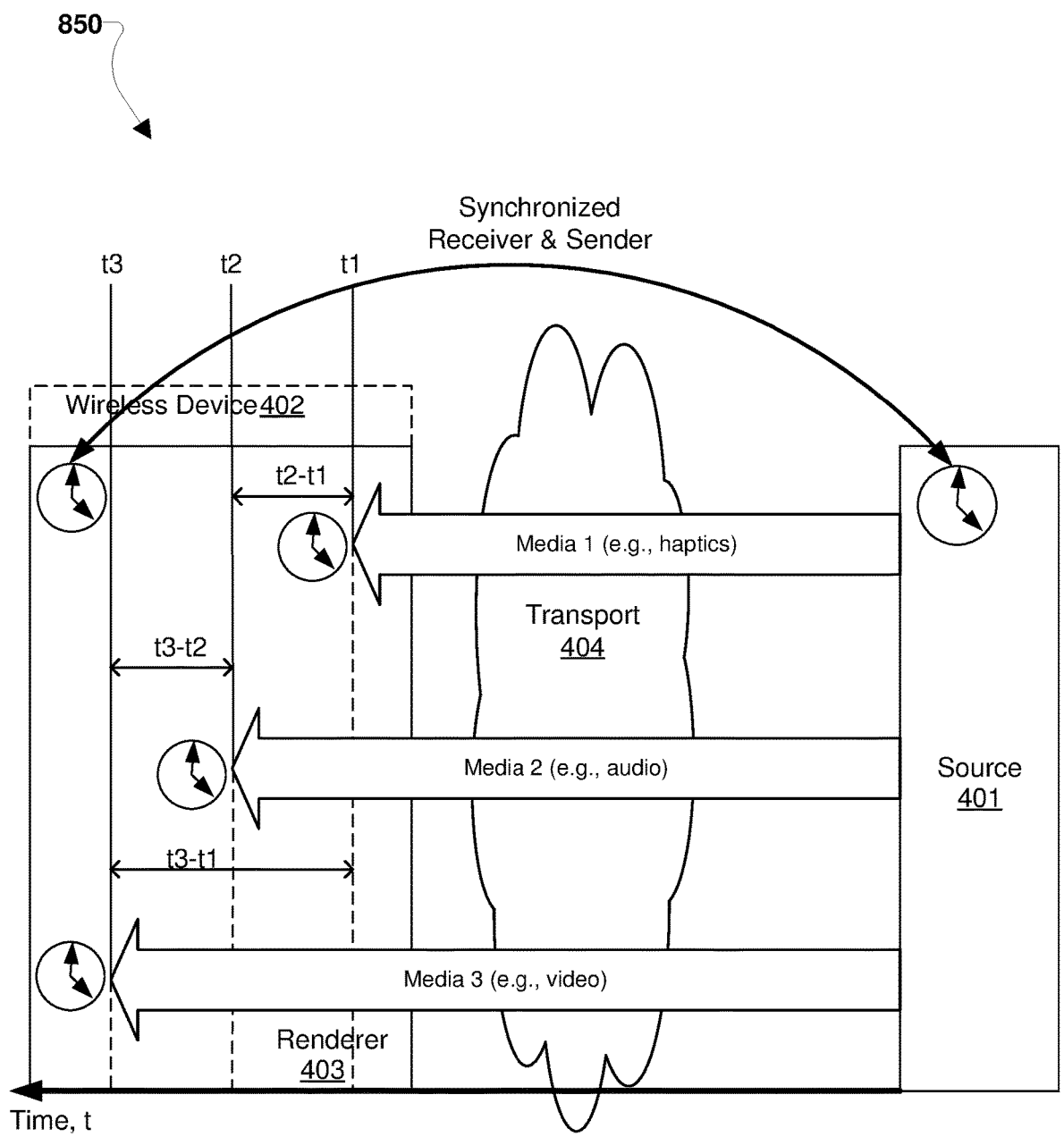
FIG. 8C is a block diagram illustrating an example synchronized receiver and sender implementation for a multimedia service in accordance with various embodiments.

FIG. 8C is a block diagram illustrating an example synchronized receiver and sender implementation 850 for a multimedia service in accordance with various embodiments. With reference to FIGS. 1-8C, the synchronized receiver and sender behavior illustrated in FIG. 8C may be an example of multimedia service delivery according to the operations of methods 800 (FIG. 8A) and/or 820 (FIG. 8B). The multimedia service may include three media streams, Media 1, Media 2, and Media 3 as discussed with reference to FIG. 4.

As a specific example, FIG. 8C illustrates that the clocks of the source 401 and wireless device 402 may be synchronized. Respective transport PDBs for each respective media stream, Media 1, Media 2, and Media 3 may be indicated to the wireless device 402 by the source 401. The transport PDBs may be set to the e2e latency requirements for each respective media stream, Media 1, Media 2, and Media 3. The synchronized timestamps in the media packets sent for each media stream, Media 1, Media 2, and Media 3 may enable the wireless device 402 to determine an actual time since the packet was sent from the source 401. The renderer 403 of the wireless device 402 may be configured to only render media packets of a media stream, Media 1, Media 2, and Media 3, when that media stream's PDB is reached and not earlier than the PDB.

Figure 9A:
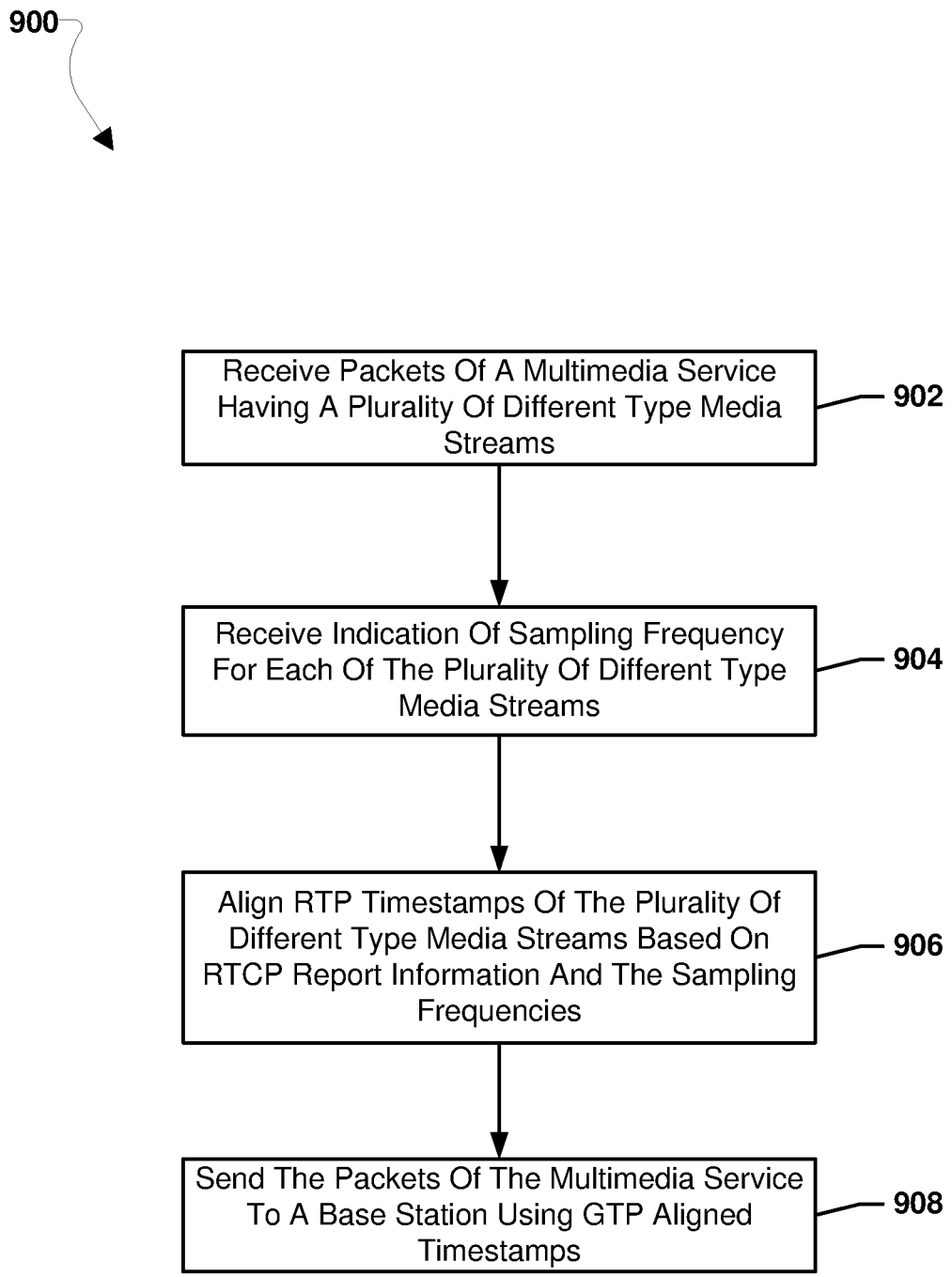
FIG. 9A is a process flow diagram illustrating a method for aligning timestamps of a multimedia service in accordance with various embodiments.

FIG. 9A is a process flow diagram illustrating a method 900 for aligning timestamps of a multimedia service in accordance with various embodiments. With reference to FIGS. 1-9A, the operations of method 900 may be implemented by a processor (e.g., 210, 212, 214, 216, 218, 252, 260) of a network computing device, such as a UPF server. With reference to FIGS. 1-9A, means for performing each of the operations of method 900 may be one or more processors of a network computing device (e.g., a UPF server), such as one or more of the processors 210, 212, 214, 216, 218, 252, 260.

In block 902, the processor may perform operations including receiving packets of a multimedia service having a plurality of different type media streams. In various embodiments, a UPF server may receive RTP timestamped media streams of a multimedia service. The different media streams of the multimedia service may have different sampling rates and may have different initial timestamps.

In block 904, the processor may perform operations including receiving an indication of a sampling frequency for each of the plurality of different type media streams. The sampling frequency (fs) may be indicated to the UPF for each media stream, such as by a Policy and Charging Function (PCF) server, gathering the sampling frequency from the Session Description Protocol (SDP) information for the multimedia service.

In block 906, the processor may perform operations including aligning RTP timestamps of the plurality of different media streams based on RTCP report information and the sampling frequencies. In various embodiments, the UPF server may use RTCP report information associated with the different type media streams of the multimedia service and the sampling frequency to align the RTP timestamps of the different type media streams. For example, the timestamp offset between the different type media streams of the multimedia service may be determined and the RTP timestamps may be aligned based on the timestamp offsets.

In block 908, the processor may perform operations including sending the packets of the multimedia service to a based station, such as a gNB, using GTP aligned timestamps. With the RTP timestamps aligned, as the packets of the multimedia service are sent to a base station, such as a gNB, using GTP aligned timestamps. For example, GTP aligned timestamps may be inserted into the GTP packets to enable the gNB to maintain the alignment of the packets of the multimedia service.

Figure 9B:
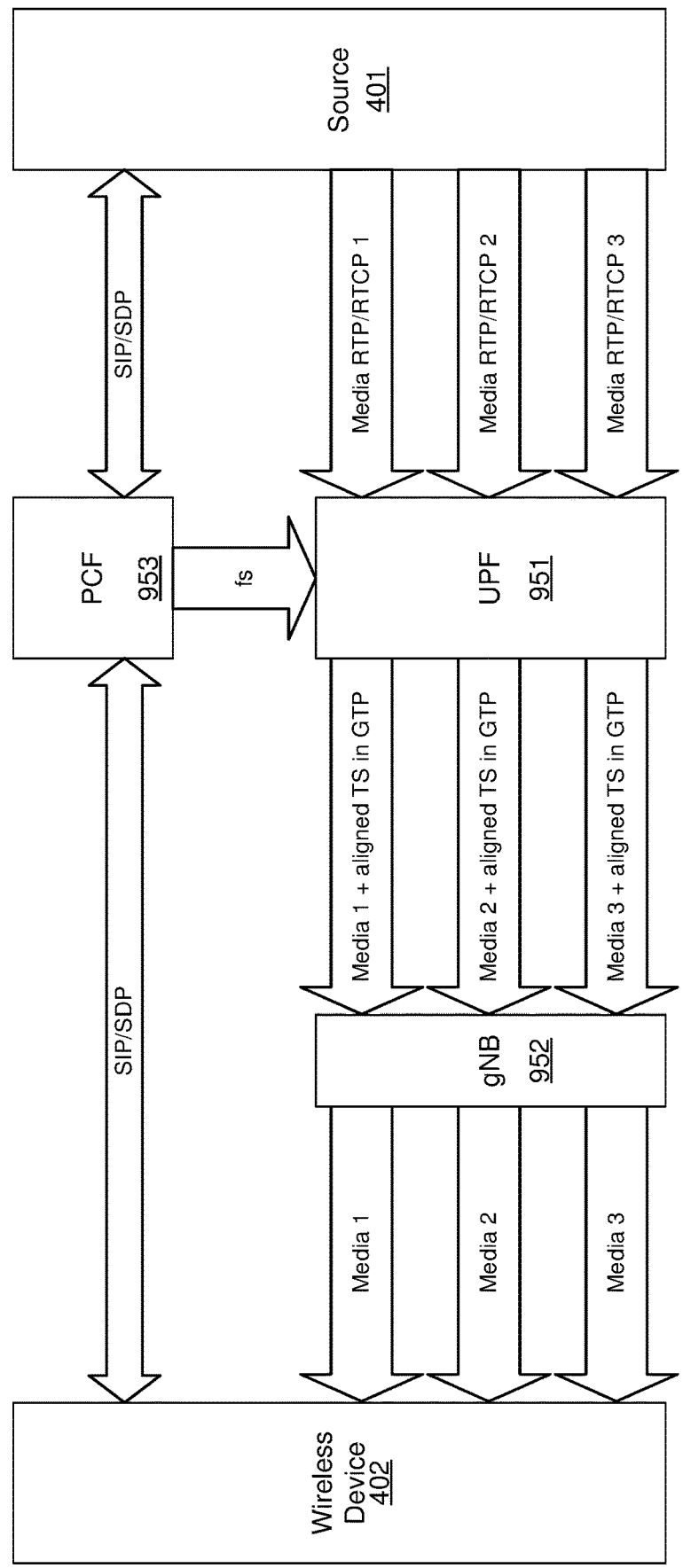
FIG. 9B is a block diagram illustrating an example implementation of downlink (DL) synchronization in accordance with various embodiments.

FIG. 9B is a block diagram illustrating an example implementation of downlink (DL) synchronization in accordance with various embodiments. With reference to FIGS.

1-9B, FIG. 9B illustrates interactions between various devices in a communications system, such as communications system 100, according to various embodiments to use GTP aligned timestamps to ensure alignment of packets of a multimedia service by a base station, such as gNB 952 (e.g., base stations 110*a-d*, 350). The multimedia service may include three media streams, Media 1, Media 2, and Media 3 as discussed with reference to FIG. 4. FIG. 9B illustrates example DL synchronization implemented according to the operations of methods 900 (FIG. 9A). FIG. 9B illustrates interactions of the wireless device 402, source 401, gNB 952, UPF server 951, and PCF server 953 according to the Multimedia Telephony Service for IP Multimedia Subsystem (IMS) (MTSI) model. RTP/RTCP may be used to transport data packets from the source 401 to the UPF server 951. GTP may be used to transport data packets from the UPF server 951 to the gNB 952. Session Initiation Protocol (SIP) messages and/or SDP data may be exchanged between the wireless device 402, PCF server 953, and/or source 401.

As a specific example, FIG. 9B illustrates that Media 1, Media 2, and Media 3 may be sent from the source 401 to the UPF server 951 as RTP/RTCP packets having RTP timestamps and including RTCP report information. The different media streams, Media 1, Media 2, and Media 3, of the multimedia service may have different sampling rates and may have different initial timestamps. The sampling frequency (fs) may be indicated to the UPF server 951 for each media stream Media 1, Media 2, and Media 3 by the PCF server 953. The sampling frequency (fs) may be from the SDP information for the multimedia service. The UPF server 951 may use RTCP report information associated with the media streams, Media 1, Media 2, Media 3, and their respective sampling frequencies to align the RTP timestamps of the different type media streams, Media 1, Media 2, Media 3. For example, the timestamp offset between the different type media streams of the multimedia service may be determined and the RTP timestamps may be aligned based on the timestamp offsets. With the RTP timestamps aligned, as the packets of the multimedia service may be sent to the gNB 952 using GTP aligned timestamps inserted into the GTP packets to enable the gNB 952 to maintain the alignment of the packets of the multimedia service.

Figure 10A:
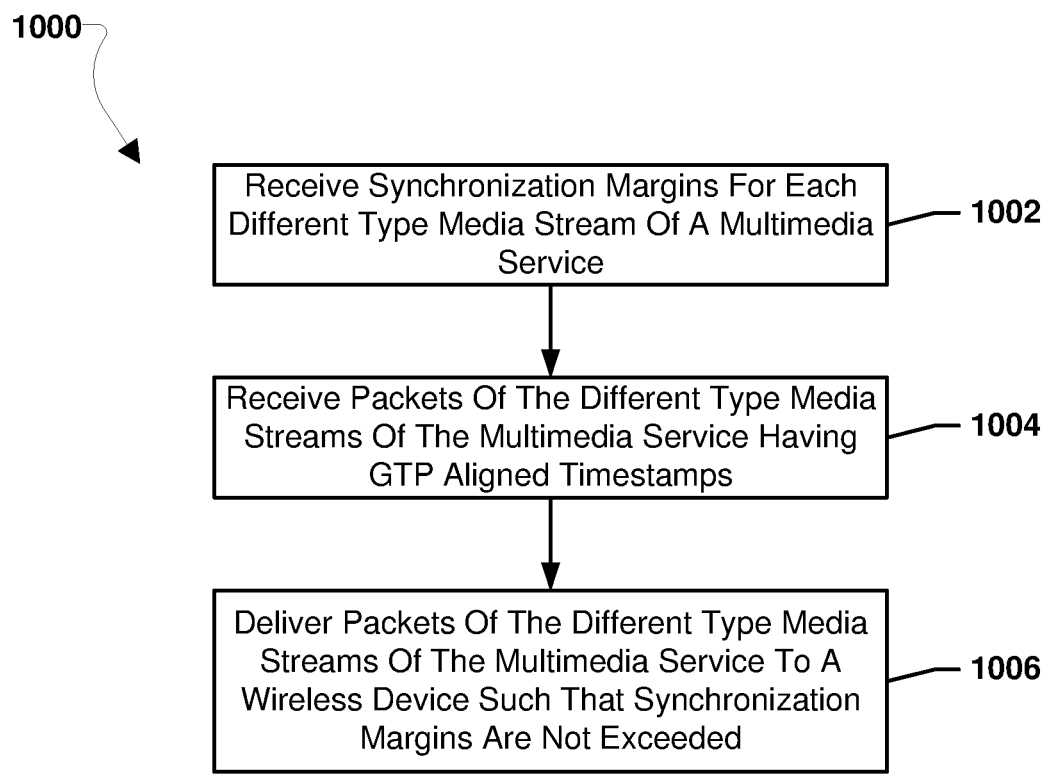
FIG. 10A is a process flow diagram illustrating a method for synchronizing delivery of a multimedia service, in accordance with various embodiments.

FIG. 10A is a process flow diagram illustrating a method for synchronizing delivery of a multimedia service, in accordance with various embodiments. With reference to FIGS. 1-10A, the operations of method 1000 may be implemented by a processor (e.g., 210, 212, 214, 216, 218, 252, 260) of a network computing device, such as a base station (e.g., base stations 110*a-d*, 350). With reference to FIGS. 1-10A, means for performing each of the operations of method 1000 may be one or more processors of a network computing device (e.g., the base stations 110*a-d*, 350), such as one or more of the processors 210, 212, 214, 216, 218, 252, 260. In various embodiments, the operations of method 1000 may be performed in conjunction with the operations of method 900 (FIG. 9A).

In block 1002, the processor may perform operations including receiving synchronization margins for each different type media stream of the multimedia service.

In block 1004, the processor may perform operations including receiving packets of the different type media streams of the multimedia service having GTP aligned timestamps.

In block 1006, the processor may perform operations including delivering the packets of the different type media streams of the multimedia service to a wireless device such that the synchronization margins are not exceeded.

Figure 10B:
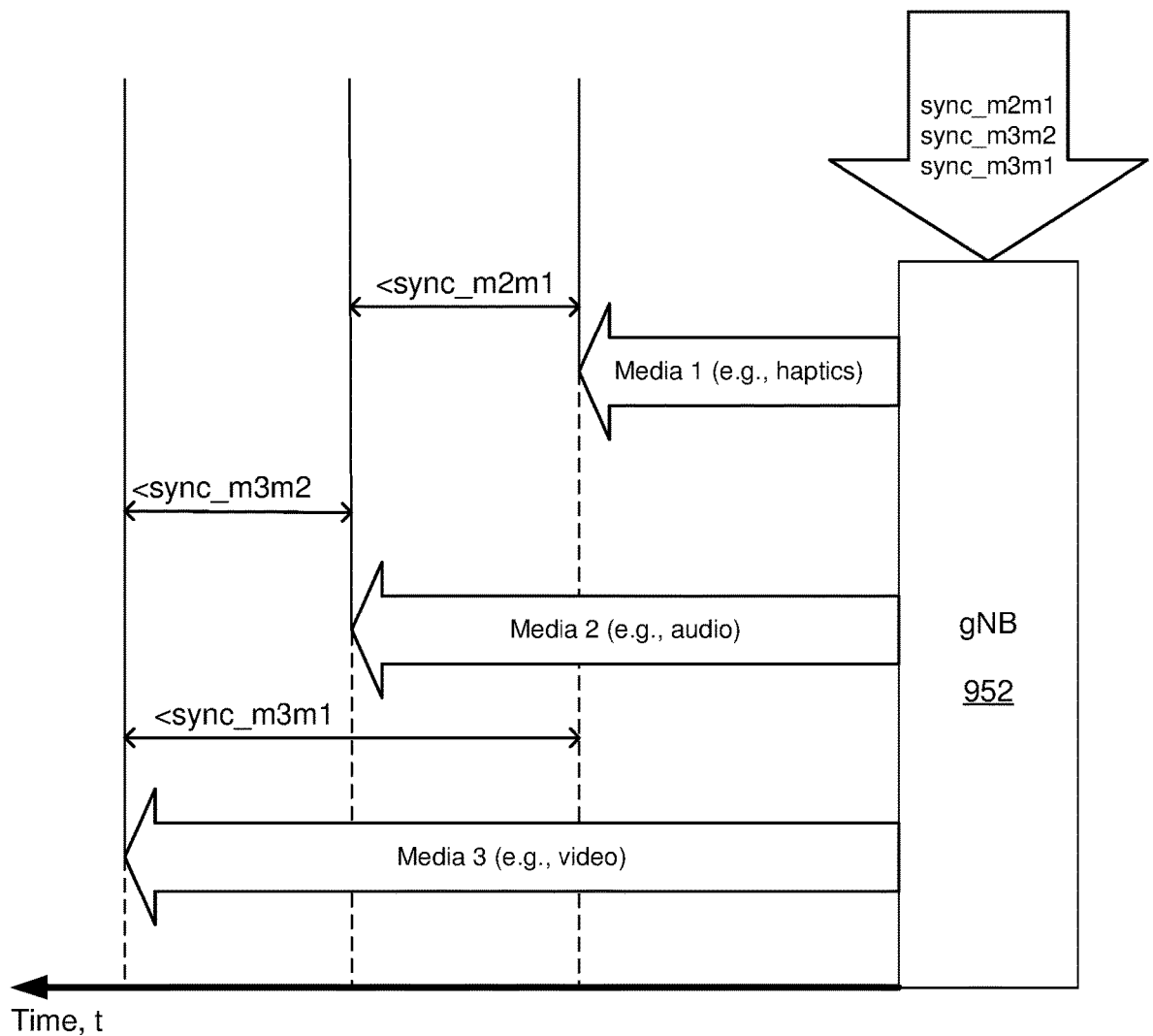
FIG. 10B is a block diagram illustrating an example base station managed synchronization implementation for a multimedia service in accordance with various embodiments.

FIG. 10B is a block diagram illustrating an example base station managed synchronization implementation for a multimedia service in accordance with various embodiments. With reference to FIGS. 1-10B, FIG. 10B illustrates operations of a gNB 952 to support tolerable inter-media synchronization limits according to various embodiments in which GTP aligned timestamps may be used to provide the media streams, Media 1, Media 2, Media 3, to the gNB 952. For example, GTP aligned timestamps may be implemented as discussed above with reference to FIGS. 9A and 9B. FIG. 10B illustrates an example implementation of base station managed synchronization according to operations of method 1000 (FIG. 10A).

As a specific example, FIG. 10B illustrates the that synchronization margins (e.g., sync_m2m1, sync_m3m2, sync_m3m1) of each media stream, Media 1, Media 2, Media 3, may be indicated to the gNB 952. A scheduler running on the processor of the gNB 952 may control the scheduling and delivery of packets of the multimedia service such the synchronization margins (e.g., sync_m2m1, sync_m3m2, sync_m3m1) are not exceeded. For example, when delivering a packet for Media 1, the lowest latency type data, such as haptic data, the gNB scheduler may search for packets of Media 2 and Media 3 having similar GTP aligned timestamps. The packet of Media 2 may be delivered within the sync_m2m1 limit. The packet of Media 3 may be delivered within the minimum of the sync_m3m2 limit or sync_m3m1 limit In some instances, Media 2 or Media 3 packets may be delivered before Media 1 packets thereby exploiting scheduling opportunities. The gNB scheduler may track relative delivery time across media streams, Media 1, Media 2, and Media 3. The gNB 952 may increase utilization of capacity by making use of intermedia tolerable synchronization range, such as by using the range to choose best delivery times.

Figure 11A:
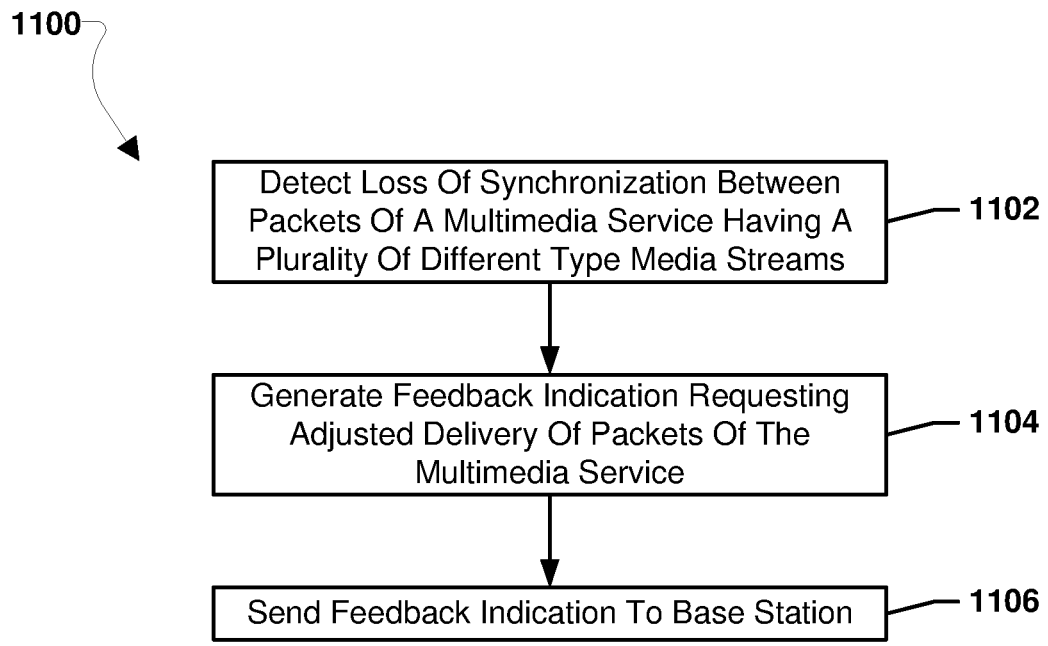
FIG. 11A is a process flow diagram illustrating a method for synchronizing delivery of a multimedia service, in accordance with various embodiments.

FIG. 11A is a process flow diagram illustrating a method 1100 for synchronizing delivery of a multimedia service, in accordance with various embodiments. With reference to FIGS. 1-11B, the operations of method 1100 may be implemented by a processor (e.g., 210, 212, 214, 216, 218, 252, 260) of a wireless device (e.g., wireless device 120*a*-120*e*, 200, 320, 402). With reference to FIGS. 1-11B, means for performing each of the operations of method 1100 may be one or more processors of a wireless device (e.g., the wireless device 120*a*-120*e*, 200, 320, 402), such as one or more of the processors 210, 212, 214, 216, 218, 252, 260. In various embodiments, the operations of method 1000 may be performed in conjunction with the operations of method 900 (FIG. 9A).

In block 1102, the processor may perform operations including detecting a loss of synchronization between packets of the multimedia service. The detection of a loss of synchronization may indicate the renderer is approaching, or has exceeded, limits of inter-media synchronization.

In block 1104, the processor may perform operations including generating a feedback indication requesting adjusted delivery of packets of the multimedia service. The feedback indication may request advancement and/or delay of packets of one or more media streams. The advancement and/or delay may be selected such that synchronization margins (e.g., sync_m2m1, sync_m3m2, sync_m3m1) are not exceeded for the media streams.

In block 1106, the processor may perform operations including sending the feedback indication to a base station. In various embodiments, feedback may be sent less-frequently than a per-packet basis. In various embodiments, the base station may adjust delivery of the packets of the different type media streams based on the wireless device feedback.

Figure 11B:
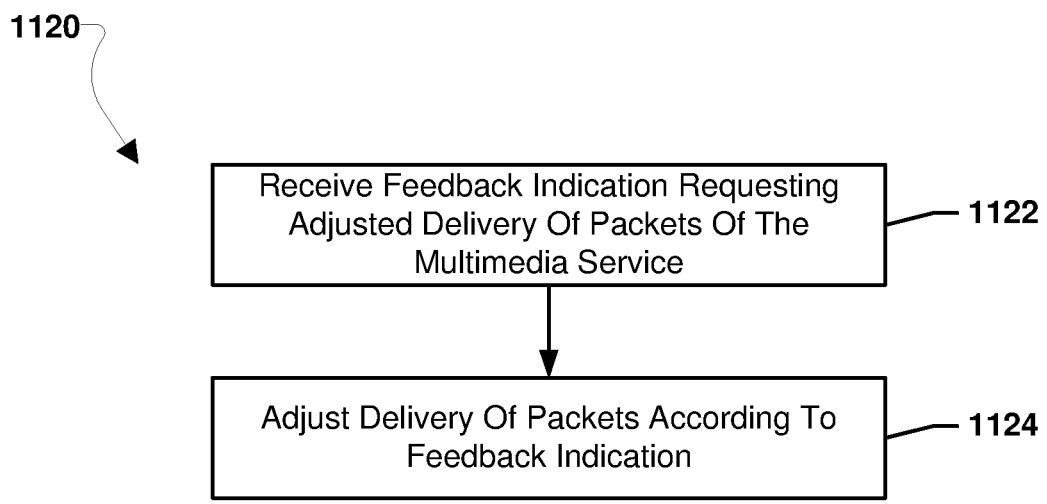
FIG. 11B is a process flow diagram illustrating a method for synchronizing delivery of a multimedia service, in accordance with various embodiments.

FIG. 11B is a process flow diagram illustrating a method for synchronizing delivery of a multimedia service, in accordance with various embodiments. With reference to FIGS. 1-11B, the operations of method 1120 may be implemented by a processor (e.g., 210, 212, 214, 216, 218, 252, 260) of a network computing device, such as a base station (e.g., base stations 110a-d, 350). With reference to FIGS. 1-11A, means for performing each of the operations of method 1120 may be one or more processors of a network computing device (e.g., the base stations 110a-d, 350), such as one or more of the processors 210, 212, 214, 216, 218, 252, 260. In various embodiments, the operations of method 1120 may be performed in conjunction with the operations of method 900 (FIG. 9A) and/or method 1100 (FIG. 11A).

In block 1122, the processor may perform operations including receiving a feedback indication requesting adjusted delivery of packets of the multimedia service from a wireless device. The feedback indication may request advancement and/or delay of packets of one or more media streams. The advancement and/or delay may be selected such that synchronization margins (e.g., sync_m2m1, sync_m3m2, sync_m3m1) are not exceeded for the media streams.

In block 1124, the processor may perform operations including adjusting delivery of the packets to the wireless device according to the feedback indication. For example, the delivery of packets for one or more media streams may be advanced or delayed as requested in the feedback indication.

Figure 11C:
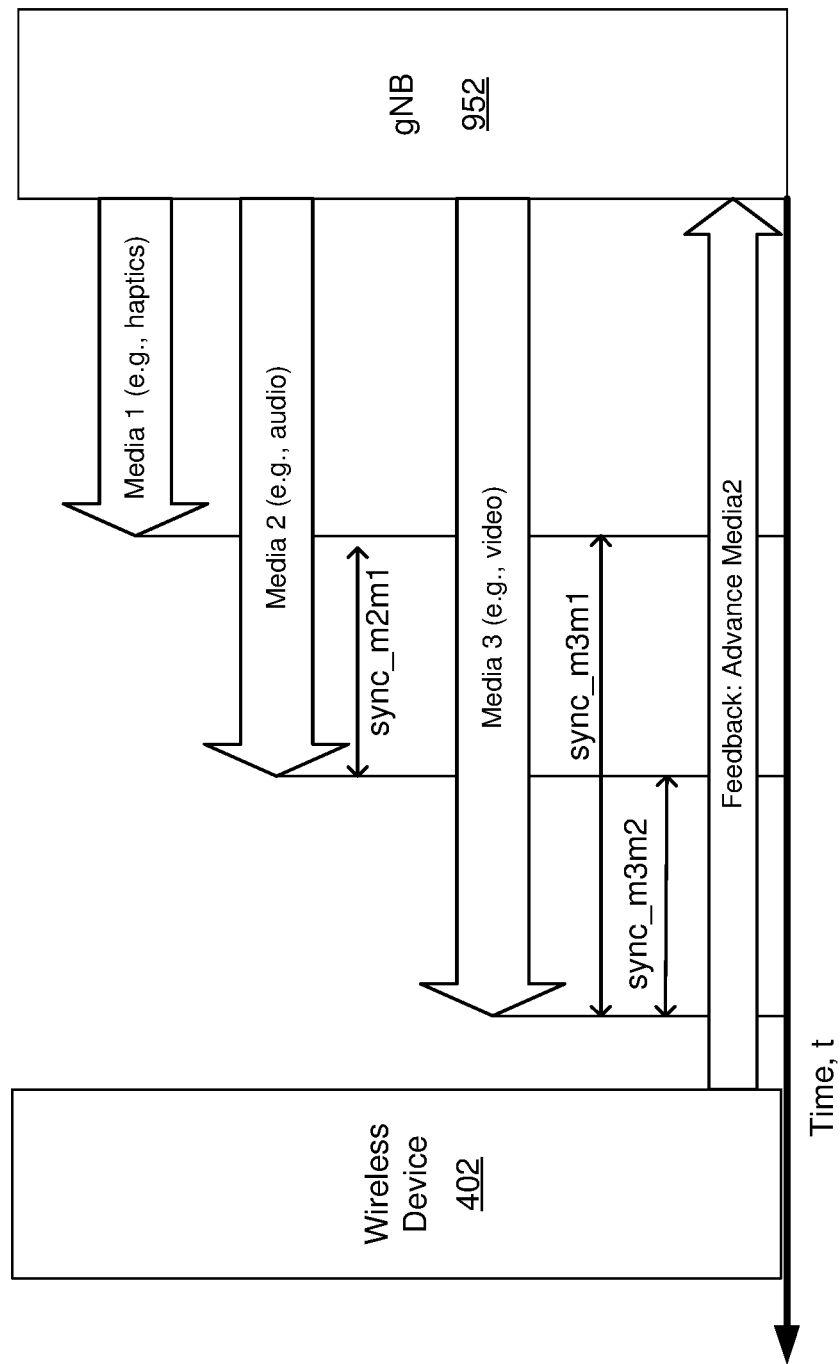
FIG. 11C is a block diagram illustrating an example wireless device managed synchronization implementation for a multimedia service in accordance with various embodiments.

FIG. 11C is a block diagram illustrating an example wireless device managed synchronization implementation for a multimedia service in accordance with various embodiments. With reference to FIGS. 1-11C, FIG. 11C illustrates operations of a wireless device 402 and a gNB 952 to support wireless device feedback to enable synchronization according to various embodiments in which GTP aligned timestamps may be used to provide the media streams, Media 1, Media 2, Media 3, to the gNB 952. For example, GTP aligned timestamps may be implemented as discussed above with reference to FIGS. 9A and 9B. FIG. 11C illustrates an example implementation of wireless device managed synchronization according to operations of method 1100 (FIG. 11A) and/or method 1120 (FIG. 11B).

As a specific example, FIG. 11C illustrates feedback from the wireless device 402 to the gNB 952. The feedback illustrated may be a feedback indication to advance Media 2. In response to receiving the feedback indication, the gNB 952 may send Media 2 packets earlier, thereby advancing Media 2.

In various embodiments, a wireless device may send feedback to a base station, such as a gNB, indicating a loss of synchronization between packets of different type media streams of a multimedia service, such as a TACMM service. In various embodiments, feedback may be sent on a per-packet basis. In various embodiments, feedback may be sent less-frequently than a per-packet basis. In various embodiments, the base station may adjust delivery of the packets of the different type media streams based on the wireless device feedback.

Figure 12A:
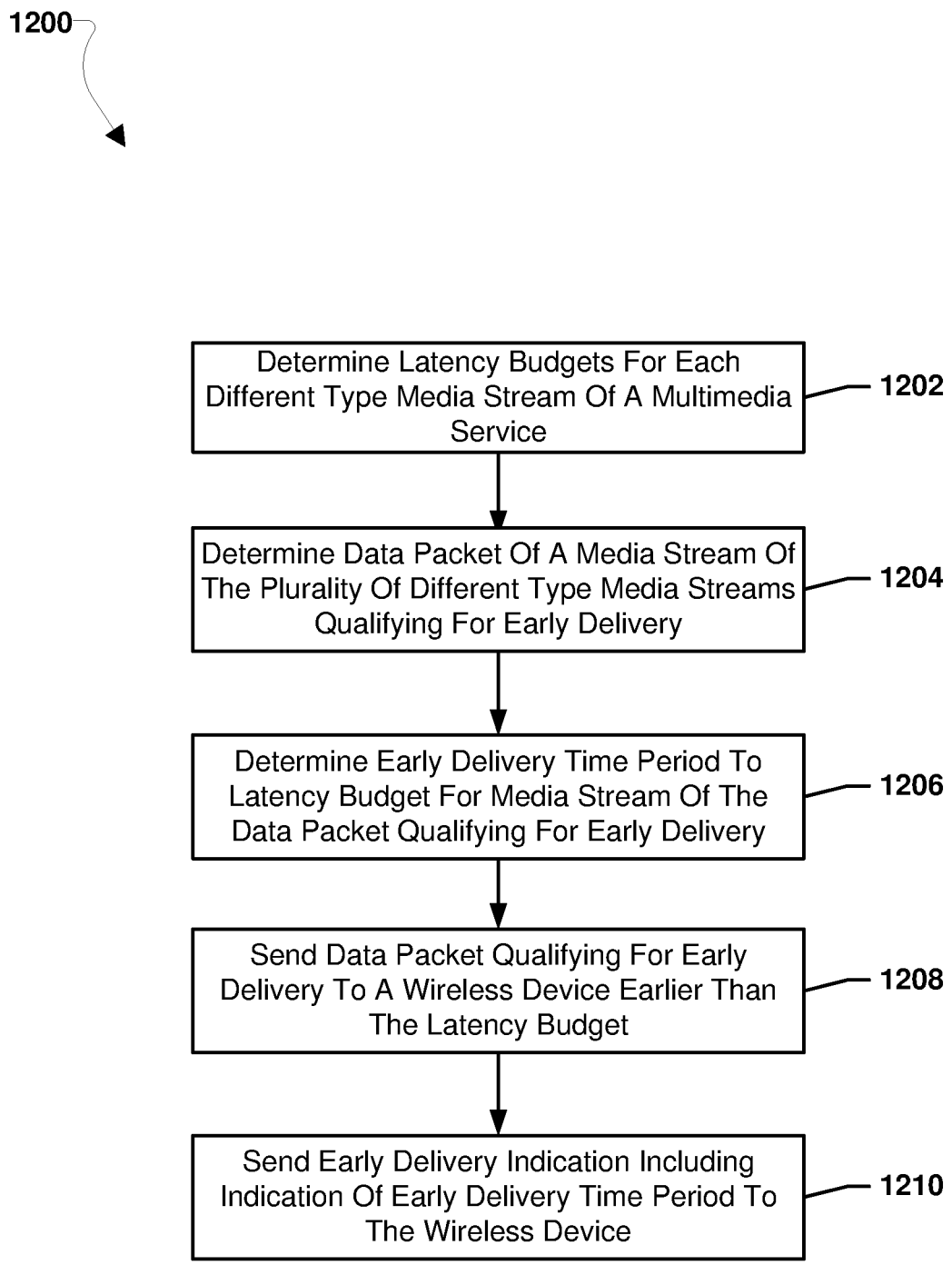
FIG. 12A is a process flow diagram illustrating a method for synchronizing delivery of a multimedia service, in accordance with various embodiments.

FIG. 12A is a process flow diagram illustrating a method 1200 for synchronizing delivery of a multimedia service, in accordance with various embodiments. With reference to FIGS. 1-12A, the operations of method 1200 may be implemented by a processor (e.g., 210, 212, 214, 216, 218, 252, 260) of a network computing device, such as a base station (e.g., base stations 110a-d, 350). With reference to FIGS. 1-12A, means for performing each of the operations of method 1200 may be one or more processors of a network computing device (e.g., the base stations 110a-d, 350), such as one or more of the processors 210, 212, 214, 216, 218, 252, 260. In various embodiments, the operations of method 1200 may be performed in conjunction with the operations of method 900 (FIG. 9A).

In block 1202, the processor may perform operations including determining latency budgets for each different type media stream of a multimedia service. As examples, the latency budgets may be e2e latency budgets, PDBs, e2e latency targets, etc.

In block 1204, the processor may perform operations including determining that a data packet of a media stream of the plurality of different type media streams qualifies for early delivery.

In block 1206, the processor may perform operations including determining an early delivery time period to a latency budget for the media stream of the data packet qualifying for early delivery.

In block 1208, the processor may perform operations including sending the data packet qualifying for early delivery to a wireless device earlier than the latency budget.

In block 1210, the processor may perform operations including sending an early delivery indication including an indication of the early delivery time period to the wireless device.

Figure 12B:
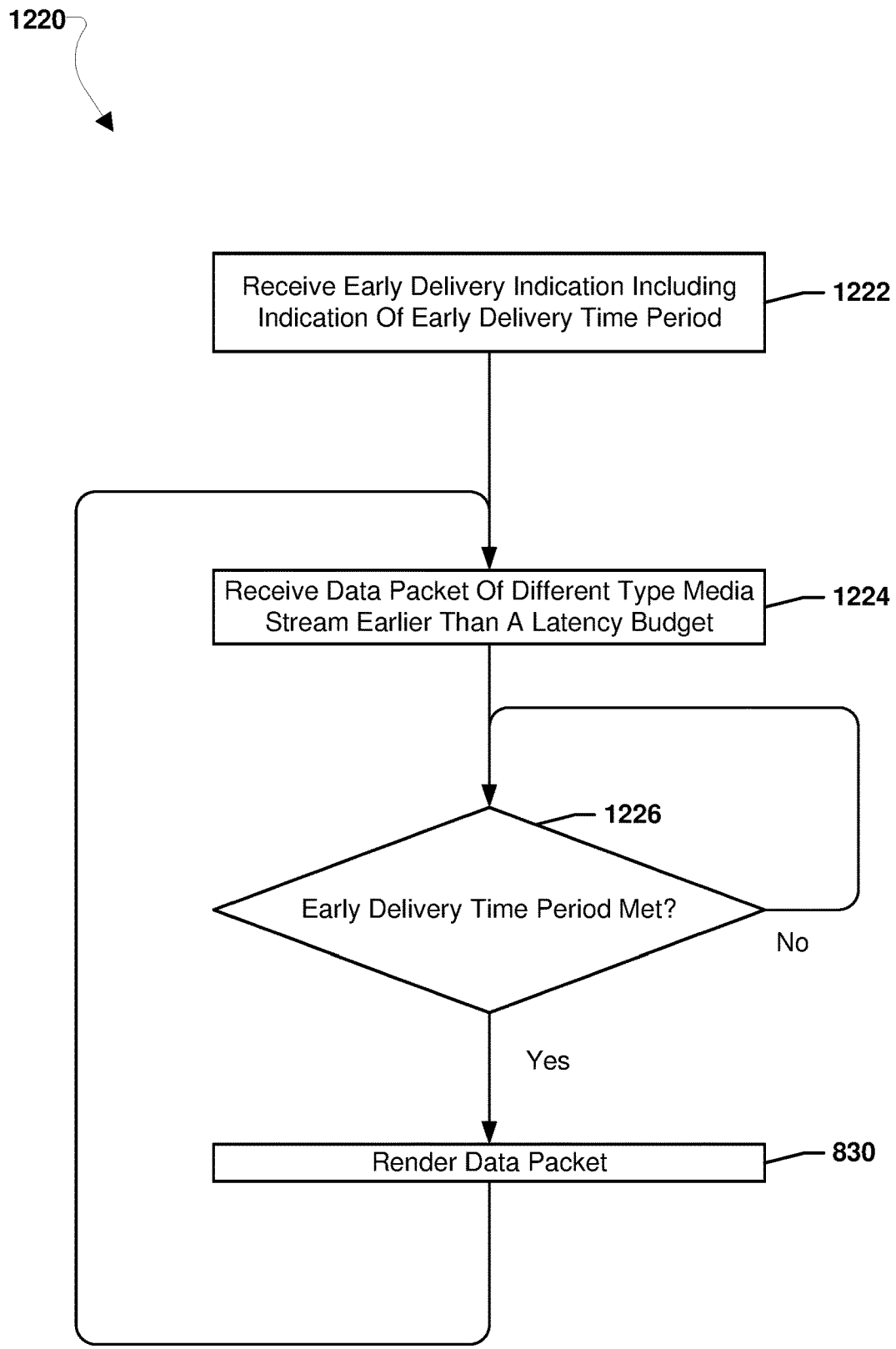
FIG. 12B is a process flow diagram illustrating a method for synchronizing delivery of a multimedia service, in accordance with various embodiments.

FIG. 12B is a process flow diagram illustrating a method 1220 for synchronizing delivery of a multimedia service, in accordance with various embodiments. With reference to FIGS. 1-12B, the operations of method 1220 may be implemented by a processor (e.g., 210, 212, 214, 216, 218, 252, 260) of a wireless device (e.g., wireless device 120a-120e, 200, 320, 402). With reference to FIGS. 1-12B, means for performing each of the operations of method 1220 may be one or more processors of a wireless device (e.g., the wireless device 120a-120e, 200, 320, 402), such as one or more of the processors 210, 212, 214, 216, 218, 252, 260. In various embodiments, the operations of method 1220 may be performed in conjunction with the operations of method 900 (FIG. 9A) and/or method 1200 (FIG. 12A).

In block 1222, the processor may perform operations including receiving an early delivery indication including an indication of an early delivery time period from a base station.

In block 1224, the processor may perform operations including receiving a data packet of one of the plurality of different type media streams from the base station earlier than a latency budget for the media stream of the data packet. As examples, the latency budget may be an e2e latency budget, a PDB, an e2e latency target, etc.

In determination block 1226, the processor may perform operations including determining whether an early delivery time period is met for the early delivered packet. In various embodiments, a base station, such as a gNB, delivering a packet earlier than a latency budget (e.g., an e2e latency budget, a PDB, an e2e latency target, etc.) may signal the early delivery to a wireless device. In various embodiments, a base station, such as a gNB, delivering a packet earlier than a latency budget (e.g., an e2e latency budget, a PDB, an e2e latency target, etc.) may send an indication of early delivery to a wireless device including a time value reflecting a time period ahead of the latency budget the packet was delivered. In various embodiments, when the wireless device receives the packet early and the indication of early delivery, the wireless device may wait for the expiration of the time value before rendering the packet. In this manner, by the base station, such as the gNB, indicating to the wireless device by how much time packets are delivered ahead of an e2e latency target, the wireless device may use this information to delay rendering early packets to avoid exceeding inter-media synchronization limits In various embodiments, for RTP media, the early indication may not need to be sent often.

In response to determining that the early delivery time period is not met (i.e., determination block 1226="No"), the processor may continue to hold (or buffer) the data packet until the early delivery time period is met and continue to whether an early delivery time period is met for the early delivered packet in determination block 1226. In this manner, data packets may not be rendered earlier than the indicated early delivery time period.

In response to determining that the early delivery time period is met (i.e., determination block 1226="Yes"), the processor may render the data packet in block 830. In this manner, early data packets may not be rendered until the early delivery time period is reached.

In various embodiments, the operations of blocks 1224, 1226, and 830 may be performed on a per packet basis as packets are received early for the multimedia service.

Figure 12C:
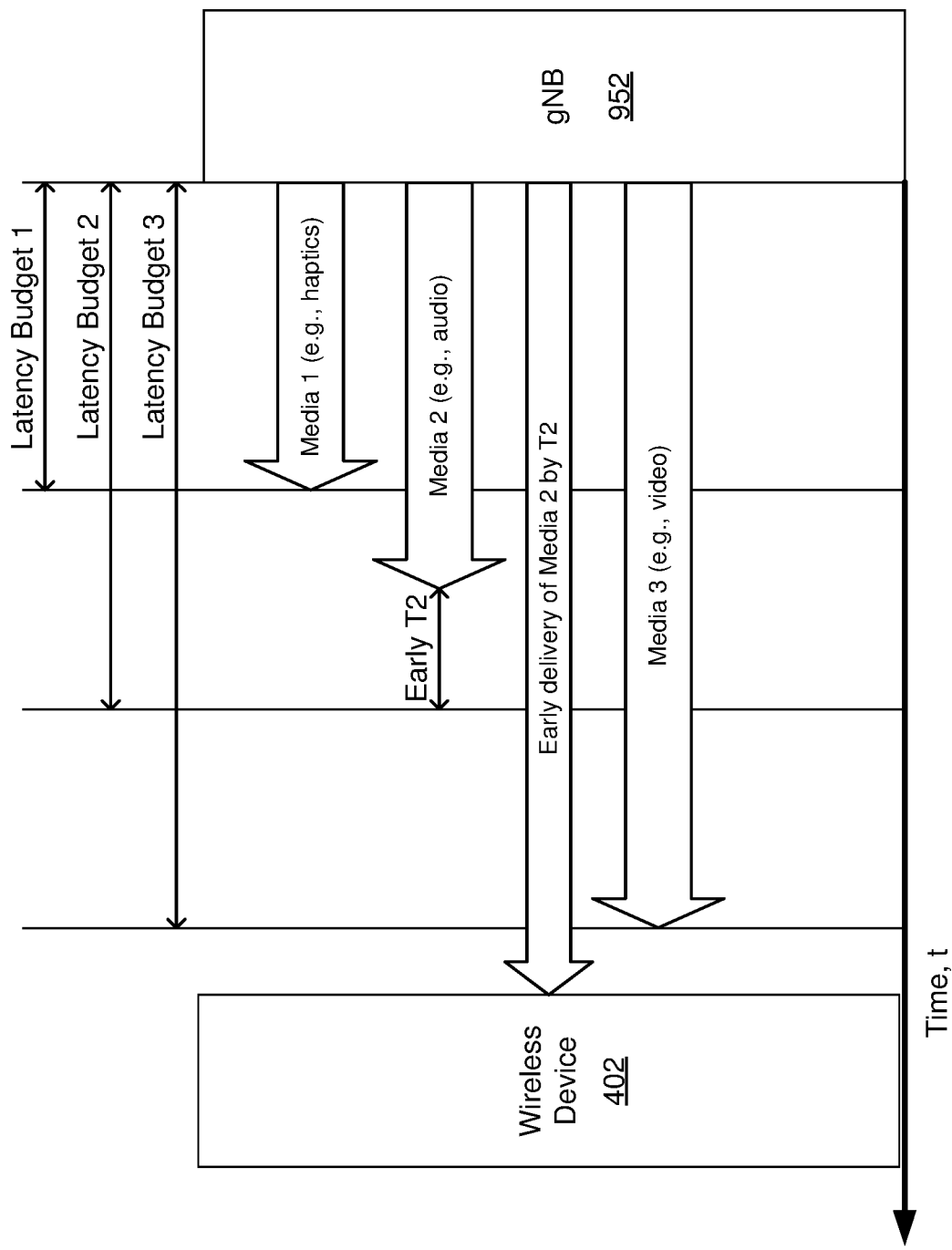
FIG. 12C is a block diagram illustrating an example base station managed synchronization implementation for a multimedia service in accordance with various embodiments.

FIG. 12C is a block diagram illustrating an example base station managed synchronization implementation for a multimedia service in accordance with various embodiments. With reference to FIGS. 1-12C, FIG. 12C illustrates operations of a wireless device 402 and a gNB 952 to support synchronization of early delivered packets according to various embodiments in which GTP aligned timestamps may be used to provide the media streams, Media 1, Media 2, Media 3, to the gNB 952. For example, GTP aligned timestamps may be implemented as discussed above with reference to FIGS. 9A and 9B. FIG. 12C illustrates an example implementation of base station managed synchronization according to operations of method 1200 (FIG. 12A) and/or method 1220 (FIG. 12B).

As a specific example, FIG. 12C illustrates the gNB 952 delivering a packet of Media 2 earlier than a latency budget (e.g., an e2e latency budget, a PDB, an e2e latency target, etc.) "Latency Budget 2" of the Media 2 media stream. The packet of Media 2 may be delivered an early delivery time period, T2, before the Latency Budget 2. The gNB 952 may send an early delivery indication to the wireless device 402 indicating that the Media 2 packet was delivered early by the early delivery time period, T2. The wireless device 402 may hold off on rendering (or playout) of the early delivered packet until the early deliver time period T2 expires, thereby delaying rendering (or playout) to the Latency Budget 2. In this manner, though a packet may be delivered early, rendering (or playout) may still occur at the latency budget (e.g., the e2e latency budget, the PDB, the e2e latency target, etc.) and the loss of inter-media synchronization may be avoided.

Figure 13A:
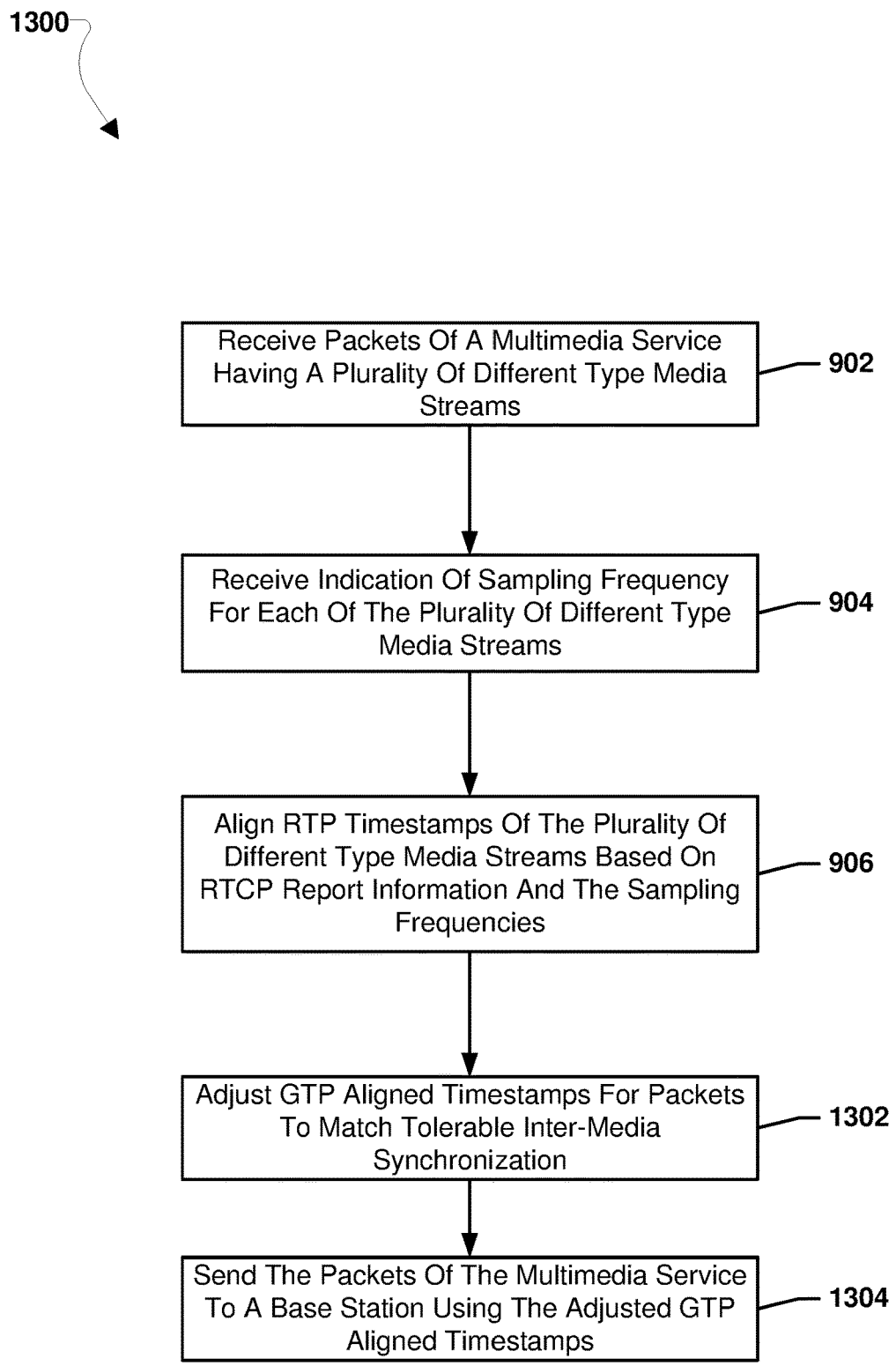
FIG. 13A is a process flow diagram illustrating a method for pre-adjusting timestamps of a multimedia service in accordance with various embodiments.

FIG. 13A is a process flow diagram illustrating a method 1300 for pre-adjusting timestamps of a multimedia service in accordance with various embodiments. With reference to FIGS. 1-13A, the operations of method 1300 may be implemented by a processor (e.g., 210, 212, 214, 216, 218, 252, 260) of a network computing device, such as a UPF server (e.g., UPF server 951). With reference to FIGS. 1-13A, means for performing each of the operations of method 900 may be one or more processors of a network computing device (e.g., a UPF server), such as one or more of the processors 210, 212, 214, 216, 218, 252, 260. In various embodiments, the operations of method 1300 may be performed in conjunction with the operations of method 900 (FIG. 9A).

In blocks 902-906, the processor may perform operations as described with reference to method 900 (FIG. 9A) to align RTP timestamps.

In block 1302, the processor may perform operations including adjusting GTP aligned timestamps to match tolerable inter-media synchronization requirements. In addition to adding aligned GTP timestamps, in various embodiments, the network computing device, such as the UPF server, may adjust the GTP timestamps to account for synchronization margins between the different type media streams of the multimedia service. In this manner, packets sent to a base station, such as a gNB, may already account for inter-media synchronization requirements. Pre-adjusting GTP timestamps to account for synchronization margins between the medias streams of the multimedia service may avoid needing to provide skew requirements to a base station, such as gNB, thereby reducing the complexity of the base station scheduler.

In block 1304, the processor may perform operations including sending the packets of the multimedia service to the base station using the adjusted GTP aligned timestamps. In some embodiments, in addition to the adjusted GTP timestamps, an indication that some media flows may be delivered early may be sent from the UPF server to the base station. This early delivery authorization information may enable the base station, such as the gNB, to exploit scheduling opportunities. For example, an indicating may be added in the GTP packets for a media stream that early delivery is authorized.

Figure 13B:
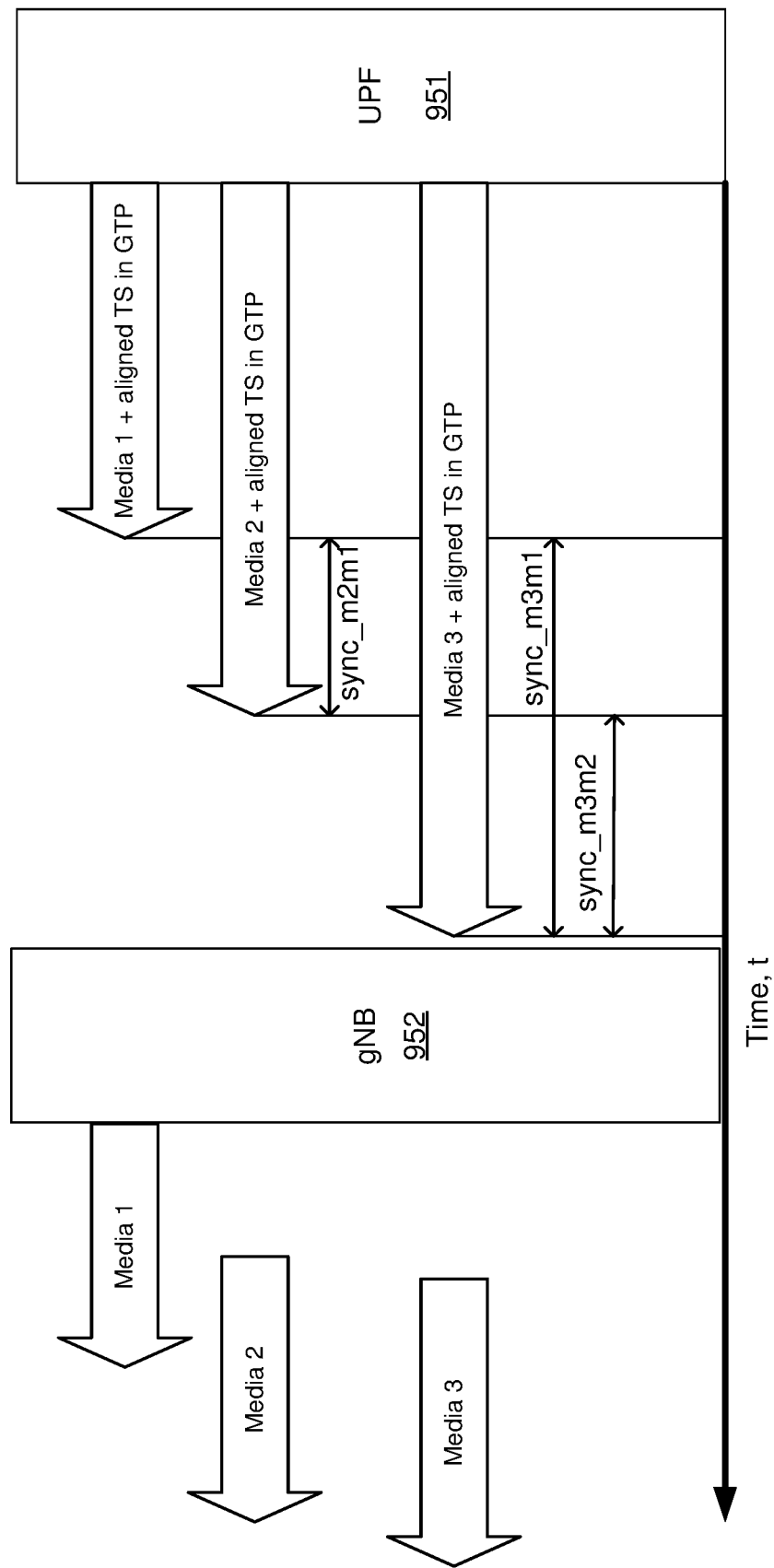
FIG. 13B is a block diagram illustrating an example implementation of pre-adjusting timestamps in accordance with various embodiments.

FIG. 13B is a block diagram illustrating an example implementation of pre-adjusting timestamps in accordance with various embodiments. With reference to FIGS. 1-13B, FIG. 13B illustrates operations of a UPF server 951 and gNB 952 to support synchronization according to various embodiments in which GTP aligned timestamps may be pre-adjusted to account for synchronization margins (e.g., sync_m2m1, sync_m3m2, sync_m3m1) of the media streams, Media 1, Media 2, Media 3, sent to the gNB 952. For example, adjusted GTP aligned timestamps may be implemented as discussed above with reference to FIG. 13A. FIG. 13B illustrates an example implementation of UPF server 951 pre-adjustment of GTP timestamps according to operations of method 1300 (FIG. 13A).

As a specific example, FIG. 13B illustrates that in addition to adding aligned GTP timestamps, in various embodiments, the UPF server 951, may adjust the GTP timestamps to account for synchronization margins (e.g., sync_m2m1, sync_m3m2, sync_m3m1) of the media streams, Media 1, Media 2, Media 3. In this manner, packets sent to the gNB 952 may already account for the synchronization margins (e.g., sync_m2m1, sync_m3m2, sync_m3m1) when received by the gNB 952. Pre-adjusting GTP timestamps to account for synchronization margins (e.g., sync_m2m1, sync_m3m2, sync_m3m1) may avoid needing to provide skew requirements to the gNB 952, thereby reducing the complexity of the base station scheduler. In some embodiments, in addition to the adjusted GTP timestamps, an indication that some media flows may be delivered early may be sent from the UPF server 951 to the gNB 952. This early delivery authorization information may enable the gNB 952 to exploit scheduling opportunities. For example, an indicating may be added in the GTP packets for a media stream that early delivery is authorized.

Figure 14A:
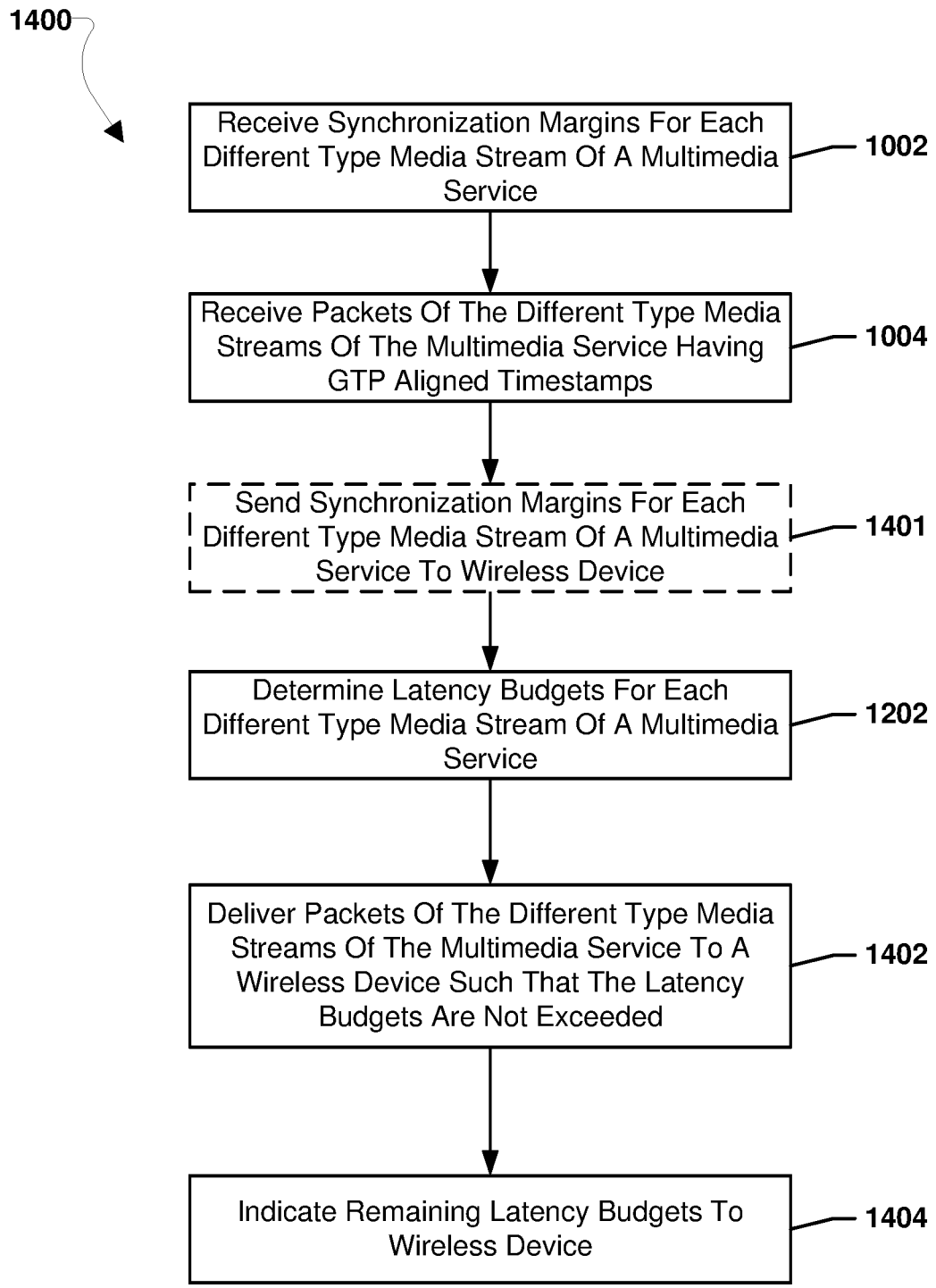
FIG. 14A is a process flow diagram illustrating a method for synchronizing delivery of a multimedia service, in accordance with various embodiments.

FIG. 14A is a process flow diagram illustrating a method 1400 for synchronizing delivery of a multimedia service, in accordance with various embodiments. With reference to FIGS. 1-14A, the operations of method 1400 may be implemented by a processor (e.g., 210, 212, 214, 216, 218, 252, 260) of a network computing device, such as a base station (e.g., base stations 110a-d, 350). With reference to FIGS. 1-14A, means for performing each of the operations of method 1400 may be one or more processors of a network computing device (e.g., the base stations 110a-d, 350), such as one or more of the processors 210, 212, 214, 216, 218, 252, 260. In various embodiments, the operations of method 1400 may be performed in conjunction with the operations of method 900 (FIG. 9A), method 1000 (FIG. 10A), and/or method 1200 (FIG. 12A).

In blocks 1002 and 1004, the processor may perform operations including receiving synchronization margins for each different type media stream of a multimedia service and receive packets of the different type media streams of the multimedia service having GTP aligned timestamps as described with reference to method 1000 (FIG. 10A).

In optional block 1401, the processor may perform operations including sending the synchronization margins for each different type media stream of a multimedia service to a wireless device. Block 1401 may be optional as not all wireless devices may be configured to receive and/or utilize synchronization margins.

In block 1202, the processor may perform operations including determining latency budgets for each different type media stream of a multimedia service as described with reference to method 1200 (FIG. 12A). As examples, the latency budgets may be e2e latency budgets, PDB s, e2e latency targets, etc.

In block 1402, the processor may perform operations including delivering packets of the different type media streams of the multimedia service to the wireless device such that the latency budgets are not exceeded. For example, the gNB may deliver packets to the wireless device by the PDB, the e2e latency budget, or the e2e latency target for the media streams.

In block 1404, the processor may send an indication of remaining latency budgets to the wireless device. As examples, the remaining latency budget may be a remaining e2e latency budget, a remaining PDB, etc. In this manner, the wireless device may be aware of a time remaining before the latency budget (e.g., the e2e latency budget, the PDB, the e2e latency target, etc.) is reached.

Figure 14B:
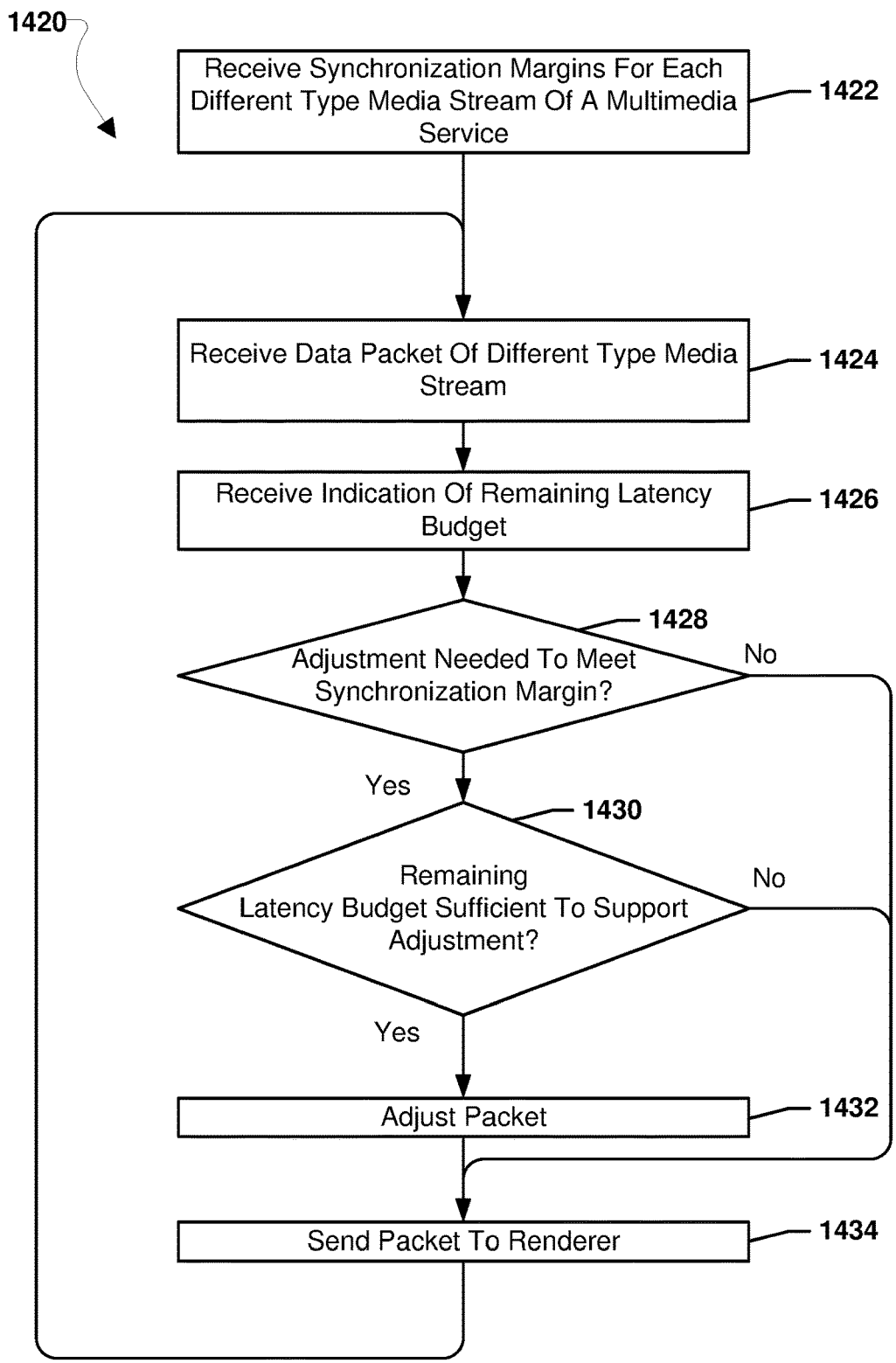
FIG. 14B is a process flow diagram illustrating a method for synchronizing delivery of a multimedia service, in accordance with various embodiments.

FIG. 14B is a process flow diagram illustrating a method 1420 for synchronizing delivery of a multimedia service, in accordance with various embodiments. With reference to FIGS. 1-14B, the operations of method 1420 may be implemented by a processor (e.g., 210, 212, 214, 216, 218, 252, 260) of a wireless device (e.g., wireless device 120a-120e, 200, 320, 402). With reference to FIGS. 1-14B, means for performing each of the operations of method 1420 may be one or more processors of a wireless device (e.g., the wireless device 120a-120e, 200, 320, 402), such as one or more of the processors 210, 212, 214, 216, 218, 252, 260. In various embodiments, the operations of method 1420 may be performed in conjunction with the operations of method 900 (FIG. 9A) and/or method 1400 (FIG. 14A).

In block 1422, the processor may perform operations including receiving synchronization margins for each different type media stream of a multimedia service.

In block 1424, the processor may perform operations including receiving a data packet of a different type media stream.

In block 1426, the processor may perform operations including receiving an indication of a remaining e2e latency for the media stream.

In determination block 1428, the processor may determine whether adjustment to the data packet is needed to meet a synchronization margin.

In response to determining that no adjustment is needed (i.e., determination block 1428="No"), the processor may send the packet to a renderer of the wireless device in block 1434.

In response to determining that adjustment is needed (i.e., determination block 1428="Yes"), the processor may determine whether a remaining latency budget (e.g., a remaining latency budget, a remaining PDB, a remaining e2e latency target, etc.) is sufficient to support adjustment in determination block 1430.

In response to determining that a remaining latency budget is not sufficient (i.e., determination block 1430="No"), the processor may send the packet to a renderer of the wireless device in block 1434.

In response to determining that the remaining latency budget is sufficient (i.e., determination block 1430="Yes"), the processor may adjust the packet in block 1432. The wireless device may adjust the packets to account for synchronization margins between the different type media streams of the multimedia service such that the latency budget (e.g., the e2e latency budget, the PDB, the e2e latency target, etc.) is not exceeded.

In block 1434, the processor may perform operations including sending the adjusted packet to a renderer of the wireless device.

In various embodiments, the operations of blocks 1424-1434 may be performed on a per packet basis as packets are received for the multimedia service.

Figure 14C:
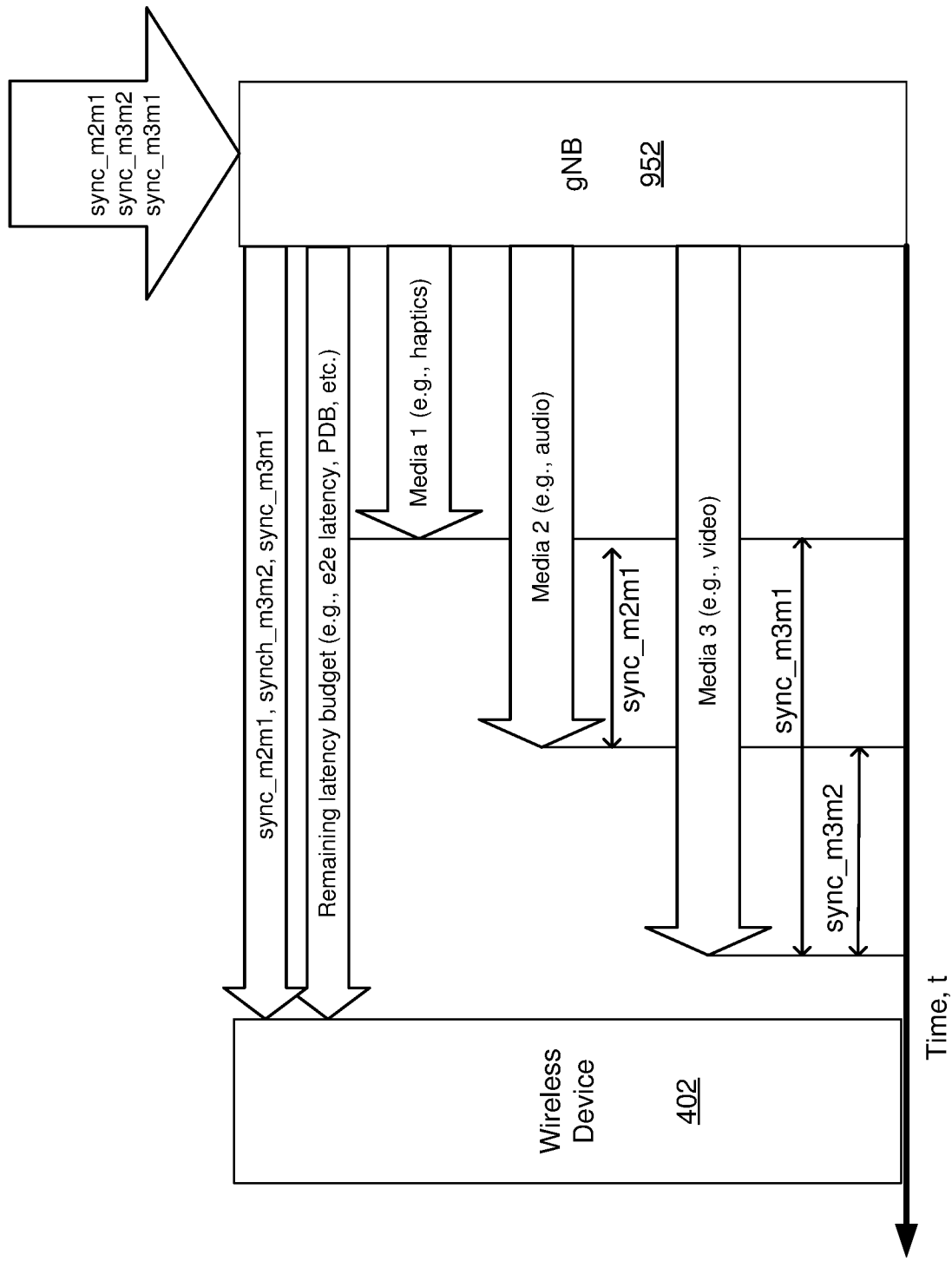
FIG. 14C is a block diagram illustrating an example wireless device managed synchronization implementation for a multimedia service in accordance with various embodiments.

FIG. 14C is a block diagram illustrating an example wireless device managed synchronization implementation for a multimedia service in accordance with various embodiments. With reference to FIGS. 1-14C, FIG. 14C illustrates operations of a wireless device 402 and a gNB 952 to support synchronization of packets according to various embodiments in which GTP aligned timestamps may be used to provide the media streams, Media 1, Media 2, Media 3, to the gNB 952. For example, GTP aligned timestamps may be implemented as discussed above with reference to FIGS. 9A and 9B. FIG. 14C illustrates an example implementation of wireless device managed synchronization according to operations of method 1400 (FIG. 14A) and/or method 1420 (FIG. 14B).

As a specific example, FIG. 14C illustrates the gNB 952 may provide the synchronization margins (e.g., sync_m2m1, sync_m3m2, sync_m3m1) to the wireless device 402. For example, the gNB 952 may send the synchronization margins (e.g., sync_m2m1, sync_m3m2, sync_m3m1) to the wireless device 402. The gNB 952 may be responsible for delivering packets of the multimedia service by the PDB (or e2e latency target or e2e latency budget) but may not be responsible for skew adjustment. The wireless device 402 may adjust the packets for particular media streams, Media 1, Media 2, Media 3, before delivering packets to the renderer (e.g., renderer 403) or application playing out the packets. The wireless device 402 may be aware of a time remaining before the PDB (or e2e latency budget or e2e latency target) is reached. The wireless device may adjust the packets to account for synchronization margins (e.g., sync_m2m1, sync_m3m2, sync_m3m1) between the different type media streams, Media 1, Media 2, Media 3, such that the PDB (or e2e latency budget or e2e latency target) is not exceeded. The wireless device 402 implementing synchronization margins (e.g., sync_m2m1, sync_m3m2, sync_m3m1) may enable the wireless device 402 to compensate for media delivery delays for which the gNB 952 cannot fully compensate.

Figure 15A:
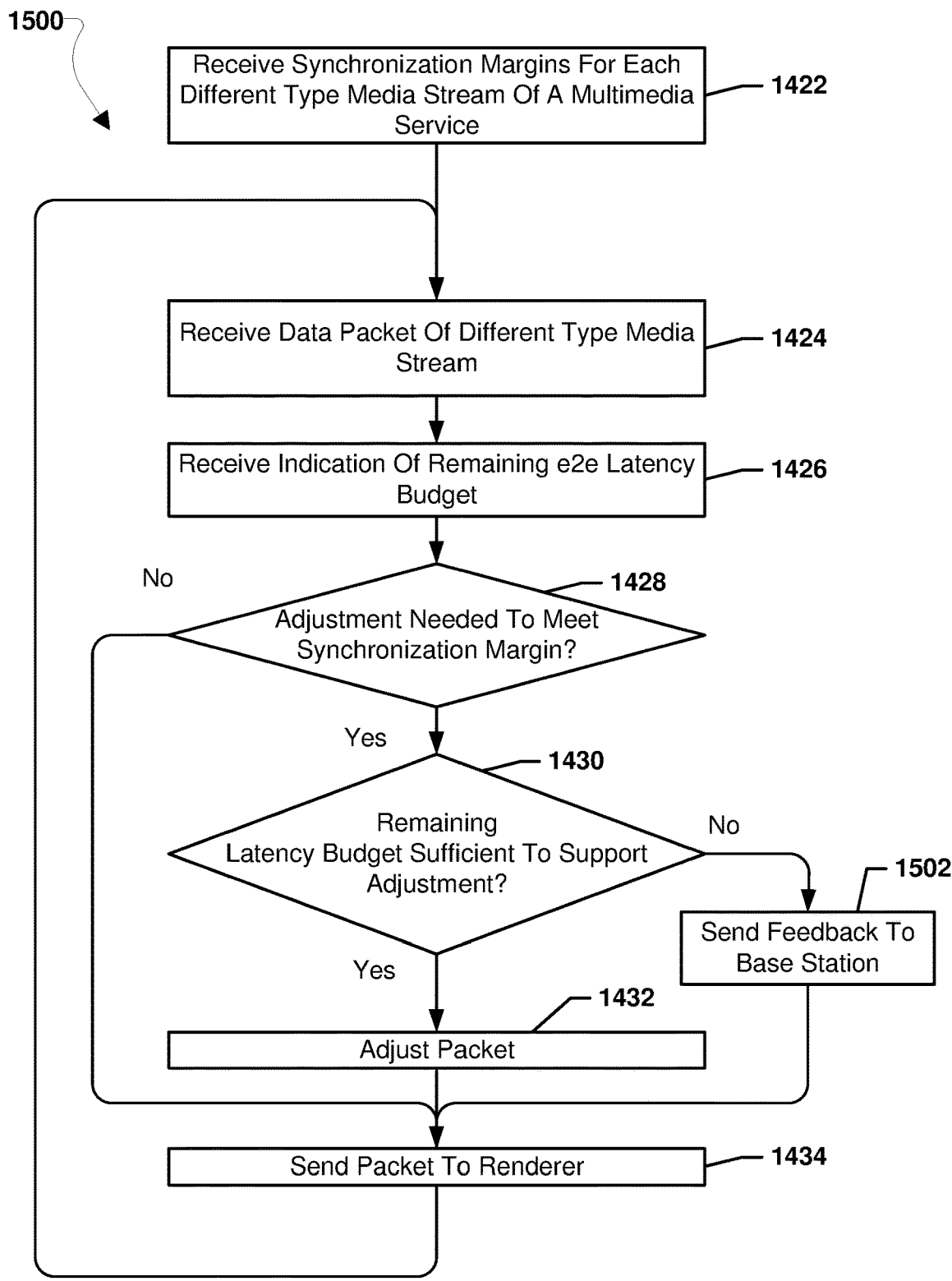
FIG. 15A is a process flow diagram illustrating a method for synchronizing delivery of a multimedia service, in accordance with various embodiments.

FIG. 15A is a process flow diagram illustrating a method 1500 for synchronizing delivery of a multimedia service, in accordance with various embodiments. With reference to FIGS. 1-15A, the operations of method 1500 may be implemented by a processor (e.g., 210, 212, 214, 216, 218, 252, 260) of a wireless device (e.g., wireless device 120*a*-120*e*, 200, 320, 402). With reference to FIGS. 1-15A, means for performing each of the operations of method 1500 may be one or more processors of a wireless device (e.g., the wireless device 120*a*-120*e*, 200, 320, 402), such as one or more of the processors 210, 212, 214, 216, 218, 252, 260. In various embodiments, the operations of method 1500 may be performed in conjunction with the operations of method 900 (FIG. 9A), method 1400 (FIG. 14A), and/or method 1420 (FIG. 14B).

In blocks 1422-1430, the processor may perform operations of like numbered blocks of method 1420 described with reference to FIG. 14B.

In response to determining that a remaining latency budget is not sufficient (i.e., determination block 1430="No"), the processor may send a feedback indication to the base station in block 1502. In various embodiments, the feedback indication may be feedback to the base station requesting skew adjustment be performed at least in part by the base station. In various embodiments, the wireless device may send feedback to a base station, such as a gNB, indicating a percentage adjustment to the synchronization margins allocation between the wireless device and base station. In various embodiments, the feedback indication may indicate a percentage adjustment the base stations is to apply to account for synchronization margins between the different type media streams of the multimedia service. The remaining percentage adjustment may be applied by the wireless device. In this manner, the workload for ensuring inter-media synchronization (e.g., ensuring synchronization margins are not exceeded) may be shared between the wireless device and base station.

In blocks 1432 and 1434, the processor may perform operations of like numbered blocks of method 1420 described with reference to FIG. 14B.

Figure 15B:
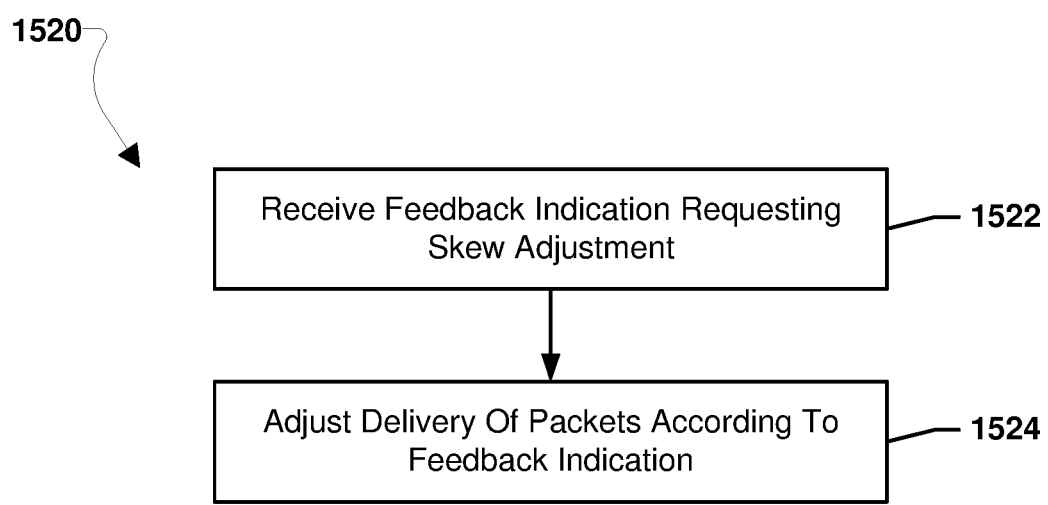
FIG. 15B is a process flow diagram illustrating a method for synchronizing delivery of a multimedia service, in accordance with various embodiments.

FIG. 15B is a process flow diagram illustrating a method 1520 for synchronizing delivery of a multimedia service, in accordance with various embodiments. With reference to FIGS. 1-15B, the operations of method 1520 may be implemented by a processor (e.g., 210, 212, 214, 216, 218, 252, 260) of a network computing device, such as a base station (e.g., base stations 110*a-d*, 350). With reference to FIGS. 1-15B, means for performing each of the operations of method 1520 may be one or more processors of a network computing device (e.g., the base stations 110*a-d*, 350), such as one or more of the processors 210, 212, 214, 216, 218, 252, 260. In various embodiments, the operations of method 1520 may be performed in conjunction with the operations of method 900 (FIG. 9A), method 1400 (FIG. 14A), method 1420 (FIG. 14B), and/or method 1500 (FIG. 15A).

In block 1522, the processor may perform operations including receiving a feedback indication requesting skew adjustment. In various embodiments, the feedback indication may be feedback to the base station requesting skew adjustment be performed at least in part by the base station. In various embodiments, the wireless device may send feedback to a base station, such as a gNB, indicating a percentage adjustment to the synchronization margins allocation between the wireless device and base station.

In block 1524, the processor may perform operations including adjusting delivery of packets according to the feedback indication. In various embodiments, the feedback indication may indicate a percentage adjustment the base stations is to apply to account for synchronization margins between the different type media streams of the multimedia service. The remaining percentage adjustment may be applied by the wireless device. In this manner, the workload for ensuring inter-media synchronization (e.g., ensuring synchronization margins are not exceeded) may be shared between the wireless device and base station.

Figure 15C:
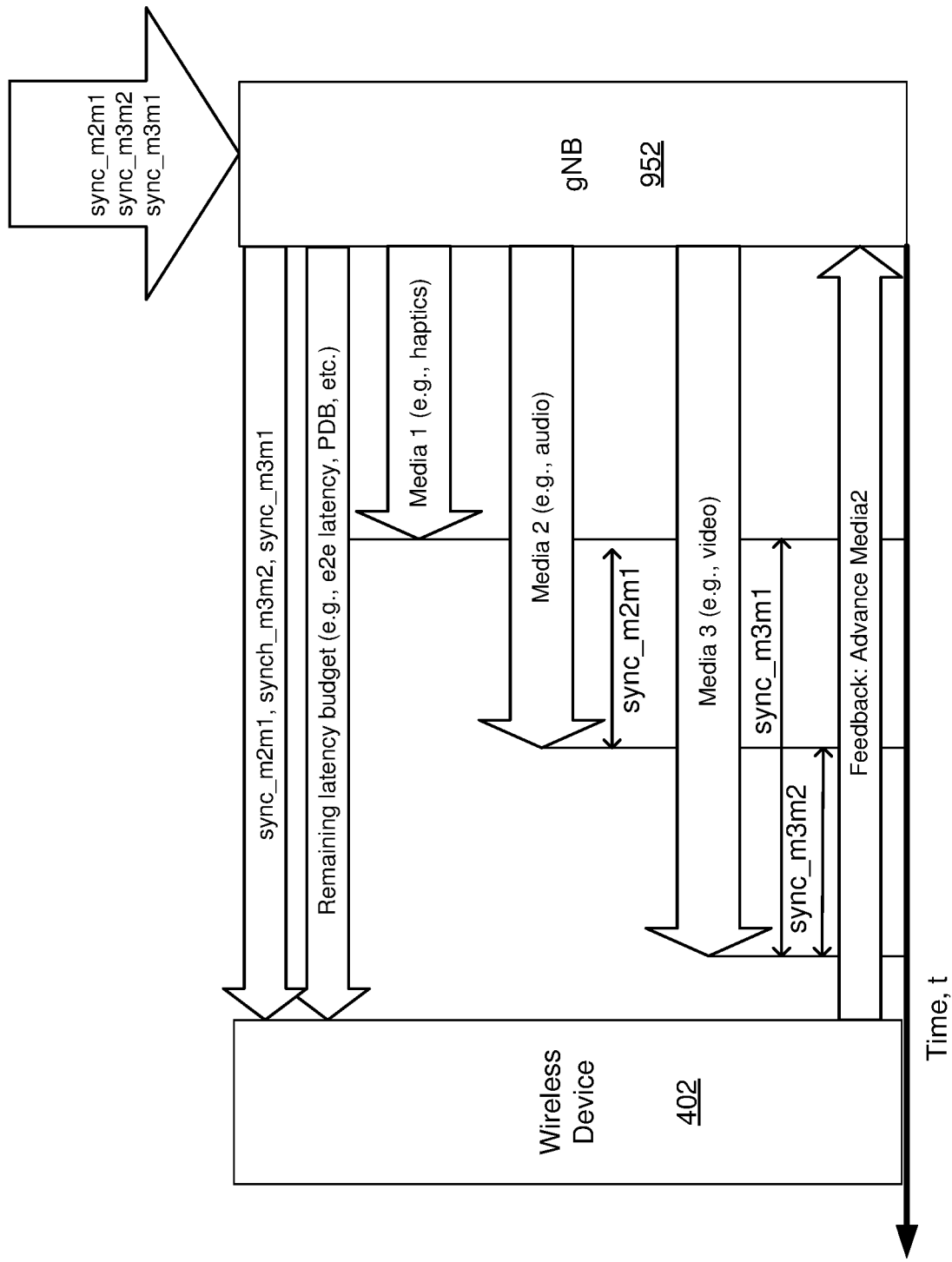
FIG. 15C is a block diagram illustrating an example wireless device and base station shared synchronization implementation for a multimedia service in accordance with various embodiments.

FIG. 15C is a block diagram illustrating an example wireless device and base station shared synchronization implementation for a multimedia service in accordance with various embodiments. With reference to FIGS. 1-15C, FIG. 15C illustrates operations of a wireless device 402 and a gNB 952 to support synchronization of packets according to various embodiments in which GTP aligned timestamps may be used to provide the media streams, Media 1, Media 2, Media 3, to the gNB 952. For example, GTP aligned timestamps may be implemented as discussed above with reference to FIGS. 9A and 9B. FIG. 15C illustrates an example implementation of wireless device managed synchronization according to operations of method 1500 (FIG. 15A) and/or method 1520 (FIG. 15B).

As a specific example, FIG. 15C illustrates that the gNB 952 may provide the synchronization margins (e.g., sync_m2m1, sync_m3m2, sync_m3m1) to the wireless device 402. The gNB 952 may be responsible for delivering packets of the multimedia service by the PDB (or e2e latency target or e2e latency budget). Additionally, feedback from the wireless device 402 to the gNB may request skew adjustment for one or more media streams, Media 1, Media 2, Media 3, be implemented at least in part by the gNB 952. As illustrated in FIG. 15C, the feedback may indicate adjustment is needed to advance Media 2. In some embodiments, the feedback may indicate a percentage adjustment the gNB 952 is to apply to account for synchronization margins (e.g., sync_m2m1, sync_m3m2, sync_m3m1) between the Media 1, Media 2, and Media 3. The remaining percentage adjustment may be applied by the wireless device 402. For example, a portion of the synchronization margin sync_m2m1 may be assigned to the gNB 952 as sync_m2m1a and a portion of the synchronization margin sync_m2m1 may be assigned to the wireless device 402 as sync_m2m1b such that the total synchronization margin sync_m2m1 equals sync_m2m1a plus sync_m2m1b. For example, a portion of the synchronization margin sync_m3m2 may be assigned to the gNB 952 as sync_m3m2a and a portion of the synchronization margin sync_m3m2 may be assigned to the wireless device 402 as sync_m3m2b such that the total synchronization margin sync_m3m2 equals sync_m3m2a plus sync_m3m2b. For example, a portion of the synchronization margin sync_m3m1 may be assigned to the gNB 952 as sync_m3m1a and a portion of the synchronization margin sync_m3m1 may be assigned to the wireless device 402 as sync_m3m1b such that the total synchronization margin sync_m3m1 equals sync_m3m1a plus sync_m3m1b. The percentage may be dictated by the gNB 952 or the wireless device 402.

The gNB 952 may be responsible for delivering packets of the multimedia service by the PDB (or e2e latency target or e2e latency budget) and may account for assigned synchronization margin portions (e.g., sync_m2m1a, sync_m3m2a, sync_m3m1a). The wireless device 402 may adjust the packets for particular media streams, Media 1, Media 2, Media 3, before delivering packets to the renderer (e.g., renderer 403) or application playing out the packets. The wireless device 402 may be aware of a time remaining before the PDB (or e2e latency budget or e2e latency target) is reached. The wireless device may adjust the packets to account for wireless device 402 assigned synchronization margin portions (e.g., sync_m2m1b, sync_m3m2b, sync_m3m1b) between the different type media streams, Media 1, Media 2, Media 3, such that the PDB (or e2e latency budget or e2e latency target) is not exceeded.

Various embodiments enable network assistance of packet synchronization in UL transmissions by leveraging information available to a wireless device when the wireless device is generating different type media streams for a multimedia service, such as a TACMM service.

Figure 16:
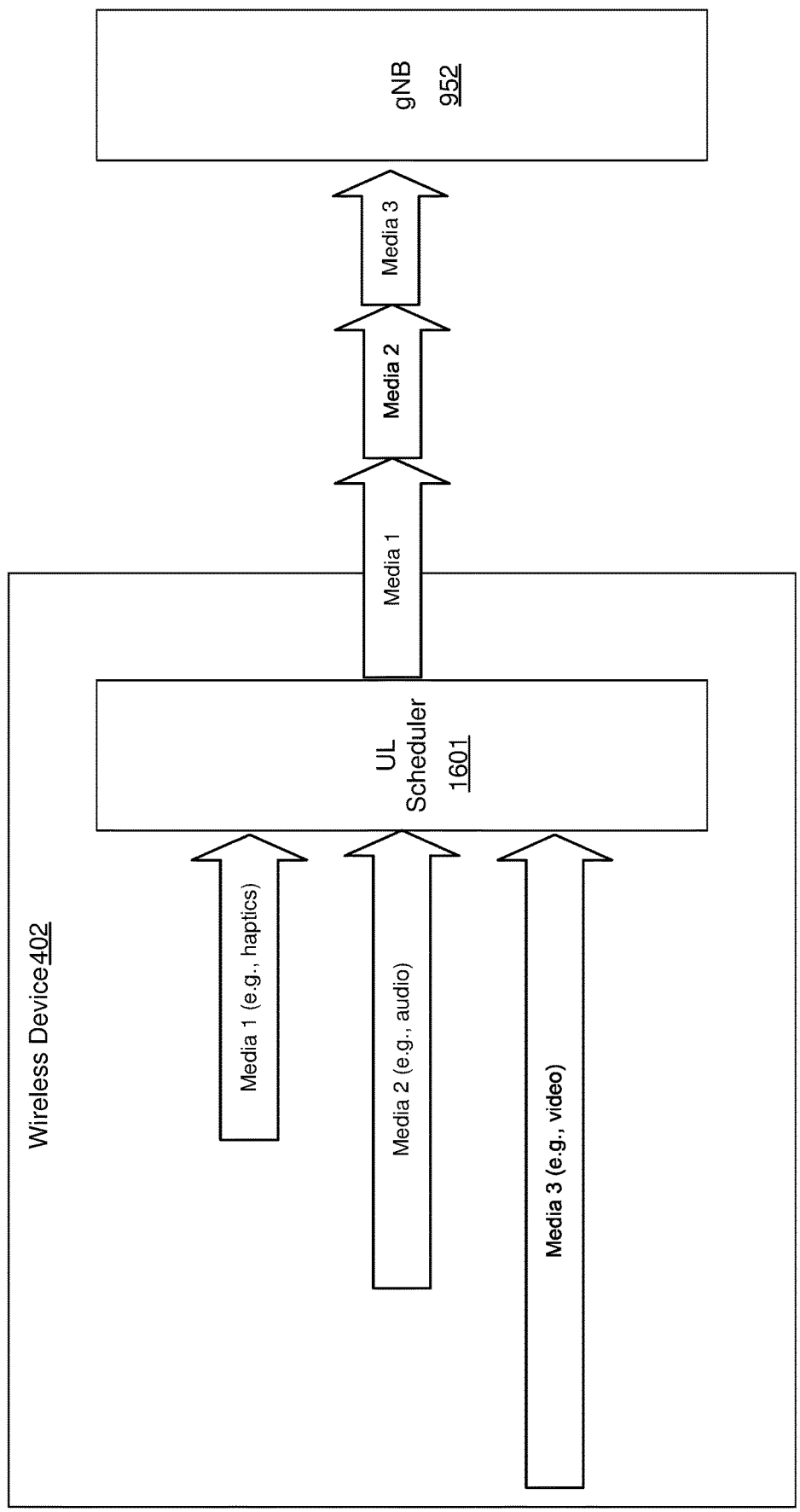
FIG. 16 is a block diagram illustrating uplink (UL) transmission of different type media streams of a multimedia service.

FIG. 16 is a block diagram illustrating UL transmission of different type media streams of a multimedia service. With reference to FIGS. 1-16, FIG. 16 illustrates operations of a wireless device 402 to support UL transmission of a multimedia service having multiple media streams, Media 1, Media 2, Media 3. As the wireless device 402 is generating the media streams, Media 1, Media 2, Media 3, of the multimedia service (e.g., via cameras, microphones, haptic sensors, etc.), information regarding the media streams, Media 1, Media 2, Media 3, may be available to the wireless device 402 and a UL scheduler 1601 running on a processor of the wireless device 402, such as inter-media synchronization requirements, timestamps of different media types aligned to the same clock, UL grant information, etc. As such, the UL scheduler 1601 prioritize which media type to send in the UL transmissions and the UL scheduler 1601 may manage inter-media synchronization on the UL. In various embodiments, the UL scheduler 1601 may also manage UL scheduling opportunities to KPIs, such as power consumption, capacity, etc. The UL scheduler 1601 may adjust for some or all skew between the media streams, Media 1, Media 2, Media 3, before transmitting the data packets in the UL. The UL scheduler 1601 may adjust scheduling resources. The scheduling resources for each stream may be scheduled in time based on knowledge of the skew. In some embodiments, a gNB, such as gNB 952, may adjust for some or all of the skew between the media streams, Media 1, Media 2, Media 3, after receiving the packets from the wireless device 402. In various embodiments, if the skews may be communicated to the gNB 952 for adjustment, the remaining e2e/PDB latency may also be communicated so that the gNB 952 may be aware of how much adjustment can be made before the e2e latency/PDB is violated. The gNB 952 may estimate remaining latency budget by measuring the time since the wireless device 402 sent a scheduling request (SR), or the wireless device 402 may indicate this by including additional information along with the UL payload.

Figure 17A:
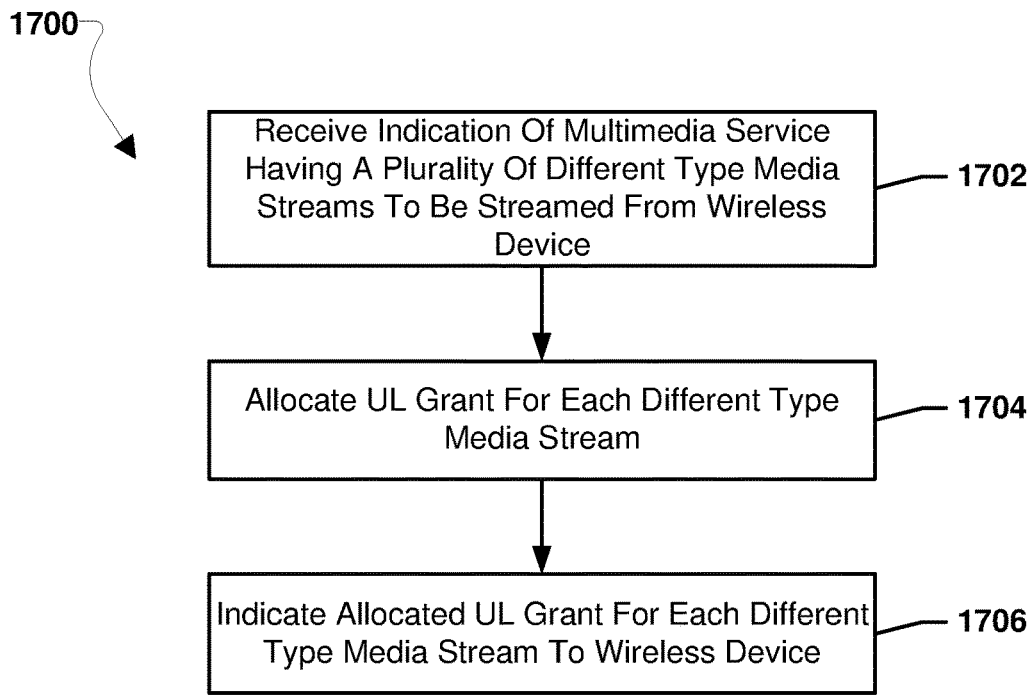
FIG. 17A is a process flow diagram illustrating a method for synchronizing delivery of a multimedia service, in accordance with various embodiments.

FIG. 17A is a process flow diagram illustrating a method 1700 for synchronizing delivery of a multimedia service, in accordance with various embodiments. With reference to FIGS. 1-17A, the operations of method 1700 may be implemented by a processor (e.g., 210, 212, 214, 216, 218, 252, 260) of a network computing device, such as a base station (e.g., base stations 110*a-d*, 350). With reference to FIGS. 1-17A, means for performing each of the operations of method 1700 may be one or more processors of a network computing device (e.g., the base stations 110*a-d*, 350), such as one or more of the processors 210, 212, 214, 216, 218, 252, 260.

In block 1702, the processor may perform operations including receiving an indication of the multimedia service from a wireless device. In some embodiments, the indication of the multimedia service may be a buffer status report (BSR) sent to the base station for each of different type media streams of the multimedia service. In some embodiments, the buffer status reports (BSRs) may indicate different logical channel groups and different priorities for each different type media stream. In some embodiments, assistance information, such as information including indications of the remaining latency budget, such as the remaining e2e latency budget, the remaining PDB, indications of the PDB, and skews between the media streams of the multimedia service, may be indicated in the BSRs.

In block 1704, the processor may perform operations including allocating UL grants for each different type media stream of the multimedia service. In some embodiments, the base station, may respond with PUSCH resources based on the logical channel priority and the number of bits in the BSR for the associated logical channel group. In various embodiments, the allocated UL grants may be periodic configured grants (CGs) offset to account for skew between the different type media streams of the multimedia service. Each stream may be configured as one configured grant (CG) configuration with appropriate parameters, such as periodicity, payload (e.g., modulation and coding scheme (MCS)), etc. The offset between the configurations may be aligned the same as the skew between the media streams.

In block 1706, the processor may perform operations including indicating the allocated UL grant for each different type media stream of the multimedia service to the wireless device.

Figure 17B:
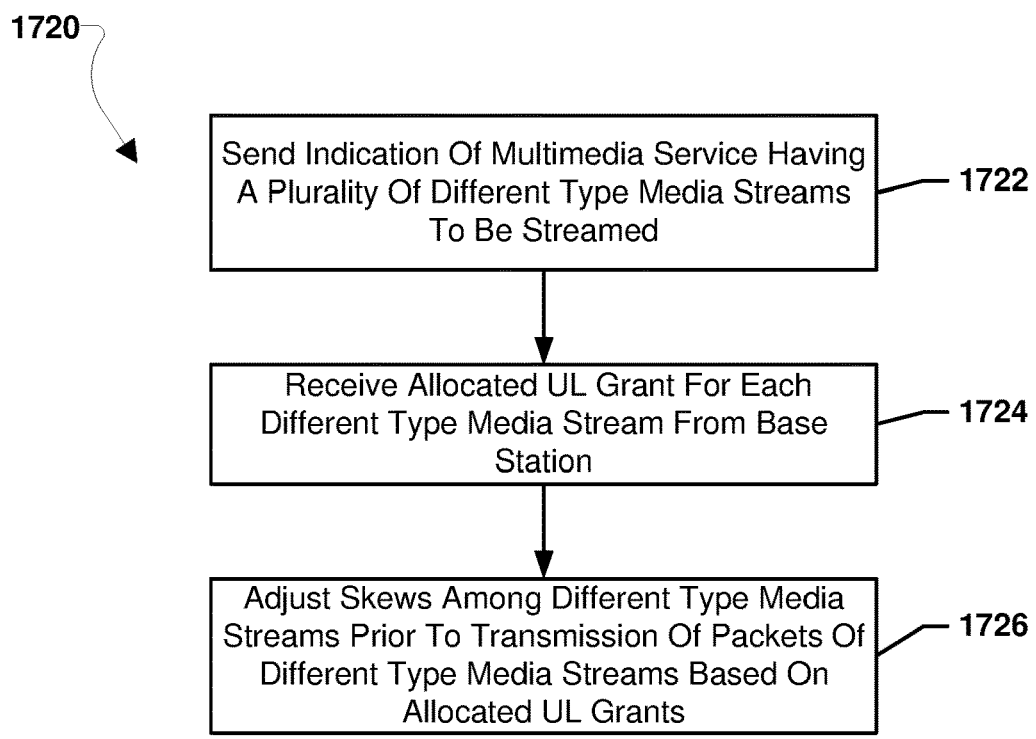
FIG. 17B is a process flow diagram illustrating a method for synchronizing delivery of a multimedia service, in accordance with various embodiments.

FIG. 17B is a process flow diagram illustrating a method 1720 for synchronizing delivery of a multimedia service, in accordance with various embodiments. With reference to FIGS. 1-17B, the operations of method 1720 may be implemented by a processor (e.g., 210, 212, 214, 216, 218, 252, 260) of a wireless device (e.g., wireless device 120*a*-120*e*, 200, 320, 402). With reference to FIGS. 1-17B, means for performing each of the operations of method 1720 may be one or more processors of a wireless device (e.g., the wireless device 120*a*-120*e*, 200, 320, 402), such as one or more of the processors 210, 212, 214, 216, 218, 252, 260. In various embodiments, the operations of method 1720 may be performed in conjunction with the operations of method 1700 (FIG. 17A).

In block 1722, the processor may perform operations including sending an indication of the multimedia service to a base station. In some embodiments, the indication of the multimedia service may be a buffer status report (BSR) sent to the base station for each of different type media streams of the multimedia service. In some embodiments, the buffer status reports (BSRs) may indicate different logical channel groups and different priorities for each different type media stream. In some embodiments, assistance information, such as information including indications of the remaining latency budget, such as the remaining e2e latency budget, the remaining PDB, indications of the PDB, and skews between the media streams of the multimedia service, may be indicated in the BSRs.

In block 1724, the processor may perform operations including receiving an allocated UL grant for each different type media stream of the multimedia service from the base station. In various embodiments, the allocated UL grants are periodic configured grants offset to account for skew between the different type media streams of the multimedia service.

In block 1726, the processor may perform operations including adjusting skews among the different type media streams of the multimedia service prior to transmission of packets of the different type media streams of the multimedia service to the base station based on the allocated UL grants.

FIG. 18A is a process flow diagram illustrating a method 1800 for synchronizing delivery of a multimedia service, in accordance with various embodiments. With reference to FIGS. 1-18A, the operations of method 1800 may be implemented by a processor (e.g., 210, 212, 214, 216, 218, 252, 260) of a wireless device (e.g., wireless device 120a-120e, 200, 320, 402). With reference to FIGS. 1-18A, means for performing each of the operations of method 1800 may be one or more processors of a wireless device (e.g., the wireless device 120a-120e, 200, 320, 402), such as one or more of the processors 210, 212, 214, 216, 218, 252, 260. In various embodiments, the operations of method 1800 may be performed in conjunction with the operations of method 1700 (FIG. 17A) and/or method 1720 (FIG. 17B).

In block 1802, the processor may perform operations including sending assistance data for the different type media streams. In some embodiments, a wireless device may provide assistance information, such as information including indications of the remaining latency budget, such as the remaining e2e latency budget, the remaining PDB, indications of the PDB, and skews between the media streams of the multimedia service.

FIG. 18B is a process flow diagram illustrating a method 1820 for synchronizing delivery of a multimedia service, in accordance with various embodiments. With reference to FIGS. 1-18B, the operations of method 1820 may be implemented by a processor (e.g., 210, 212, 214, 216, 218, 252, 260) of a network computing device, such as a base station (e.g., base stations 110a-d, 350). With reference to FIGS. 1-18B, means for performing each of the operations of method 1820 may be one or more processors of a network computing device (e.g., the base stations 110a-d, 350), such as one or more of the processors 210, 212, 214, 216, 218, 252, 260. In various embodiments, the operations of method 1820 may be performed in conjunction with the operations of method 1700 (FIG. 17A), method 1720 (FIG. 17B), and/or method 1800 (FIG. 18A).

In block 1702, the processor may perform operations including receiving an indication of the multimedia service from a wireless device as described with reference to method 1700 (FIG. 17A).

In block 1822, the processor may perform operations including receiving assistance data for the different type media streams from a wireless device. In some embodiments, a wireless device may provide assistance information, such as information including indications of the remaining latency budget, such as the remaining e2e latency budget, the remaining PDB, indications of the PDB, and skews between the media streams of the multimedia service.

In block 1824, the processor may perform operations including allocating UL grants for each different type media stream of the multimedia service based on the assistance data.

In block 1706, the processor may perform operations including indicating the allocated UL grant for each different type media stream of the multimedia service to the wireless device as described with reference to method 1700 (FIG. 17A).

Figure 19:
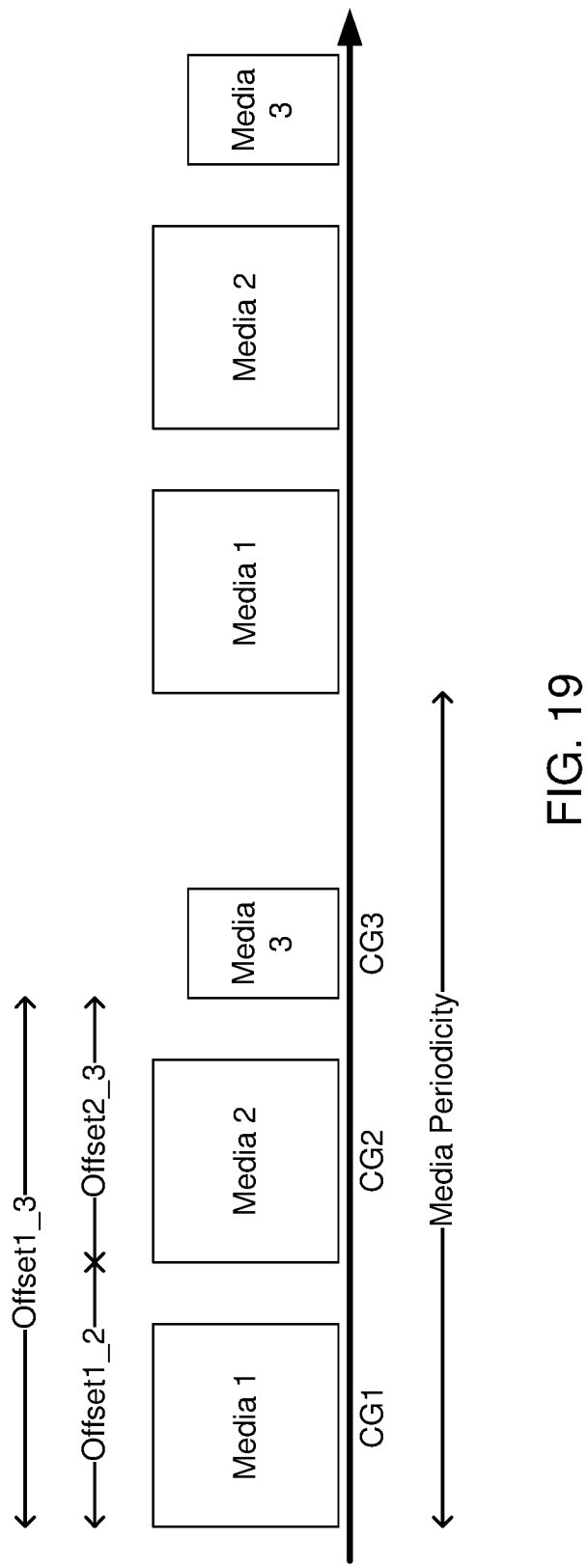
FIG. 19 is a block diagram illustrating configured grants in accordance with various embodiments.

FIG. 19 is a block diagram illustrating configured grants (CGs) in accordance with various embodiments. With reference to FIGS. 1-19, FIG. 19 illustrates CGs, CG1, CG2, and CG3, that may be used to transmit data from the wireless device to the base station. CG1, CG2, and CG3 may be periodically configured resources and once configured, the wireless device may send data to the base station periodically. Each stream may be configured as one configured grant (CG) configuration with appropriate parameters, such as periodicity, payload (e.g., modulation and coding scheme (MCS)), etc. For example, Media 1 may be configured as CG1, Media 2 may be configured as CG2, and Media 3 may be configured as CG3. The offset between the configurations, CG1, CG2, and CG3, may be aligned the same as the skew between the media streams, Media 1, Media 2, Media 3, i.e., Offset1_3, Offset1_2, Offset2_3.

Figure 20A:
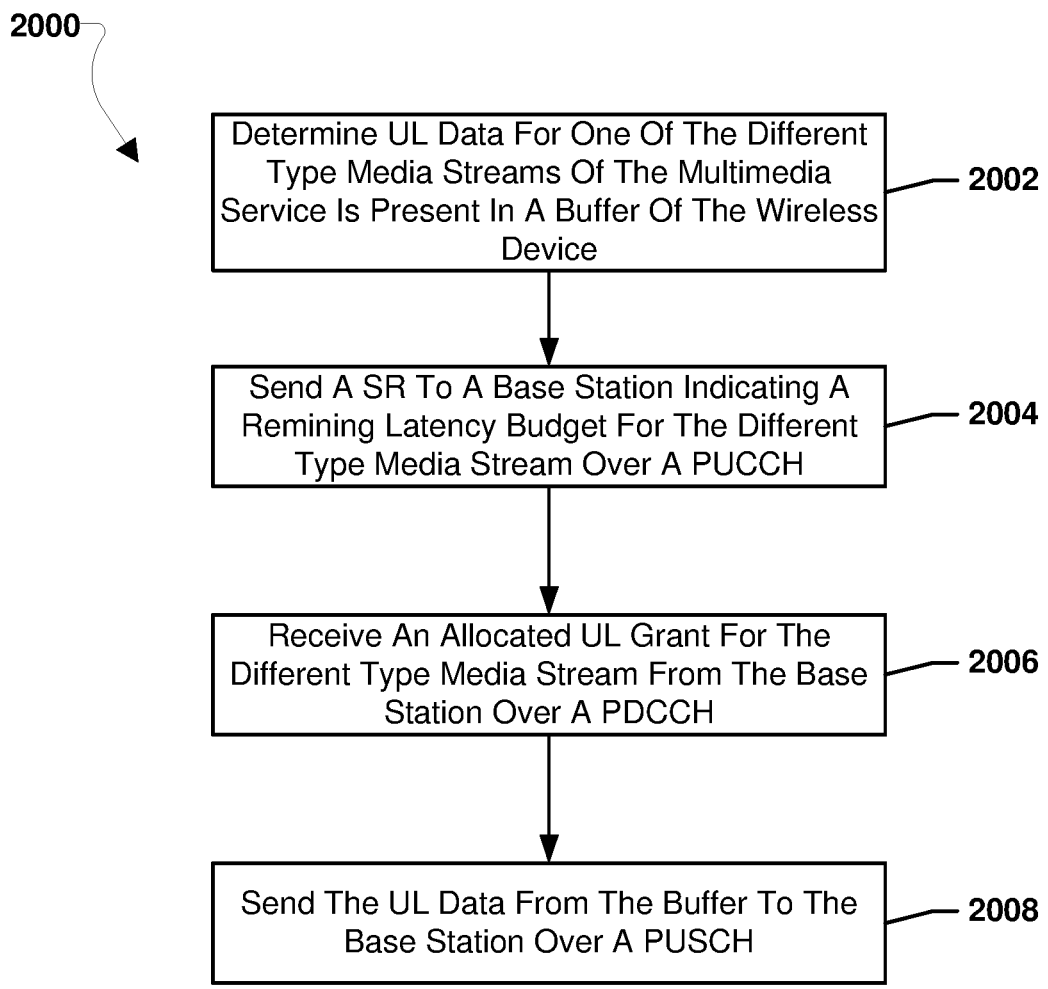
FIG. 20A is a process flow diagram illustrating a method for synchronizing delivery of a multimedia service, in accordance with various embodiments.

FIG. 20A is a process flow diagram illustrating a method 2000 for synchronizing delivery of a multimedia service, in accordance with various embodiments. With reference to FIGS. 1-20A, the operations of method 2000 may be implemented by a processor (e.g., 210, 212, 214, 216, 218, 252, 260) of a wireless device (e.g., wireless device 120a-120e, 200, 320, 402). With reference to FIGS. 1-20A, means for performing each of the operations of method 2000 may be one or more processors of a wireless device (e.g., the wireless device 120a-120e, 200, 320, 402), such as one or more of the processors 210, 212, 214, 216, 218, 252, 260. In various embodiments, the operations of the method 2000 may be performed in conjunction with the operations of the method 1700 (FIG. 17A), the method 1720 (FIG. 17B), the method 1800 (FIG. 18A), and/or the method 1820 (FIG. 18B).

In block 2002, the processor may perform operations including determining UL data for one of the different type media streams of the multimedia service is present in a buffer of the wireless device.

In block 2004, the processor may perform operations including sending a scheduling request (SR) to a base station indicating a remaining latency budget (e.g., a remaining e2e latency budget, a remaining PDB, etc.) for the different type media stream over a Physical Uplink Control Channel (PUCCH). In various embodiments, scheduling requests (SRs) may be configured to include assistance information, such as information including indications of the remaining latency budget, such as the remaining e2e latency budget, the remaining PDB, indications of the PDB, and skews between the media streams of the multimedia service. For example, SR payloads may be expanded to carry the remaining e2e latency budget, remaining PDB, and/or skew of the media.

In block 2006, the processor may perform operations including receiving an allocated uplink (UL) grant for the different type media stream from the base station over a Physical Downlink Control Channel (PDCCH).

In block 2008, the processor may perform operations including sending the UL data from the buffer to the base station over a Physical Uplink Shared Channel (PUSCH).

Figure 20B:
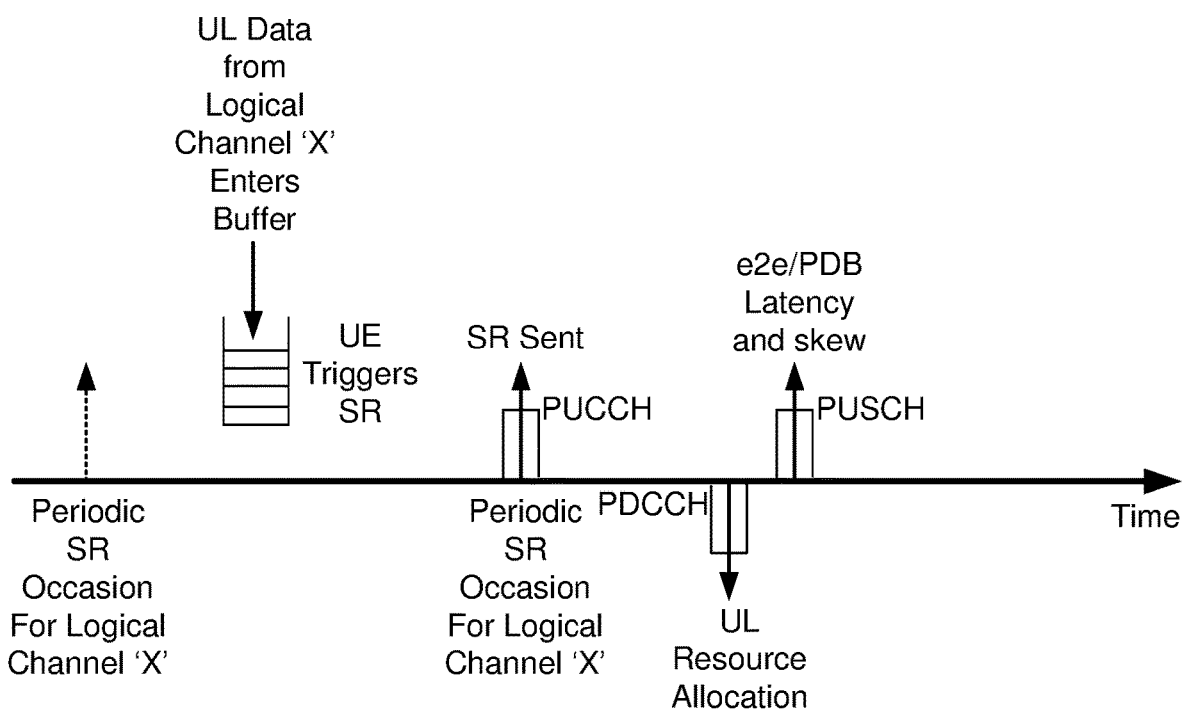
FIG. 20B is a block diagram illustrating scheduling request transmission in accordance with various embodiments.

FIG. 20B is a block diagram illustrating scheduling request transmission in accordance with various embodiments. With reference to FIGS. 1-20B, FIG. 20B illustrates example SR transmission according to the operations of method 2000 (FIG. 20A). SR occasions may occur periodically. Upon UL data for logical channel X entering the wireless device buffer, the wireless device may send an SR over the Physical Uplink Control Channel (PUCCH) at the next SR occasion. For example, the SR payload may be expanded to carry the remaining e2e latency budget, remaining PDB, and/or skew of the media. In response to the SR, the wireless device may and receive allocated UL resources via the PDCCH. Using the allocated UL resources, the UL data may then be sent on the PUSCH and the wireless device may also send a BSR when additional data is still in the buffer.

Figure 21:
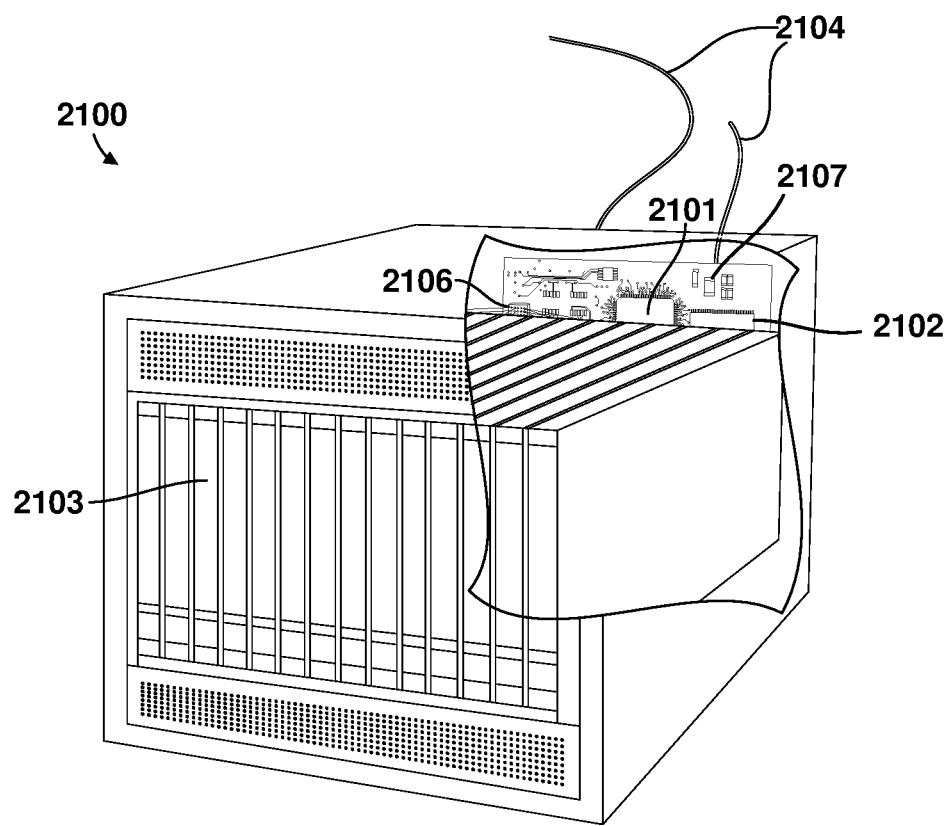
FIG. 21 is a component block diagram of a network computing device suitable for use with various embodiments.

Various embodiments may be implemented on a variety of network computing devices, an example of which is illustrated in FIG. 21 in the form of a wireless network computing device 2100 functioning as a network element of a communication network, such as a base station (e.g., base station 110a-110d, 350, etc.), or other type network computing device, such as a PCF (e.g., PCF 953, etc.), a UPF (e.g., UPF 951, etc.), a content server (e.g., source 401, etc.), etc. Such network computing devices may include at least the components illustrated in FIG. 21. With reference to FIGS. 1-21, the network computing device 2100 may typically include a processor 2101 coupled to volatile memory 2102 and a large capacity nonvolatile memory, such as a disk drive 2103. The network computing device 2100 may also include a peripheral memory access device, such as a floppy disc drive, compact disc (CD) or digital video disc (DVD) drive 2106 coupled to the processor 2101. The network computing device 2100 may also include network access ports 2104 (or interfaces) coupled to the processor 2101 for establishing data connections with a network, such as the Internet and/or a local area network coupled to other system computers and servers. The network computing device 2100 may include one or more antennas 2107 for sending and receiving electromagnetic radiation that may be connected to a wireless communication link. The network computing device 2100 may include additional access ports, such as USB, Firewire, Thunderbolt, and the like for coupling to peripherals, external memory, or other devices.

Figure 22:
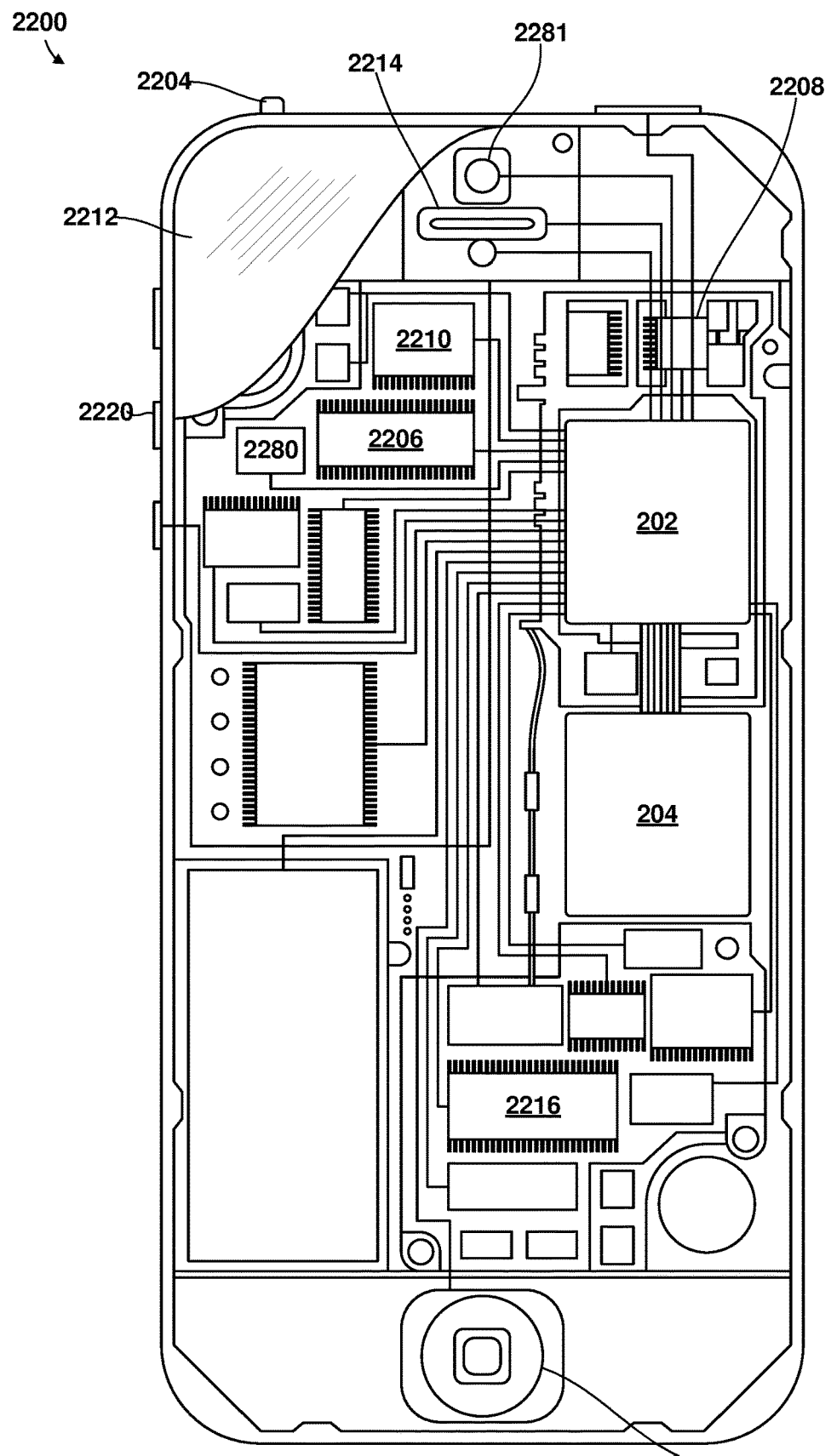
FIG. 22 is a component block diagram of a wireless device suitable for use with various embodiments.

Various embodiments may be implemented on a variety of wireless devices (e.g., the wireless device 120a-120e, 200, 320), an example of which is illustrated in FIG. 22 in the form of a smartphone 2200. With reference to FIGS. 1-22, the smartphone 2200 may include a first SOC 202 (e.g., a SOC-CPU) coupled to a second SOC 204 (e.g., a 5G capable SOC). The first and second SOCs 202, 204 may be coupled to internal memory 2206, 2216, to a display 2212, to a speaker 2214, to a camera 2281, to a microphone 2282, and to a haptic driver 2280. Smartphones 2200 typically also include menu selection buttons or rocker switches 2220 for receiving user inputs. Additionally, the smartphone 2200 may include an antenna 2204 for sending and receiving electromagnetic radiation that may be connected to a wireless data link and/or cellular telephone transceiver 2208 coupled to one or more processors in the first and/or second SOCs 202, 204.

A typical smartphone 2200 also includes a sound and/or video encoding/decoding (CODEC) circuit 2210. The sound and/or video CODEC circuit 2210 may digitize sound received from the microphone 2282 into data packets suitable for wireless transmission and/or may digitize light received from the camera 2281 into data packets suitable for wireless transmission. The sound and/or video CODEC circuit 2210 may decode received sound data packets to generate analog signals that are provided to the speaker 2214 to generate sound and/or may decode received video data packets to generate video signals that are provided to the display 2212 to output images. Also, one or more of the processors in the first and second SOCs 202, 204, wireless transceiver 2208 and CODEC circuit 2210 may include a digital signal processor (DSP) circuit (not shown separately). The haptic driver 2280 may be one or more motors, ultrasonic transducers, sensors, or other type devices that may generate force outputs (e.g., vibrations, movement, etc.) and/or may measure force inputs (e.g., device rotation, touch pressure, etc.) to the smartphone 2200 by a user. Additionally, one or more of the processors in the first and second SOCs 202, 204 may send haptic data packets to the haptic driver 2280 to cause the haptic driver 2280 to generate force outputs and/or may receive haptic data packets from the haptic driver 2280 in response to measured force inputs.

The processors of the wireless network computing device 2100 and the smartphone 2200 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 2206, 2216 before they are accessed and loaded into the processor. The processors may include internal memory sufficient to store the application software instructions As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, 620, 800, 820, 900, 1000, 1100, 1120, 1200, 1220, 1300, 1400, 1420, 1500, 1520, 1700, 1720, 1800, 1820, and/or 2000 may be substituted for or combined with one or more operations of the methods 500, 600, 620, 800, 820, 900, 1000, 1100, 1120, 1200, 1220, 1300, 1400, 1420, 1500, 1520, 1700, 1720, 1800, 1820, and/or 2000.

Implementation examples of methods that may be implemented in a network computing device, such as a base station, a UPF server, etc., are described in the following paragraphs. While implementation examples 1-29 are described in terms of example methods, further example implementations described in the following paragraphs include the example methods implemented by a network computing device, such as a base station, a UPF server, etc., including a processor configured to perform operations of the example methods; the example methods implemented by a network computing device, such as a base station, a UPF server, etc., including means for performing functions of the example methods; and the example methods implemented as a non-transitory processor-readable storage medium having stored thereon processor-executable instructions configured to cause a processor of a network computing device, such as a base station, a UPF server, etc., to perform the operations of the example methods.

Example 1. A method for synchronizing delivery of a multimedia service among different media streams performed by a processor of a base station (such as a Long Term Evolution (LTE) base station, a Fifth Generation (5G) New Radio (NR)(5G NR) base station, a later generation base station, etc.), including: determining that a data packet of a media stream of a plurality of different type media streams qualifies for early delivery; determining an early delivery time period to a latency budget for the media stream of the data packet qualifying for early delivery; sending the data packet qualifying for early delivery to a wireless device earlier than the latency budget; and sending an early delivery indication including an indication of the early delivery time period to the wireless device.

Example 2. The method of example 1, in which the latency budget is a packet delay budget.

Example 3. The method of example 1, in which the latency budget is an end-to-end (e2e) latency budget.

Example 4. The method of any of examples 1-3, further including: sending synchronization margins for each of the plurality of different type media streams to the wireless device; and sending an indication of remaining latency budgets for the plurality of different type media streams to the wireless device.

Example 5. The method of example 4, further including: receiving feedback requesting skew adjustment from the wireless device; and adjusting delivery of packets to the wireless device according to the feedback to meet the synchronization margins.

Example 6. A method for synchronizing delivery of a multimedia service among different media streams performed by a processor of a base station (such as a Long Term Evolution (LTE) base station, a Fifth Generation (5G) New Radio (NR)(5G NR) base station, a later generation base station, etc.), including: receiving a buffer status report for each of different type media streams of the multimedia service from a wireless device, in which the buffer status reports indicate different logical channel groups and different priorities for each different type media stream; allocating uplink (UL) grants for each different type media stream of the multimedia service based on the buffer status reports; and indicating the allocated UL grant for each different type media stream of the multimedia service to the wireless device over a Physical Downlink Control Channel (PDCCH).

Example 7. The method of example 6, in which the allocated UL grants are periodic configured UL grants offset to account for skew between the different type media streams of the multimedia service.

Example 8. The method of any of examples 6-7, further including: receiving a scheduling request (SR) from the wireless device indicating a remaining latency budget for one of the different type media streams of the multimedia service over a Physical Uplink Control Channel (PUCCH); allocating UL grants for the one of the different type media streams of the multimedia service based on the remaining latency budget in response to receiving the SR; indicating the allocated UL grant for the one of the different type media streams of the multimedia service to the wireless device over the PDCCH; and receiving UL data from for the one of the different type media streams of the multimedia service from the wireless device over a Physical Uplink Shared Channel (PUSCH).

Example 9. The method of example 8, in which the remaining latency budget is a remaining packet delay budget.

Example 10. The method of example 8, in which the remaining latency budget is a remaining end-to-end (e2e) latency budget.

Example 11. A method for synchronizing delivery of a multimedia service among different media streams performed by a processor of a base station (such as a Long Term Evolution (LTE) base station, a Fifth Generation (5G) New Radio (NR)(5G NR) base station, a later generation base station, etc.), including: receiving an indication of end-to-end (e2e) latency targets for each of a plurality of different type media streams of the multimedia service; receiving a data packet of one of the plurality of different type media streams; and sending the data packet to a wireless device in response to determining that an e2e latency target for that different type media stream is met.

Example 12. A method for synchronizing delivery of a multimedia service among different media streams performed by a processor of a base station (such as a Long Term Evolution (LTE) base station, a Fifth Generation (5G) New Radio (NR)(5G NR) base station, a later generation base station, etc.), including: receiving synchronization margins for each of a plurality of different type media stream of the multimedia service; receiving packets of the different type media streams of the multimedia service having GTP aligned timestamps; and delivering the packets of the different type media streams of the multimedia service to a wireless device such that the synchronization margins are not exceeded.

Example 13. A method for synchronizing delivery of a multimedia service among different media streams performed by a processor of a base station (such as a Long Term Evolution (LTE) base station, a Fifth Generation (5G) New Radio (NR)(5G NR) base station, a later generation base station, etc.), including: receiving a feedback indication requesting adjusted delivery of packets of a multimedia service including a plurality of different type media streams from a wireless device; and adjusting delivery of the packets to the wireless device according to the feedback indication.

Example 14. A method for synchronizing delivery of a multimedia service among different media streams performed by a processor of a base station (such as a Long Term Evolution (LTE) base station, a Fifth Generation (5G) New Radio (NR)(5G NR) base station, a later generation base station, etc.), including: determining that a data packet of a media stream of a plurality of different type media streams qualifies for early delivery; determining an early delivery time period to an end-to-end (e2e) latency budget for the media stream of the data packet qualifying for early delivery; sending the data packet qualifying for early delivery to a wireless device earlier than the e2e latency budget; and sending an early delivery indication including an indication of the early delivery time period to the wireless device.

Example 15. A method for synchronizing delivery of a multimedia service among different media streams performed by a processor of a base station (such as a Long Term Evolution (LTE) base station, a Fifth Generation (5G) New Radio (NR)(5G NR) base station, a later generation base station, etc.), including: sending synchronization margins for each different type media stream of the multimedia service to a wireless device; sending packets of the different type media streams of the multimedia service to the wireless device; and sending an indication of remaining end-to-end (e2e) latency budgets for the different type media streams to the wireless device.

Example 16. The method of example 15, further including: receiving feedback requesting skew adjustment from a wireless device; and adjusting delivery of the packets to the wireless device according to the feedback indication to meet the synchronization margins.

Example 17. A method for synchronizing delivery of a multimedia service among different media streams performed by a processor of a base station (such as a Long Term Evolution (LTE) base station, a Fifth Generation (5G) New Radio (NR)(5G NR) base station, a later generation base station, etc.), including: receiving an indication of the multimedia service from a wireless device; allocating uplink (UL) grants for each different type media stream of the multimedia service; and indicating the allocated UL grant for each different type media stream of the multimedia service to the wireless device.

Example 18. The method of example 17, further including: receiving assistance data for the different type media streams from the wireless device, in which allocating UL grants for each different type media stream of the multimedia service includes allocating UL grants for each different type media stream of the multimedia service based on the assistance data.

Example 19. The method of example 18, in which the indication of the multimedia service is a buffer status report received for each of different type media streams of the multimedia service, in which the buffer status reports indicate different logical channel groups and different priorities for each different type media stream.

Example 20. The method of example 19, in which the assistance data is indicated in the buffer status reports.

Example 21. The method of example 18, in which the allocated UL grants are periodic configured grants offset to account for skew between the different type media streams of the multimedia service.

Example 22. A method for synchronizing delivery of a multimedia service among different media streams performed by a processor of a network computing device, including: determining a lowest end-to-end (e2e) latency media stream as a different type media stream having a lowest e2e latency requirement; setting a transport priority for each of a plurality of different type media streams to a transport priority of the lowest e2e latency media stream; and sending the plurality of different type media streams with the set transport priorities.

Example 23. The method of example 22, in which the transport priorities are Quality of Service (QoS) flows.

Example 24. A method for synchronizing delivery of a multimedia service among different media streams performed by a processor of a network computing device, including: determining an end-to-end (e2e) latency target for each of a plurality of different type media streams based at least in part on an e2e latency requirement for that respective different type media stream; and sending an indication of the e2e latency target for each different type media stream to one or more base stations.

Example 25. The method of example 24, in which determining the e2e latency target for each different type media stream based at least in part on an e2e latency requirement for that respective different type media stream includes determining at least one latency target for a first different type media streams based on a determined latency target for a second different type media stream and a synchronization margin between the first different type media stream and the second different type media stream.

Example 26. A method for synchronizing delivery of a multimedia service among different media streams performed by a processor of a network computing device, including: synchronizing a clock with a wireless device receiving the multimedia service; sending packet delay budget (PDB) indications for each of a plurality of different type of media streams to the wireless device; setting timestamps in packets of the plurality of different media streams according to the synchronized clock; and sending the plurality of different type media streams with the set transport priorities to the wireless device.

Example 27. A method for synchronizing delivery of a multimedia service among different media streams performed by a processor of a network computing device, including: receiving packets of the multimedia service including a plurality of different type media streams, the packets including Real-time Transport Protocol (RTP) timestamps; receiving an indication of a sampling frequency for each of the plurality of different type media streams; aligning RTP timestamps of the plurality of different type media streams based on RTP Control Protocol (RTCP) report information and the sampling frequencies; and sending the packets of the multimedia service to a base station using General Packet Radio Service (GPRS) Tunneling Protocol (GTP) aligned timestamps.

Example 28. The method of example 27, in which aligning RTP timestamps of the plurality of different type media streams based on RTCP report information and the sampling frequencies includes: determining timestamp offsets between the different type media streams based on the RTCP report information and sampling frequencies; and aligning the RTP timestamps of the plurality of different type media streams based on the timestamp offsets.

Example 29. The method of example 27, further including: adjusting the GTP aligned timestamps to match tolerable inter-media synchronization requirements, in which sending the packets of the multimedia service to the base station using the GTP aligned timestamps includes sending the packets of the multimedia service to the base station using the adjusted GTP aligned timestamps.

Implementation examples of methods that may be implemented in a wireless device are described in the following paragraphs. While implementation examples 30-37 are described in terms of example methods, further example implementations described in the following paragraphs include the example methods implemented by a wireless device including a processor configured to perform operations of the example methods; the example methods implemented by a wireless device including means for performing functions of the example methods; and the example methods implemented as a non-transitory processor-readable storage medium having stored thereon processor-executable instructions configured to cause a processor of a wireless device to perform the operations of the example methods.

Example 30. A method for synchronizing delivery of a multimedia service among different media streams performed by a processor of a wireless device, including: synchronizing a clock with a network computing device streaming the multimedia service; receiving packet delay budget (PDB) indications for each of a plurality of different type of media streams from the network computing device; receiving a data packet of one of the plurality of different type media streams including a timestamp; and rendering the data packet in response to determining that a PDB time is met for the data packet based on the time stamp and the synchronized clock.

Example 31. A method for synchronizing delivery of a multimedia service among different media streams performed by a processor of a wireless device, including: detecting a loss of synchronization between packets of the multimedia service that includes a plurality of different type media streams; generating a feedback indication requesting adjusted delivery of packets of the multimedia service; and sending the feedback indication to a base station.

Example 32. A method for synchronizing delivery of a multimedia service among different media streams performed by a processor of a wireless device, including: receiving an early delivery indication for a multimedia service including a plurality of different type media streams, the early delivery indication including an indication of an early delivery time period from a base station; receiving a data packet of one of the plurality of different type media streams from the base station earlier than an end-to-end (e2e) latency budget for the media stream of the data packet; and rendering the data packet in response to determining that the early delivery time period is met.

Example 33. A method for synchronizing delivery of a multimedia service among different media streams performed by a processor of a wireless device, including: receiving synchronization margins for each of a different type media stream of the multimedia service from a base station; receiving an indication of remaining end-to-end (e2e) latency budgets for the different type media streams from the base station; receiving packets of the different type media streams of the multimedia service from the base station; determining whether adjustment is needed to meet the synchronization margins; determining whether the remaining e2e latency budgets are sufficient to support adjustment in response to determining that adjustment is needed; and adjusting delivery of the packets of the different type media streams to a renderer of the wireless device in response to determining that the remaining e2e latency budgets are sufficient to support adjustment.

Example 34. The method of example 33, further including: sending feedback to the base station requesting skew adjustment in response to determining that the remaining e2e latency budgets are not sufficient to support adjustment.

Example 35. A method for synchronizing delivery of a multimedia service among different media streams performed by a processor of a wireless device, including: sending an indication of the multimedia service to a base station; receiving an allocated uplink (UL) grant for each different type media stream of the multimedia service from the base station; and adjusting skews among the different type media streams of the multimedia service prior to transmission of packets of the different type media streams of the multimedia service to the base station based on the allocated UL grants.

Example 36. The method of example 35, in which the indication of the multimedia service is a buffer status report sent to the base station for each of different type media streams of the multimedia service, in which the buffer status reports indicate different logical channel groups and different priorities for each different type media stream.

Example 37. A method for synchronizing delivery of a multimedia service among different media streams performed by a processor of a wireless device, including: determining uplink (UL) data for one of the different type media streams of the multimedia service is present in a buffer of the wireless device; sending a scheduling request (SR) to a base station indicating a remaining end-to-end (e2e) latency budget for the different type media stream over a Physical Uplink Control Channel (PUCCH); receiving an allocated UL grant for the different type media stream from the base station over a Physical Downlink Control Channel (PDCCH); and sending the UL data from the buffer to the base station over a Physical Uplink Shared Channel (PUSCH).

Example 38. A system, including: a wireless device, including a processor configured with processor-executable instructions to perform the operations recited in any of examples 30-37; and a network computing device, including a processor configured with processor-executable instructions to perform the operations recited in any of examples 1-29.

Example 39. A system, including: a wireless device, including means for performing functions of the methods recited in any of examples 30-37; and a network computing device, including means for performing functions of the methods recited in any of examples 1-29.

Example 40. A system-on-chip, including at least one processor configured to perform the operations recited in any of examples 1-37.

Example 41. A system-in-chip, including means for performing functions of the methods recited in any of examples 1-37.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for synchronizing delivery of a multimedia service among different media streams performed by a processor of a base station, comprising:
   receiving a buffer status report for each of different type media streams of the multimedia service from a wireless device, wherein the buffer status reports indicate different logical channel groups and different priorities for each different type media stream;
   allocating uplink (UL) grants for each different type media stream of the multimedia service based on the buffer status reports, wherein the allocated UL grants include a periodic configured grant (CG) offset based on skew of two or more packets between the different type media streams, and wherein the different type media streams include a payload configured to align the CG offset with the skew; and
   indicating the allocated UL grant for each different type media stream of the multimedia service to the wireless device over a Physical Downlink Control Channel (PDCCH).

2. The method of claim 1, further comprising:
   receiving a scheduling request (SR) from the wireless device indicating a remaining latency budget for one of the different type media streams of the multimedia service over a Physical Uplink Control Channel (PUCCH);
   allocating UL grants for the one of the different type media streams of the multimedia service based on the remaining latency budget in response to receiving the SR;
   indicating the allocated UL grant for the one of the different type media streams of the multimedia service to the wireless device over the PDCCH; and
   receiving UL data from for the one of the different type media streams of the multimedia service from the wireless device over a Physical Uplink Shared Channel (PUSCH).

3. The method of claim 2, wherein the remaining latency budget is a remaining packet delay budget.

4. The method of claim 2, wherein the remaining latency budget is a remaining end-to-end (e2e) latency budget.

5. A base station, comprising:
   a processor configured with processor-executable instructions to:
      receive a buffer status report for each of different type media stream of a multimedia service from a wireless device, wherein the buffer status reports indicate different logical channel groups and different priorities for each different type media stream;
      allocate uplink (UL) grants for each different type media stream of the multimedia service based on the buffer status reports, wherein the allocated UL grants include a periodic configured grant (CG) offset based on skew of two or more packets between the different type media streams, and wherein the different type media streams include a payload configured to align the CG offset with the skew; and indicate the allocated UL grant for each different type media stream of the multimedia service to the wireless device over a Physical Downlink Control Channel (PDCCH).

6. The base station of claim 5, wherein the processor is further configured with processor-executable instructions to:

receive a scheduling request (SR) from the wireless device indicating a remaining latency budget for one of the different type media streams of the multimedia service over a Physical Uplink Control Channel (PUCCH);

allocate UL grants for the one of the different type media streams of the multimedia service based on the remaining latency budget in response to receiving the SR;

indicate the allocated UL grant for the one of the different type media streams of the multimedia service to the wireless device over the PDCCH; and receive UL data from for the one of the different type media streams of the multimedia service from the wireless device over a Physical Uplink Shared Channel (PUSCH).

7. The base station of claim 6, wherein the remaining latency budget is a remaining packet delay budget.

8. The base station of claim 6, wherein the remaining latency budget is a remaining end-to-end (e2e) latency budget.

* * * * *